US011937354B2

(12) United States Patent
Knauss et al.

(10) Patent No.: US 11,937,354 B2
(45) **Date of Patent: *Mar. 19, 2024**

(54) CONTROLLING GROUPS OF ELECTRICAL LOADS

(71) Applicant: Lutron Technology Company LLC, Coopersburg, PA (US)

(72) Inventors: Matthew Knauss, Macungie, PA (US); Timothy Mann, Quakertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,852

(22) Filed: Dec. 17, 2021

(65) Prior Publication Data

US 2022/0124897 A1 Apr. 21, 2022

Related U.S. Application Data

(63) Continuation of application No. 17/068,438, filed on Oct. 12, 2020, now Pat. No. 11,240,900, which is a continuation of application No. 16/547,274, filed on Aug. 21, 2019, now Pat. No. 10,834,802.

(60) Provisional application No. 62/749,481, filed on Oct. 23, 2018, provisional application No. 62/720,674, filed on Aug. 21, 2018.

(51) Int. Cl.
*H05B 47/185* (2020.01)
*H05B 47/19* (2020.01)

(52) U.S. Cl.
CPC ........... *H05B 47/185* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 5,248,919 | A | 9/1993 | Hanna et al. |
| 8,009,042 | B2 | 8/2011 | Steiner et al. |
| 8,199,010 | B2 | 6/2012 | Sloan et al. |
| 8,228,184 | B2 | 7/2012 | Blakeley et al. |
| 8,330,638 | B2 | 12/2012 | Altonen et al. |
| 8,410,706 | B2 | 4/2013 | Steiner et al. |
| 8,451,116 | B2 | 5/2013 | Steiner et al. |
| 8,471,779 | B2 | 6/2013 | Mosebrook |
| 8,950,461 | B2 | 2/2015 | Ogden et al. |
| 9,115,537 | B2 | 8/2015 | Blair |
| 9,368,025 | B2 | 6/2016 | Carmen |
| 2008/0111491 | A1 | 5/2008 | Spira et al. |

(Continued)

*Primary Examiner* — Jany Richardson
(74) *Attorney, Agent, or Firm* — Flaster Greenberg, P.C.

(57) ABSTRACT

The remote control device may provide feedback via the status indicator that indicates the present intensity level of a lighting device responsive to the remote control device. The remote control device may provide feedback to indicate a first present intensity level of a first lighting device when the command is a first command type, and a second present intensity level of a second lighting device when the command is a second command type. When the first command type is a raise command and the second command type is a lower command, the first present intensity level may be less than the second present intensity level. In addition, the first lighting device may be a lighting device responsive to the remote control device with a lowest present intensity level and the second lighting device may be a lighting device responsive to the remote control device with a highest present intensity level.

26 Claims, 32 Drawing Sheets

(56) References Cited

U.S. PATENT DOCUMENTS

| | | | |
|---|---|---|---|
| 2012/0286940 | A1 | 11/2012 | Carmen et al. |
| 2013/0030589 | A1 | 1/2013 | Pessina et al. |
| 2014/0132475 | A1 | 5/2014 | Bhutani et al. |
| 2014/0265568 | A1 | 9/2014 | Crafts et al. |
| 2017/0265286 | A1 | 9/2017 | Song |
| 2017/0354011 | A1 | 12/2017 | Dimberg et al. |
| 2018/0092194 | A1 | 3/2018 | Bard et al. |
| 2018/0116040 | A1 | 4/2018 | Mann et al. |
| 2020/0015341 | A1 | 1/2020 | Mann et al. |

CONTROLLING GROUPS OF ELECTRICAL LOADS

CROSS-REFERENCE TO RELATED APPLICATIONS

This application is a continuation of U.S. Non-Provisional patent application Ser. No. 17/068,438, filed Oct. 12, 2020, which is a continuation of U.S. Non-Provisional patent application Ser. No. 16/547,274, filed Aug. 21, 2019, which issued as U.S. Pat. No. 10,834,802 on Nov. 10, 2020, which claims priority from U.S. Provisional Patent Application No. 62/720,674, filed Aug. 21, 2018 and U.S. Provisional Patent Application No. 62/749,481, filed Oct. 23, 2018, which are hereby incorporated by reference in their entireties.

BACKGROUND

A user environment, such as a residence or an office building, for example, may be configured using various types of load control systems. A lighting control system may be used to control the lighting loads in a user environment. The lighting control system may include various devices, such as input devices and load control devices, capable of communicating via radio frequency (RF) communications. For example, a remote control device may be used to communicate with lighting devices (e.g., light bulbs) in the load control system to control the intensity level (e.g., a lighting level) of the lighting devices. The devices may communicate in a network using RF communications, such as ZIGBEE® communications; THREAD® communications; BLUETOOTH® communications; or proprietary communications, such as CLEAR CONNECT™.

Lighting devices in the user environment may be collectively controlled by a common lighting control device that is capable of dimming the group of lighting devices or toggling the group of lighting devices on and off. One or more of the lighting devices in the system may be independently controlled by another lighting control device. This independent control of a subset of the lighting devices may cause some of the lighting devices to become out of sync with the rest of the group, such that some of the lighting control devices are turned “on,” while others are turned “off.” When the common lighting control device is actuated by a user to toggle the entire group of lighting devices (e.g., from on to off, or vice versa), the lighting devices that are out of sync with the others will remain out of sync. Each of the lighting devices will receive a multicast message that causes the lighting device to toggle from on to off or vice versa, such that the lighting devices that are in an “on” will be turned “off” and the lighting devices that are “off” will be turned “on.” To get the lighting devices in the entire group back in sync, the user may be required to independently control the lighting devices that are out of sync.

The control device that is used for controlling the lighting devices may also be capable of controlling other types of electrical loads and/or load control devices in the user environment. Different types of electrical loads and load control devices may be controlled very differently. For example, lighting devices may be dimmed, HVAC systems may control temperature, motorized window treatments may be raised and lowered, etc. As many different types of electrical loads and/or load control devices may be controlled in the user environment, the status of these electrical loads and/or load control devices may be helpful for performing user control within the user environment. The status of the electrical loads and/or load control devices may not be easily determined from a single status indicator that is universal for the various types of electrical loads. Thus, a default indicator may cause confusion to the end user as to the actual status of an electrical load or load control device being controlled thereby.

SUMMARY

As described herein, a remote control device may communicate with load control devices for controlling electrical loads (e.g., lighting devices, such as controllable lamps) using techniques to ensure that the electrical loads are controlled in a quick and organized manner. The remote control device may be configured to transmit wireless signals for synchronizing the state (e.g., the on/off state) and/or the intensity levels of multiple lighting devices. The remote control device may include a status indicator that comprises a plurality of light sources. In addition, the remote control device may include an actuation portion and a rotation portion. The remote control device may receive a user interaction event, for example, via the actuation portion or the rotation portion. The user interaction may correspond to a command (e.g., an on command, an off command, a raise command, a lower command, etc.). The remote control device may receive device information about the lighting devices that are responsive to the remote control device. For example, the device information may include the present intensity levels of the lighting devices that are responsive to the remote control device.

The remote control device may provide feedback via the status indicator. For example, the feedback may indicate the present intensity level of a lighting device responsive to the remote control device based on the command or command type. For example, the remote control device may provide feedback to indicate a first present intensity level of a first lighting device when the command is a first command type, and a second present intensity level of a second lighting device when the command is a second command type. When the first command type is a raise command (e.g., a clockwise rotation of the rotation portion) and the second command type is a lower command (e.g. a counter-clockwise rotation of the rotation portion), first present intensity level may be less than the second present intensity level. In addition, the first lighting device may be a lighting device responsive to the remote control device with a lowest present intensity level and the second lighting device may be a lighting device responsive to the remote control device with a highest present intensity level.

The feedback provided via the status indicator may be adjusted to indicate the present intensity level of a lighting device responsive to the remote control device. For example, the feedback provided via the status indicator may be adjusted to indicate the present intensity level of the first lighting device as the present intensity level is raised in response to the raise command. Similarly, the feedback provided via the status indicator may be adjusted to indicate the present intensity level of the second lighting device as the present intensity level is lowered in response to the lower command.

A remote control device may include a status indicator that comprises a plurality of light sources, a rotation portion, and an actuation portion. The remote control device may receive a user interaction event for controlling the lighting devices that are responsive to the remote control device. For example, the user interaction event may be an actuation of the actuation portion. The remote control device may receive device information regarding the plurality of devices that are responsive to the remote control device. The device information may include the present and future intensity levels of the lighting devices that are responsive to the remote control device. The remote control device map provide feedback via the status indicator in response to the user interaction event. For example, the feedback may illuminate the status indicator to a starting intensity level and adjust the feedback provided via the status indicator over time to illuminate the status indicator to an ending intensity level. When, for example, the command is an on command, the ending intensity level may be the future intensity level of the device of the plurality of devices with the highest future intensity level and the starting intensity level may be the present intensity level of the device of the plurality of devices with the lowest present intensity level. Also, or alternatively, when the command is an off command, the ending intensity level may be the future intensity level of the device of the plurality of devices with the lowest future intensity level and the starting intensity level may be the present intensity level of the device of the plurality of devices with the highest present intensity level.

A remote control device may include a status indicator that comprises a plurality of light sources, a rotation portion, and an actuation portion. The remote control device may receive a user interaction event for controlling the lighting devices that are responsive to the remote control device. For example, the user interaction event may be an actuation of the actuation portion. The remote control device may receive device information regarding the plurality of devices that are responsive to the remote control device. The device information may include the present and future intensity levels of the lighting devices that are responsive to the remote control device, and a transition time. The remote control device may select a type of relative feedback to be provided via the status indicator based on the command and the device information. For example, the types of relative feedback may include a transition-down animation, a transition-up animation, and a responsive animation. The transition-up animation may be the selected feedback type when the command is an on command. The transition-down animation may be the selected feedback type when the command is an off command. The responsive animation may the selected feedback type when the command is a raise command or a lower command. The remote control device may provide feedback using the selected feedback type via the status indicator.

A master device may be in communication with a remote control device and one or more lighting devices responsive to the remote control device. The master device may receive a first message from the remote control that indicates a user interaction (e.g., a button-press message, a double-press message, a start-rotation message, an end-rotation message, and update-rotation message). The master device may retrieve the intensity levels for each of the one or more lighting devices responsive to the remote control device. The master device may determine a command based on the first message and the intensity levels for each of the one or more lighting devices responsive to the remote control device. The master device may transmit a second message (e.g., a transition-level-info message and/or a rotation-level-info message) to the remote control device. For example, the second message may include a present intensity level a lighting device responsive the remote control device and a transition time, which the remote control device may use to provide feedback. The master device may transmit the command to the one or more lighting devices responsive to the remote control device, which may cause the one or more lighting devices to transition their respective intensity levels (e.g., based on the command).

DETAILED DESCRIPTION

Figure 1A:
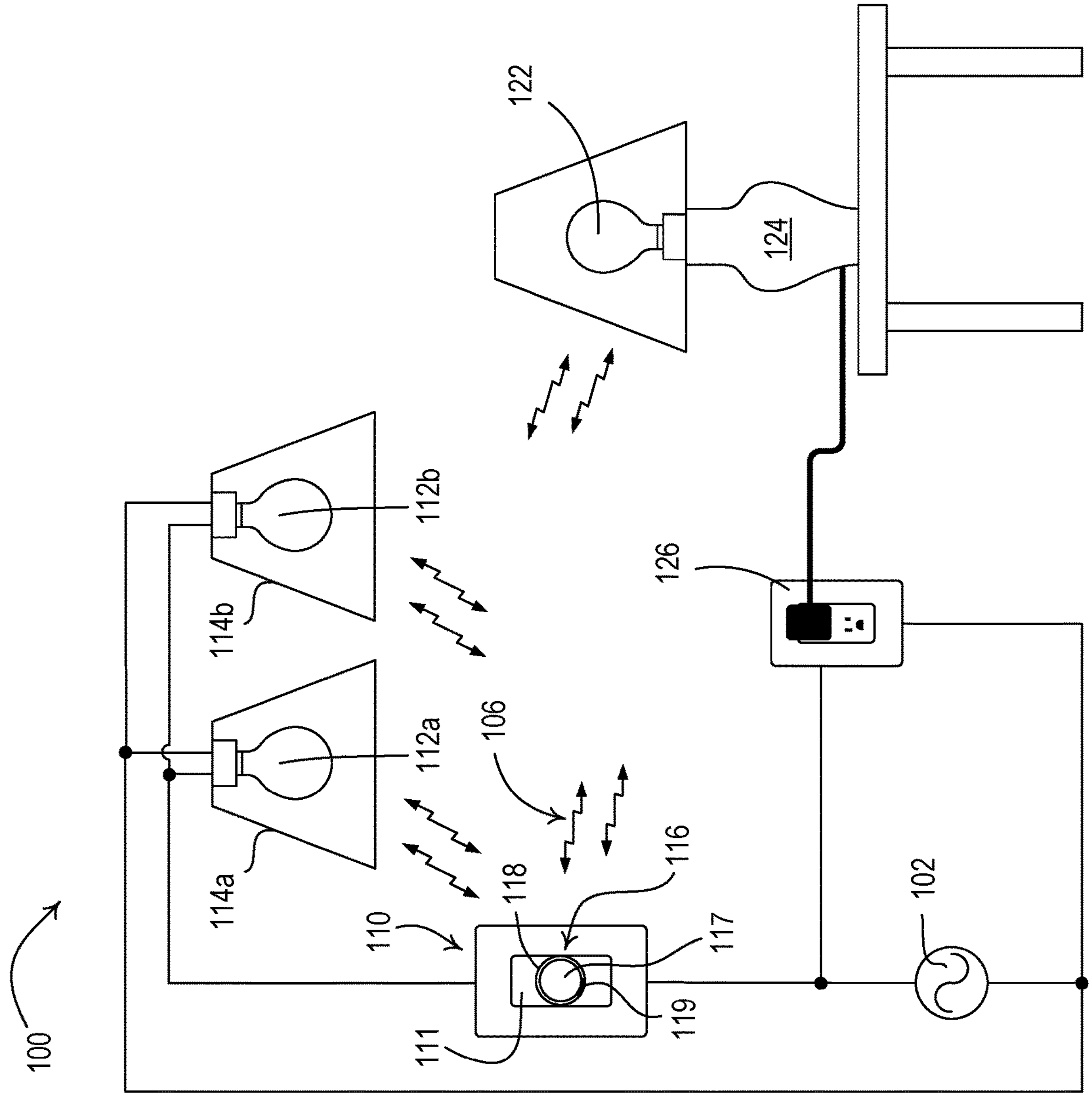
FIGS. 1A and 1B depict examples of a load control system that may implement one or more message types for communicating digital messages.
Figure 1B:
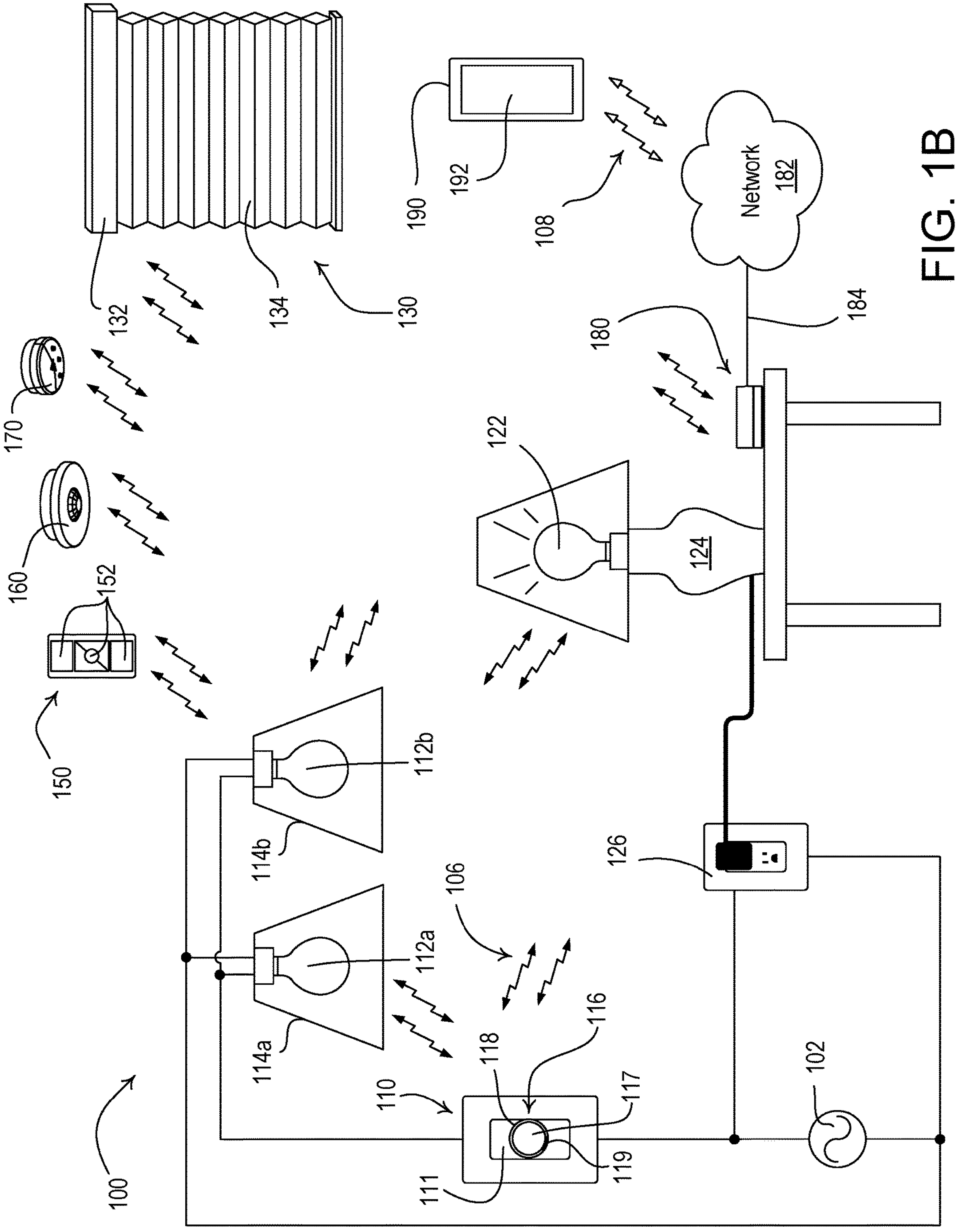

FIGS. 1A and 1B depict examples of a load control system 100 that may implement one or more message types for communicating messages (e.g., digital messages). As shown in FIG. 1A, the load control system 100 may include various control devices, such as controller devices and/or load control devices. The controller device may send digital messages to the load control device to cause the load control device to control an amount of power provided from an AC power source 102 to an electric load in the load control system 100.

Load control devices may control the electrical loads within a room and/or a building. Each load control device may be capable of directly controlling the amount of power provided to an electrical load in response to communication from a controller device. Example load control devices may include lighting devices 112*a*, 112*b* and/or lighting device 122 (e.g., a load control device in light bulbs, ballasts, LED drivers, etc.). The lighting devices may be a lighting load itself, or a device that includes the lighting load and a lighting load controller.

A controller device may indirectly control the amount of power provided to an electrical load by transmitting digital messages to the load control device. The digital messages may include control instructions (e.g., load control instructions) or another indication that causes the load control device to determine load control instructions for controlling an electrical load. Example controller devices may include a remote control device 116. The controller devices may include a wired or wireless device.

Control devices (e.g., controller devices and/or load control devices) may communicate with each other and/or other devices via wired and/or wireless communications. The control devices may communicate using digital messages in a wireless signal. For example, the control devices may communicate via radio frequency (RF) signals 106. The RF signals 106 may be communicated via an RF communication protocol (e.g., ZIGBEE®; THREAD®; near field communication (NFC); BLUETOOTH®; WI-FI®; a proprietary communication protocol, such as CLEAR CONNECT™, etc.). The digital messages may be transmitted as multicast messages and/or unicast messages via the RF signals 106.

The lighting device 122 may be installed in a plug-in device 124, such as a lamp (e.g., a table lamp). The plug-in device 124 may be coupled in series electrical connection between the AC power source 102 and the lighting device 122. The plug-in device 124 may be plugged into an electrical receptacle 126 that is powered by the AC power source 102. The plug-in device 124 may be plugged into the electrical receptacle 126 or a separate plug-in load control device that is plugged into the electrical receptacle 126 and configured to control the power delivered to the lighting device 122.

The lighting devices 112*a*, 112*b* may be controlled by a wall-mounted load control device 110. Though the lighting devices 112*a*, 112*b* are shown in FIG. 1A, any number of lighting devices may be implemented that may be supported by the wall-mounted load control device 110 and/or the AC power source 102. The wall-mounted load control device 110 may be coupled in series electrical connection between the AC power source 102 and lighting devices 112*a*, 112*b*. The wall-mounted load control device 110 may include a mechanical switch 111 (e.g., a previously-installed light switch) that may be opened and closed in response to actuations of a toggle actuator (not shown) for controlling the power delivered from the AC power source 102 to the lighting devices 112*a*, 112*b* (e.g., for turning on and off the lighting devices 112*a*, 112*b*). The lighting devices 112*a*, 112*b* may be installed in respective ceiling mounted downlight fixtures 114*a*, 114*b* or other lighting fixture mounted to another surface. The wall-mounted load control device 110 may be adapted to be wall-mounted in a standard electrical wallbox.

The remote control device 116 may be configured to transmit messages via the RF signals 106 for controlling the lighting devices 112*a*, 112*b*. For example, the remote control device 116 may be configured to transmit messages to load control devices (e.g., the lighting devices 112*a*, 112*b*) that are within a wireless communication range of the remote control device via the RF signals 106. The remote control device 116 may be powered by a finite power source (e.g., battery-powered).

The remote control device 116 may be a retrofit remote control device mounted over the toggle actuator of the mechanical switch 111. The remote control device 116 may be configured to maintain the toggle actuator of the mechanical switch 111 in the "on" position (e.g., by covering the switch when in the "on" position) to maintain the flow of power from the AC power source 102 to the lighting devices 112*a*, 112*b*. In addition, the remote control device 116 may be mounted to another structure (e.g., other than the toggle actuator of the mechanical switch 111), such a as wall, may be attached to a pedestal to be located on a horizontal surface, or may be handheld. Further, the wall-mounted load control device 110 may comprise a wall-mounted remote control device that replaces the previously-installed mechanical switch 111 and may be configured to operate as the remote control device 116 to control the lighting devices 112*a*, 112*b* (e.g., by transmitting messages via the RF signals 106). Such a wall-mounted remote control device may derive power from the AC power source 102.

The remote control device 116 may comprise an actuation portion 117 (e.g., a "toggle" button) that may be actuated (e.g., pushed in towards the mechanical switch 111) and a rotation portion 118 (e.g., a rotary knob) that may be rotated (e.g., with respect to the mechanical switch 111). The remote control device 116 may be configured to transmit messages including commands for turning the lighting devices 112*a*, 112*b*, 122 on and off in response to actuations (e.g., presses) of the actuation portion 117. Similarly, the remote control device 116 may be configured to transmit messages including commands for adjusting an intensity level (e.g., a lighting level or brightness) of the lighting devices 112*a*, 112*b*, 122 in response to actuations (e.g., rotations) of the rotation portion 118. The messages may include an indication of a fade time $T_{FADE}$. The fade time $T_{FADE}$ may be the period of time over which the lighting devices are to change to the indicated intensity level. Though a rotation portion 118 is disclosed, the remote control device 116 may include another type of intensity adjustment actuator, such as a linear slider, an elongated touch sensitive actuator, a rocker switch, separate raise/lower actuators, or another form of intensity adjustment actuator.

The lighting devices 112*a*, 112*b* may be turned on or off, or the intensity level may be adjusted, in response to the remote control device 116 (e.g., in response to actuations of the actuation portion 117 of the remote control device 116). For example, the lighting devices 112*a*, 112*b* may be toggled on or off by a toggle event identified at the remote control device 116. The toggle event may be a user event identified at the remote control device 116. The actuation portion 117 of the remote control device 116 may be actuated to toggle the lighting devices 112*a*, 112*b* on or off. The rotation portion 118 of the remote control device 116 may be rotated to adjust the intensity levels of the lighting devices 112*a*, 112*b*. The toggle event may be identified when the rotation portion 118 of the remote control device 116 is turned by a predefined amount or for a predefined time, and/or the actuation portion 117 of the remote control device 116 is actuated. The intensity level of the lighting devices 112*a*, 112*b* may be increased or decreased by rotating the rotation portion 118 of the remote control device 116 in one direction or another, respectively. Though shown as comprising a rotary knob in FIGS. 1A and 1B, the remote control device 116 may comprise a paddle switch that may be actuated by a user, a linear control on which a user may swipe a finger, a raise/lower slider, a rocker switch, or another type of control capable of receiving user interface events as commands.

The remote control device 116 may provide feedback (e.g., visual feedback) to a user of the remote control device 116 on a visual indicator, such as a status indicator 119. The status indicator 119 may provide different types of feedback. The feedback may include feedback indicating actuations by a user or other user interface event, a status of electrical loads being controlled by the remote control device 116, and/or a status of the load control devices being controlled by the remote control device 116. The feedback may be displayed in response to user interface event and/or in response to messages received that indicate the status of load control devices and/or electrical loads.

The status indicator 119 may be illuminated by one or more light emitting diodes (LEDs) for providing feedback. The status indicator 119 may be a light bar included around the entire perimeter of the remote control device 116, or a portion thereof. The status indicator 119 may also, or alternatively be a light bar in a line on the remote control device 116, such as when the remote control device is a paddle switch or a linear control, for example.

Example types of feedback may include illumination of the entire status indicator 119 (e.g., to different intensity levels), blinking or pulsing one or more LEDs in the status indicator 119, changing the color of one or more LEDs on the status indicator 119, and/or illuminating different sections of one or more LEDs in the status indicator 119 to provide animation (e.g., clockwise and counter clockwise animation for raising and lowering an intensity level). The feedback on the status indicator 119 may indicate a status of an electrical load or a load control device, such as an intensity level for lights (e.g., lighting devices 112*a*, 112*b*, 122), a volume level for audio devices, a shade level for a motorized window treatment, and/or a speed for fans or other similar types of devices that operate at different speeds. The feedback on the status indicator 119 may change based on the selection of different presets. For example, a different LED or LEDs may be illuminated on the status indicator 119 to identify different presets (e.g., preset intensity levels for the lighting devices 112*a*, 112*b*, 122 and/or other preset configurations for load control devices).

The status indicator 119, or a portion thereof, may be turned on or off to indicate the status of one or more of the lighting devices 112*a*, 112*b*, 122. For example, the status indicator 119 may be turned off to indicate that the lighting devices 112*a*, 112*b*, 122 are in an off state. The entire status indicator, or portion thereof, may be turned on to indicate that the lighting devices 112*a*, 112*b*, 122 are in the on state. The portion of the status indicator 119 that is turned on may indicate the intensity level of one or more of the lighting devices 112*a*, 112*b*, 122. For example, when the lighting devices 112*a*, 112*b*, 122 are at an intensity level of 50%, 50% of the status indicator 119 may be turned on to reflect the intensity level of the lighting devices 112*a*, 112*b*, 122.

The remote control device 116 may transmit digital messages via the RF signals 106 to control the lighting devices 112*a*, 112*b*, 122. The remote control device 116 may be configured to transmit an on command for turning the lighting devices 112*a*, 112*b*, 122 on (e.g., an "on" event). The on command may cause the lighting devices 112*a*, 112*b*, 122 to change to a maximum intensity level (e.g., 100%), to a preset (e.g., predetermined) intensity level, and/or to a previous intensity level (e.g., an "on" event). For example, the on command may cause the lighting devices 112*a*, 112*b*, 122 to turn on to the respective preset intensity levels defined by a scene (e.g., an on scene). A scene may describe the states of one or more load control devices in a load control system. For example, a scene may describe the intensity levels of the lighting devices in a load control device. If a user indicates for a scene to be turned on, the lighting devices may change to the intensity levels defined by the scene. In addition, the remote control device 116 may be configured to transmit an off command for turning the lighting devices 112*a*, 112*b*, 122 off (e.g., 0%). Further, the remote control device 116 may be configured to transmit a toggle command for toggling the state of the lighting devices 112*a*, 112*b*, 122. The toggle command may cause the state of the lighting devices 112_a_, 112_b_, 122 to turn from off to on (e.g., an "on" event), or from on to off (e.g., an "off" event).

The intensity level for an "on" event and/or an "off" event may be stored at the lighting devices 112_a_, 112_b_, 122 and the lighting devices may change to the intensity level upon receiving an indication of the occurrence of the "on" event or "off" event at the remote control device 116. The digital messages may cause an "on" event when the remote control device 116 is rotated for a predefined distance or time in one direction. As an example, the remote control device 116 may transmit digital messages when the remote control device 116 is identified as being rotated for a period of time (e.g., 10 milliseconds (msec), 100 msec, etc.). The digital messages may indicate an "off" event when the remote control device 116 is rotated a predefined distance or time in the opposite direction. The digital messages may indicate an "on" event or an "off" event when the actuation portion 117 of the remote control device 116 is actuated.

The remote control device 116 may be configured to adjust the intensity levels of the lighting devices 112_a_, 112_b_, 122 using absolute control in order to control the intensity levels of the lighting devices 112_a_, 112_b_, 122 to an absolute level (e.g., a specific level). For example, the remote control device 116 may transmit digital messages including a move-to-level command (e.g., a go-to-level or go-to command) that identifies an intensity level to which the lighting devices may change. The move-to-level command may include the amount of time over which the intensity level may be changed at the lighting devices (e.g., the fade time $T_{FADE}$). The move-to-level command may cause an "on" event or an "off" event to turn the lighting devices 112_a_, 112_b_, 122 on or off, respectively. For example, the "on" event may be caused by a move-to-level command with an intensity level of 100%, or another preset intensity level. The "off" event may be caused by a move-to-level command with an intensity level of 0%.

In response to a user interface event (e.g., actuation, rotation, finger swipe, etc.) or a proximity sensing event (e.g., a sensing circuit sensing an occupant near the remote control device 116) at the remote control device 116, the remote control device 116 may determine a starting point (e.g., a dynamic starting point) from which the intensity level of one or more of the lighting devices 112_a_, 112_b_, 122 may be controlled. Each rotation of the rotation portion 118 may cause the remote control device 116 to determine the dynamic starting point from which control may be performed. In response to the user interface event and/or a proximity sensing event (e.g., a sensing circuit sensing an occupant near the remote control device 116), the remote control device 116 may query the lighting devices 112_a_, 112_b_, 122 for a current status (e.g., after awakening from sleep mode). The current status of one or more of the lighting devices 112_a_, 112_b_, 122 may be used to set the dynamic starting point from which the remote control device 116 may perform control. For example, the remote control device 116 may set the dynamic starting point of the rotation portion 118 to the current intensity level (e.g., on, off, 10%, 20%, etc.) of the first of the lighting devices 112_a_, 112_b_, 122 to respond to the query, or a predefined lighting device 112_a_, 112_b_, 122.

In another example, the remote control device 116 may set the dynamic starting point of the rotation portion 118 based on the intensity level of multiple lighting devices 112_a_, 112_b_, 122. The remote control device 116 may set the dynamic starting point of the rotation portion 118 to an average intensity level (e.g., on, off, 10%, 20%, etc.) of the lighting devices 112_a_, 112_b_, 122, or a common intensity level (e.g., on, off, 10%, 20%, etc.) of a majority of the lighting devices 112_a_, 112_b_, 122, for example. The remote control device 116 may set the dynamic starting point of the rotation portion 118 to a maximum level of the lighting devices 112_a_, 112_b_, 122 when the rotation portion 118 is being rotated clockwise to raise the intensity level of the lighting devices, or a minimum level of the lighting devices 112_a_, 112_b_, 122 when the rotation portion 118 is being rotated counterclockwise to lower the intensity level of the lighting devices, for example. The status indicator 119 may be illuminated as feedback to reflect the dynamic starting point to the user. For example, the remote control device 116 may illuminate a portion of the status indicator 119 that reflects the intensity level that is set as the dynamic starting point.

The remote control device 116 may calculate an increase or decrease in intensity level from the dynamic starting point based on the user interface event. For example, the remote control device 116 may calculate an increase or decrease in intensity level based on the distance or amount of time the rotation portion 118 is turned. The rotation from the point of the initial interaction by the user with the rotation portion 118 may be used to identify the increase or decrease in intensity level from the dynamic starting point. When the remote control device 116 includes a linear control, the remote control device 116 may calculate an increase or decrease in intensity level based on the distance or amount of time the user swipes a finger up or down on the linear control. The user's finger swipe from the point of the initial interaction by the user with the linear control may be used to identify the increase or decrease in intensity level from the dynamic starting point.

The updated intensity level may be calculated from the user's initial interaction and stored at the remote control device 116. The updated intensity level may be included in a move-to-level command that is transmitted from the remote control device 116 to the lighting devices 112_a_, 112_b_, 122 when the remote control device 116 is using absolute control.

The visual feedback displayed by the status indicator 119 may be provided in or derived from the information in the move-to-level command when the remote control device 116 is using absolute control. For example, the remote control device 116 may reflect the intensity level transmitted in the move-to-level command in the status indicator 119.

The remote control device 116 may transmit digital messages configured to increase the intensity level of the lighting devices 112_a_, 112_b_, 122 when the rotation portion 118 is rotated in a direction (e.g., clockwise). As previously mentioned, the remote control device 116 may be configured to adjust the intensity levels of the lighting devices 112_a_, 112_b_, 122 to an absolute level using absolute control. In addition, or alternatively, the remote control device 116 may be configured to adjust the intensity levels of the lighting devices 112_a_, 112_b_, 122 using relative control to adjust the intensity levels of the light devices 112_a_, 112_b_, 122 by a relative amount. For example, the remote control device 116 may transmit digital messages configured to decrease the intensity level of the lighting devices 112_a_, 112_b_, 122 when the remote control device 116 is rotated in the opposite direction (e.g., counterclockwise). The digital messages may include a move-with-rate command, which may cause the lighting devices 112_a_, 112_b_, 122 to change their respective intensity level by a predefined amount. The move-with-rate command may include a fade rate (e.g., the rate at which the intensity level may be changed at the lighting devices). The move-with-rate command may cause the lighting devices

112*a*, 112*b*, 122 to retain their relative or proportional intensity levels, and/or difference in respective intensity levels. The remote control device 116 may send digital messages to increase or decrease the intensity level by a predefined amount when rotated a predefined distance or for a predefined time. The amount of the increase or decrease may be indicated in the digital messages or may be predefined at the lighting devices 112*a*, 112*b*, 122.

The digital messages transmitted via the RF signals 106 may be multicast messages. For example, the digital messages including the move-to-level command may be transmitted as multicast messages. The multicast messages may include a group identifier for controlling the lighting devices 112*a*, 112*b*, 122 that are a part of the multicast group. The lighting devices 112*a*, 112*b*, 122 may be a part of the multicast group when they are associated with the group identifier (e.g., by having the group identifier stored thereon) for recognizing multicast messages transmitted to the group. The lighting devices 112*a*, 112*b*, 122 that are associated with the group identifier may recognize the multicast messages and control the corresponding lighting load according to the command in the multicast messages. The lighting devices 112*a*, 112*b*, 122 may forward the multicast messages with the group identifier for identification and load control by other lighting devices associated with the group identifier.

The group may be formed at commissioning or configuration of the load control system 100. The remote control device 116 may generate the group identifier and send the group identifier to the lighting devices 112*a*, 112*b*, 122 and/or a hub device when the remote control device 116 is in an association mode (e.g., entered upon selection of one or more buttons). The devices that store the group identifier may be part of the group of devices that are associated with the remote control device 116 and can respond to group messages.

The remote control device 116 may transmit the digital messages as multicast messages and/or unicast messages via the RF signal 106. For example, the digital messages including the move-with-rate command or the move-to-level command may be transmitted as unicast messages. Unicast messages may be sent from the remote control device 116 directly or via hops to each of the lighting devices 112*a*, 112*b*, 122. The remote control device 116 may individually send a unicast message to each of the lighting devices 112*a*, 112*b*, 122 with which the remote control device 116 is associated for performing load control. The remote control device 116 may have the unique identifier of each of the lighting devices 112*a*, 112*b*, 122 with which it is associated stored in memory. The remote control device 116 may generate a separate unicast message for each lighting device 112*a*, 112*b*, 122 and address the unicast messages to the lighting devices 112*a*, 112*b*, 122 independently. The unicast messages may also include the unique identifier of the remote control device 116. The lighting devices 112*a*, 112*b*, 122 may identify the unicast messages communicated to them by identifying their own unique identifier and/or a corresponding identifier of the remote that are stored in an association dataset. The lighting devices 112*a*, 112*b*, 122 may operate according to the instructions (e.g., load control instructions) in the digital messages comprising their own unique identifier and/or the unique identifier of an associated device, such as the remote control device 116.

The multicast messages may be communicated more efficiently from the remote control device 116, as a single message may be transmitted to multiple lighting devices, such as lighting devices 112*a*, 112*b*, 122, at once. The multicast messages may be more reliable, as the multicast messages may be repeated by a receiving device, such that devices that fail to receive the message due to interference or signal strength may receive the multicast message upon the message being repeated. The load control instructions in the multicast messages may also be received and implemented by multiple lighting devices, such as lighting devices 112*a*, 112*b*, 122, at the same time, or at nearly the same time with a minor delay due to differences in latency, as a single message is being received at a group of devices within the same wireless range. The difference in latency may be overcome by determining the latency at each of the lighting devices and compensating for the difference in latency at each lighting device by delaying the implementation of the load control instructions by the difference in latency. The load control instructions in the unicast messages may be received and implemented by multiple lighting devices 112*a*, 112*b*, 122 at different times, which may be caused by the difference in latency between the devices and/or the time to process and transmit each message, as a different message is being transmitted to each device in a wireless range.

The remote control device 116 may transmit digital messages that include move-with-rate commands (e.g., as unicast messages and/or multicast messages) to increase or decrease the intensity level of the lighting devices 112*a*, 112*b*, 122 in predefined increments as the user turns the remote control device 116 a predefined distance or time in one direction or another. The remote control device 116 may continue to transmit digital messages to the lighting devices 112*a*, 112*b*, 122 as the user continues to turn the remote control device 116. For example, the remote control device 116 may identify a rotation of a predefined distance or for a predefined time and send one or more digital messages to instruct the lighting devices 112*a*, 112*b*, 122 to each increase by ten percent (10%). The remote control device 116 may identify a continued rotation of a predefined distance or time and send digital messages to instruct the lighting devices 112*a*, 112*b*, 122 to increase by ten percent (10%) again.

The remote control device 116 may also, or alternatively, send digital messages for a move-to-level command (e.g., "on" command, "off" command, toggle command, etc.) to turn on/off the lighting devices 112*a*, 112*b*, 122. The remote control device 116 may transmit one or more digital messages to the lighting devices 112*a*, 112*b*, 122 when an on event or an off event are detected. For example, the remote control device 116 may identify a rotation or actuation and send digital messages to instruct the lighting devices 112*a*, 112*b*, 122 to turn on/off. The remote control device 116 may operate by sending a move-with-rate command after turning on. For example, the remote control device 116 may identify a rotation of a predefined distance or time after turning on and send digital messages to instruct the lighting devices 112*a*, 112*b*, 122 to increase/decrease by a predefined intensity level (e.g., approximately 10%).

Embodiments described herein are not limited to remote control devices, but other controller devices may also be used in the same, or similar, manner. For example, embodiments may include wired control devices and/or plug-in control devices that communicate digital messages as described herein.

FIG. 1B shows an example of the load control system 100 having other devices. For example, the load control system 100 may include other control devices, such as controller devices and/or load control devices. The load control devices may be capable of controlling the amount of power provided to a respective electrical load based on digital messages received from the controller devices, which may be input devices. The digital messages may include load control instructions or another indication that causes the load control device to determine load control instructions for controlling an electrical load.

Examples of load control devices may include a motorized window treatment 130 and/or the lighting devices 112*a*, 112*b*, 122, though other load control devices may be implemented. The controller devices may include a remote control device 150, an occupancy sensor 160, a daylight sensor 170, and/or a network device 190, though other controller devices may be implemented. The controller devices may perform communications in a configuration similar to the remote control device 116 as described herein. The load control devices may perform communications in a configuration similar to the lighting devices 112*a*, 112*b*, 122 as described herein.

The load control devices may receive digital messages via wireless signals, e.g., radio-frequency (RF) signals 106 (e.g., ZIGBEE®; NFC; BLUETOOTH®; WI-FI®; or a proprietary communication channel, such as CLEAR CONNECT™, etc.). The wireless signals may be transmitted by the controller devices. In response to the received digital messages, the respective lighting devices 112*a*, 112*b*, 122 may be turned on and off, and/or the intensity levels of the respective lighting devices 112*a*, 112*b*, 122 may be increased or decreased. In response to the received digital messages, the motorized window treatment 130 may increase or decrease a level of a covering material 134.

The battery-powered remote control device 150 may include one or more actuators 152 (e.g., one or more of an on button, an off button, a raise button, a lower button, or a preset button). The battery-powered remote control device 150 may transmit RF signals 106 in response to actuations of one or more of the actuators 152. The battery-powered remote control device 150 may be handheld. The battery-powered remote control device 150 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

The remote control device 150 may be a wireless device capable of controlling a load control device via wireless communications. The remote control device 150 may be attached to the wall or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY-POWERED REMOTE CONTROL WITH LABEL SERVING AS ANTENNA ELEMENT; and U.S. Patent Application Publication No. 2014/0132475, published May 15, 2014, entitled WIRELESS LOAD CONTROL DEVICE, the entire disclosures of which are hereby incorporated by reference.

The occupancy sensor 160 may be configured to detect occupancy and/or vacancy conditions in the space in which the load control system 100 is installed. The occupancy sensor 160 may transmit digital messages to load control devices via the RF communication signals 106 in response to detecting the occupancy or vacancy conditions. The occupancy sensor 160 may operate as a vacancy sensor, such that digital messages are transmitted in response to detecting a vacancy condition (e.g., digital messages may not be transmitted in response to detecting an occupancy condition). The occupancy sensor 160 may enter an association mode and may transmit association messages via the RF communication signals 106 in response to actuation of a button on the occupancy sensor 160. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 170 may be configured to measure a total light level in the space in which the load control system 100 is installed. The daylight sensor 170 may transmit digital messages including the measured light level via the RF communication signals 106 for controlling load control devices in response to the measured light level. The daylight sensor 170 may enter an association mode and may transmit association messages via the RF communication signals 106 in response to actuation of a button on the daylight sensor 170. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The motorized window treatment 130 may be mounted in front of a window for controlling the amount of daylight entering the space in which the load control system 100 is installed. The motorized window treatment 130 may include, for example, a cellular shade, a roller shade, a drapery, a Roman shade, a Venetian blind, a Persian blind, a pleated blind, a tensioned roller shade systems, or other suitable motorized window covering. The motorized window treatment 130 may include a motor drive unit 132 for adjusting the position of a covering material 134 of the motorized window treatment 130 in order to control the amount of daylight entering the space. The motor drive unit 132 of the motorized window treatment 130 may have an RF receiver and an antenna mounted on or extending from a motor drive unit 132 of the motorized window treatment 130. The motor drive unit 132 may respond to digital messages to increase or decrease the level of the covering material 134. The motor drive unit 132 of the motorized window treatment 130 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,115,537, issued Aug. 25, 2015, entitled BATTERY-POWERED ROLLER SHADE SYSTEM, the entire disclosures of which are hereby incorporated by reference Digital messages transmitted by the controller devices may include a command and/or identifying information, such as a serial number (e.g., a unique identifier) associated with the transmitting controller device. Each of the controller devices may be associated with the lighting devices 112*a*, 112*b*, 122 and/or the motorized window treatment 130 during a configuration procedure of the load control system

100, such that the lighting devices 112*a*, 112*b*, 122 and/or the motorized window treatment 130 may be responsive to digital messages transmitted by the controller devices via the RF signals 106. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Pat. No. 9,368,025, issued Jun. 14, 2016, entitled TWO-PART LOAD CONTROL SYSTEM MOUNTABLE TO A SINGLE ELECTRICAL WALLBOX, the entire disclosures of which are hereby incorporated by reference.

The load control system 100 may include a hub device 180 (e.g., a system bridge or system controller) configured to enable communication with a network 182, e.g., a wireless or wired local area network (LAN). For example, the hub device 180 may be connected to a network router (not shown) via a wired digital communication link 184 (e.g., an Ethernet communication link). The network router may allow for communication with the network 182, e.g., for access to the Internet. The hub device 180 may be wirelessly connected to the network 182, e.g., using wireless technology, such as WI-FI® technology, cellular technology, etc. The hub device 180 may be configured to transmit communication signals (e.g., RF signals 106) to the lighting devices 112*a*, 112*b*, 122 and/or the motorized window treatment 130 for controlling the devices in response to digital messages received from external devices via the network 182. The hub device 180 may communicate via one or more types of RF communication signals (e.g., ZIGBEE®; THREAD®; NFC; BLUETOOTH®; WI-FI®; cellular; a proprietary communication channel, such as CLEAR CONNECT™, etc.). The hub device 180 may be configured to transmit and/or receive RF signals 106 (e.g., using ZIGBEE®; THREAD®; NFC; BLUETOOTH®; or a proprietary communication channel, such as CLEAR CONNECT™, etc.). The hub device 180 may be configured to transmit digital messages via the network 182 for providing data (e.g., status information) to external devices.

The RF signals 106 may be transmitted via one or more protocols. For example, the remote control device 116 and the remote control device 150 may communicate digital messages to lighting devices 112*a*, 112*b*, 122 via another protocol (e.g., ZIGBEE®, THREAD®, BLUETOOTH®, etc.) than other devices. For example, the occupancy sensor 160, daylight sensor 170, and/or motorized window treatment 130 may communicate via a proprietary communication channel, such as CLEAR CONNECT™. The hub device 180 may format digital communications using the appropriate protocol for the device. The hub device 180 may communicate using multiple protocols.

The hub device 180 may operate as a central controller for the load control system 100, and/or relay digital messages between the control devices (e.g., lighting devices, motorized window treatments, etc.) of the load control system and the network 182. The hub device 180 may receive digital messages from a controller device and configure the digital message for communication to a load control device. For example, the hub device 180 may configure multicast messages and/or unicast messages for transmission as described herein. The hub device 180 may be on-site at the load control system 100 or at a remote location. Though the hub device 180 is shown as a single device, the load control system 100 may include multiple hubs and/or the functionality thereof may be distributed across multiple devices.

The load control system 100 may include a network device 190, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® hand-held computing device), a WI-FI® or wireless-communication-capable television, or any other suitable network communication or Internet-Protocol-enabled device. The network device 190 may be operable to transmit digital messages in one or more Internet Protocol packets to the hub device 180 via RF signals 108, either directly or via the network 182. For example, the network device 190 may transmit the RF signals 108 to the hub device 180 via a WI-FI® communication link, a WIMAX® communications link, a BLUETOOTH® communications link, a near field communication (NFC) link, a cellular communications link, a television white space (TVWS) communication link, or any combination thereof. The RF signals 108 may be communicated using a different protocol and/or wireless band than the RF signals 106. For example, the RF signals 108 may be configured for WI-FI® communication or cellular communication, while RF signals 106 may be configured for ZIGBEE®, THREAD®, BLUETOOTH®, or a proprietary communication channel, such as CLEAR CONNECT™. In another example, the RF signals 108 and the RF signals 106 may be the same. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 190 may include a visual display 192. The visual display 192 may include a touch screen that may include, for example, a capacitive touch pad displaced overtop the visual display, such that the visual display may display soft buttons that may be actuated by a user. The network device 190 may include a plurality of hard buttons, e.g., physical buttons (not shown), in addition to the visual display 192. The network device 190 may download a product control application for allowing a user of the network device 190 to control the load control system 100. In response to actuations of the displayed soft buttons and/or hard buttons, the network device 190 may transmit digital messages to the load control devices and/or the hub device 180 through the wireless communications described herein.

The operation of the load control system 100 may be programmed and configured using the hub device 180 and/or network device 190. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The lighting devices 112*a*, 112*b*, 122 may each be included in a group of lighting devices that are associated with a common control device, such as the remote control device 116. For example, each of the lighting devices 112*a*, 112*b*, 122 may store the unique identifier of the remote control device 116 during an association mode to enable the lighting devices 112*a*, 112*b*, 122 to be controlled by digital messages from the remote control device 116 that include control instructions. The hub device 180 may store the associations between each of the lighting devices 112*a*,

112*b*, 122 and the remote control device 116 during an association mode. The association information may be used by the hub device 180 for routing digital messages to the lighting devices 112*a*, 112*b*, 122, or the lighting devices 112*a*, 112*b*, 122 may receive digital messages from the remote control device 116 directly.

The remote control device 116 may be configured to transmit messages to the lighting devices 112*a*, 112*b*, 122 via the hub device 180. For example, the remote control device 116 may be configured to transmit unicast messages to the hub device 180. The hub device 180 may be configured to transmit an acknowledgement message to the remote control device 116 in response to receiving a unicast message from the remote control device 116. The hub device 180 may be configured to transmit unicast and/or multicast messages to the lighting devices 112*a*, 112*b*, 122 for controlling the lighting devices in response to the unicast message received from the remote control device 116. For example, the remote control device 116 may transmit a message including a toggle command or an on/off command (e.g., an "on" command or an "off" command) for controlling the lighting devices 112*a*, 112*b*, 122 to toggle the lighting devices 112*a*, 112*b*, 122 from an "on" state to an "off" state, or vice versa. The remote control device 116 may transmit a unicast message including the toggle command or the on/off command to the hub device 180, which may transmit a multicast message that is received at each of the lighting devices 112*a*, 112*b*, 122. The remote control device 116 may transmit a unicast message including a move-to-level command or a move-with-rate command to the hub device 180, which may transmit unicast messages that are independently directed to each of the lighting devices 112*a*, 112*b*, 122.

The remote control device 116 may use the intensity level of a lighting device as a starting point (e.g., a dynamic starting point) upon which dimming is performed for the group of lighting devices 112*a*, 112*b*, 122. For example, in response to the query from the remote control device 116, the lighting device 112*a* may respond that it is at an intensity level of 10%. The remote control device 116 may set the intensity level identified by the lighting device 122 as the dynamic starting point upon which control of the intensity level for the group of lighting devices 112*a*, 112*b*, 122 may be performed. The remote control device 116 may identify a continued rotation for increasing the intensity level by an additional 20%. The remote control device 116 may add this 20% to the dynamic starting point of 10% that was indicated as the current intensity level of the lighting device 112*a* that responded to the previous query message from the remote control device 116. The remote control device 116 may send a digital message to the group of lighting devices 112*a*, 112*b*, 122 to control the group of lighting devices 112*a*, 112*b*, 122 to an absolute intensity level of 30%. The digital message may include a move-to-level (e.g., go-to-level) command that is configured to control each of the lighting devices 112*a*, 112*b*, 122 to a 30% intensity level. Each of the lighting devices 112*a*, 112*b*, 122 may receive the digital message (e.g., as a unicast message or a multicast message) and be controlled to the absolute intensity level of 30%, unless the lighting device is already at the indicated intensity level. When the group of lighting devices 112*a*, 112*b*, 122 are in the same state, the group of lighting devices 112*a*, 112*b*, 122 may be controlled as a group. For example, the group of lighting devices 112*a*, 112*b*, 122 may be controlled together from 10% to 30%. When the state of the group of lighting devices 112*a*, 112*b*, 122 is out of sync, the lighting devices 112*a*, 112*b*, 122 may be controlled differently to reach the indicated intensity level. For example, the lighting devices 112*a*, 112*b*, 122 that are above the indicated intensity level may decrease in intensity level to meet the indicated intensity level. The lighting devices 112*a*, 112*b*, 122 that are below the indicated intensity level may increase in intensity level to meet the indicated intensity level. The lighting devices 112*a*, 112*b*, 122 that are already in the state indicated in the digital message may go unchanged in response to the digital message from the remote control device 116.

The lighting devices 112*a*, 112*b*, 122 may fade from one intensity level to another intensity level (e.g., be dimmed between intensity levels over a fade time $T_{FADE}$ and/or at a fade rate) in response to receiving a command. For example, the lighting devices 112*a*, 112*b*, 122 may be dimmed at a rate or over a period of time such that each of the lighting devices 112*a*, 112*b*, 122 that is not already at the indicated intensity level reaches the intensity level at the same time. For example, the remote control device 116 may send the move-to-level command with an amount of time over which the lighting devices 112*a*, 112*b*, 122 are to be dimmed until the lighting devices 112*a*, 112*b*, 122 reach the indicated intensity level (e.g., a fade time $T_{FADE}$). For example, different fade times may be transmitted to each of the lighting devices 112*a*, 112*b*, 122. The lighting devices 112*a*, 112*b*, 122 may be dimmed over the indicated period of time to the intensity level indicated in the move-to-level command. When one or more of the lighting devices 112*a*, 112*b*, 122 are at different intensity levels, the lighting devices 112*a*, 112*b*, 122 may be sent unicast messages with different fade rates such that the lighting devices 112*a*, 112*b*, 122 at different intensity levels reach the intensity level indicated in the go-to-level command at the same time. The fade time $T_{FADE}$ may vary in a predetermined amount for each amount the intensity level may be increased or decreased.

The hub device 180 may operate as a parent device (e.g., a master device) that may be configured to monitor the state of child devices (e.g., slave devices), such as lighting devices 112*a*, 112*b*, 122, and determine the appropriate command to be transmitted in response to a user interface event based on the state of the slave devices. Though the hub device 180 may be described herein as being a master device for controlling a group of lighting devices, other control devices (e.g., one of the lighting devices 112*a*, 112*b*, 122, remote control device 150, occupancy sensor 160, daylight sensor 170, network device 190, motorized window treatment 132, a remote computing device, etc.) may be assigned as a master device that operates as described herein for the hub device 180. When a lighting device 112*a*, 112*b*, 122 is assigned as the master device, the lighting device 112*a*, 112*b*, 122 may already know its own state, but may monitor the state of other slave devices. Though other devices may operate as the master device, they may still communicate via the hub device 180.

The hub device 180 may keep track of the on/off state of each of the lighting devices 112*a*, 112*b*, 122 after being implemented in the load control system 100. Upon initial implementation into the load control system, the hub device 180 may query the lighting devices 112*a*, 112*b*, 122 for their current on/off state. The query message may be sent as a multicast message, or individual unicast messages, to each of the lighting devices 112*a*, 112*b*, 122. The lighting devices 112*a*, 112*b*, 122 may return the current on/off state, which may be stored locally thereon. The hub device 180 may identify commands communicated to the lighting devices 112*a*, 112*b*, 122 and maintain the current on/off state of the lighting devices 112*a*, 112*b*, 122 in memory. The digital messages that are communicated to the lighting devices 112$a$, 112$b$, 122 for controlling the on/off state may be monitored to determine the current on/off state, without sending an initial query message. The hub device 180 may be powered and/or awake at all times (e.g., at times that the lighting devices 112$a$, 112$b$, 122 are also powered), such that the hub device is able to monitor the states of the lighting devices by listening to the messages transmitted by the lighting devices. In addition, the hub device 180 may enter a sleep mode and periodically wake up to transmit query messages to the lighting devices 112$a$, 112$b$, 122 to determine the on/off states of the lighting devices.

When the hub device 180 receives an indication of a toggle event from the remote control device 116, the hub device 180 may choose the command to send, or whether to send a command, to the lighting devices 112$a$, 112$b$, 122. The decision at the hub device 180 may be based on the current on/off state of the lighting devices 112$a$, 112$b$, 122. The hub device 180 may identify whether the on/off state across the group of lighting devices 112$a$, 112$b$, 122 is consistent. If the on/off state across the group of lighting devices 112$a$, 112$b$, 122 is consistent, the hub device 180 may send the toggle command, or an "on" command or "off" command, to the lighting devices 112$a$, 112$b$, 122 to toggle the on/off state of the group of lighting devices 112$a$, 112$b$, 122.

The lighting devices 112$a$, 112$b$, 122 that change an on/off state in response to an "on" command or an "off" command may send a state update message to the hub device 180 to indicate the change in on/off state. The hub device 180 may receive the state update message from the lighting devices 112$a$, 112$b$, 122 that change state in response to the received "on" command or the received "off" command. The lighting devices that fail to change the on/off state in response to the command from the hub device 180 may be unresponsive. For example, the hub device 180 may send an "off" command to the lighting devices 112$a$, 112$b$, 122 and the lighting device 122 may update the on/off state to the "off" state. The lighting device 122 may send a response message to the hub device 180 to indicate the change in state. The hub device 180 may store the updated state and/or confirm the state of the unresponsive devices. The hub device 180 may, alternatively, store the updated state of the lighting device 122 after sending the command. As the hub device 180 may be maintaining the on/off state of the lighting devices 112$a$, 112$b$, 122, the remote control device 116 may go to sleep after transmitting a message in response to the toggle event.

FIGS. 2A-2D show front views of a remote control device 202 with a status indicator 203 that may be illuminated to provide the feedback described herein. The remote control device 202 may comprise an actuation portion 204 and a rotation portion 206. The remote control device 202 may comprise an internal rotational position sensing circuit (not shown), e.g., a magnetic sensing circuit, such as a Hall-effect sensor circuit, for determining the rotational speed and direction of rotation of the rotation portion 206. The remote control device 202 may comprise one or more magnetic elements, e.g., a circular magnetic element, such as a magnetic ring (not shown) coupled to an inner surface of the rotation portion 206. The magnetic ring may include a plurality of alternating positive north-pole sections and negative south-pole sections. The rotational position sensing circuit may be configured to generate one or more rotational position sensing signals that have rising and falling edges as the positive north-pole sections and negative south-pole sections of the magnetic ring pass the rotational position sensing circuit. The remote control device 202 may be configured to determine a position and/or an amount of rotation of the rotation portion 206 in response to the edges of the rotational position sensing signals.

Figure 2B:
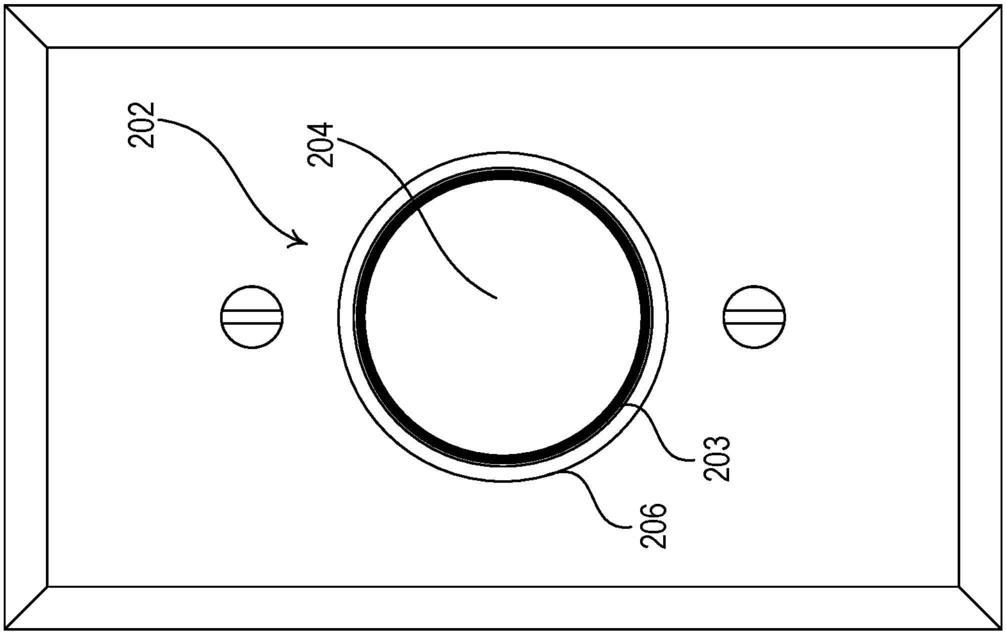
FIGS. 2A-2D are front views of a remote control device with a status indicator (e.g., a visual indicator) that may be illuminated to provide feedback (e.g., visual feedback).
Figure 2A:
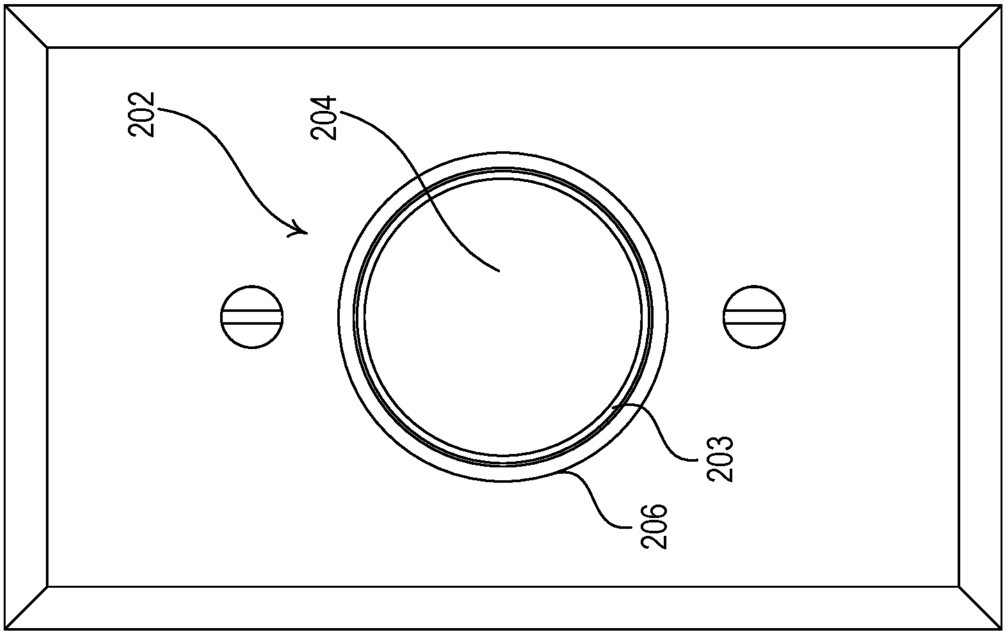

As shown in FIG. 2A, the remote control device 202 may be configured to provide the feedback after the remote control device 202 has been activated. For example, the remote control device 202 may be configured to provide the feedback upon detecting a user near the control device and/or upon a user interface event being detected on a user interface of the remote control device 202. The user interface event may be an actuation of the actuation portion 204 or a rotation of the rotation portion 206. The feedback may indicate that the remote control device 202 is transmitting wireless communication signals (e.g., RF signals) in response to the activation. The remote control device 202 may keep the status indicator 203 illuminated for the duration of the event that triggered the feedback (e.g., while the rotation portion 206 is being rotated). The remote control device 202 may be configured to continue to illuminate the status indicator 203 for a few seconds (e.g., 1-2 seconds) after the event, and then turn off the status indicator 203 to conserve battery life.

The status indicator 203 may be unlit (e.g., as shown in FIG. 2A) to provide feedback that the load control devices associated therewith are off. The LEDs in the status indicator 203 may be turned on to a full intensity level (e.g., as shown in FIG. 2B) when the load control devices associated therewith are on or a user interface event is detected. For example, the load control devices may be turned on in response to a toggle event recognized by actuating the actuation portion 204 or rotating the rotation portion 206. The LEDs in the status indicator 203 may be turned on to a full intensity level to reflect intensity level of the loads controlled by a load control device. For example, the status indicator 203 may reflect a high-end dimming level for lights, a fully-open or fully-closed position for shades, a full volume level for audio devices, a full speed for a fan, etc. When the actuation portion 204 is pressed, the status indicator 203 may blink between the two states shown in FIGS. 2A and 2B to provide feedback that the actuation portion 204 was pressed and the remote control device 202 is working.

Figure 2D:
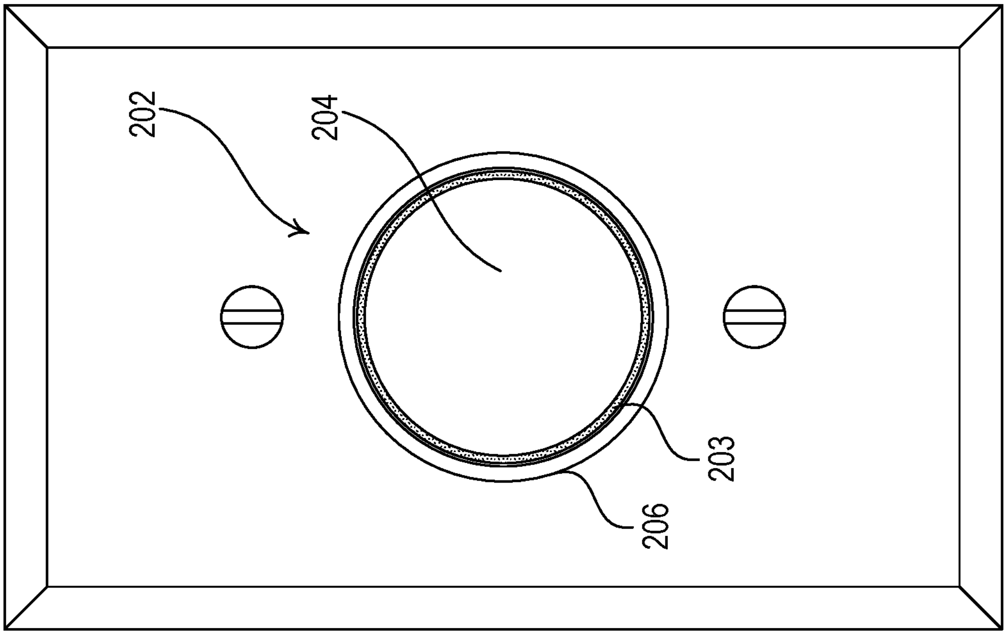

The status indicator 203 may be illuminated to provide the feedback in different manners (e.g., different intensity levels and/or colors) when the rotation portion 206 is being rotated. For example, as shown in FIG. 2A, the status indicator 203 may be fully illuminated to and maintained at a maximum light bar intensity $L_{LB\text{-}MAX}$ (e.g., 100%) when the rotation portion 206 is being rotated clockwise or counterclockwise (e.g., to increase or decrease the intensity of lighting loads, shade levels, fan speed, volume, etc.) to provide simple feedback. As another example shown in FIG. 2C, for example, the status indicator 203 may be illuminated to a first mid-level light bar intensity $L_{LB\text{-}MID1}$ (e.g., 80%) that is less than the maximum light bar intensity $L_{LB\text{-}MAX}$ when the rotation portion 206 is being rotated clockwise (e.g., to raise the intensity of lighting load loads, shade levels, fan speed, volume, etc.) to provide simple feedback that the rotation portion 206 is being rotated. As shown in FIG. 2D, for example, the status indicator 203 may be illuminated to a second mid-level light bar intensity $L_{LB\text{-}MID2}$ (e.g., 40%) that is less than the first mid-level light bar intensity $L_{LB\text{-}MID1}$ (and thus less than the maximum light bar intensity $L_{LB\text{-}MAX}$) when the rotation portion 206 is being rotated counterclockwise (e.g., to lower the intensity of the lighting loads, shade level, volume, etc.) to provide simple feedback that the rotation portion 206 is being rotated.

Similarly, the status indicator 203 may be illuminated with different colors to indicate different user inputs and/or the status of electrical loads or load control devices. For example, the status indicator 203 may be illuminated with different colors to indicate that the intensity of a lighting load is being raised or lowered, a shade level is being raised or lowered, and/or a volume level is being raised or lowered. The status indicator 203 may be illuminated with a red color when an intensity level is being raised and with a blue color when the intensity level is being lowered.

Figure 2C:
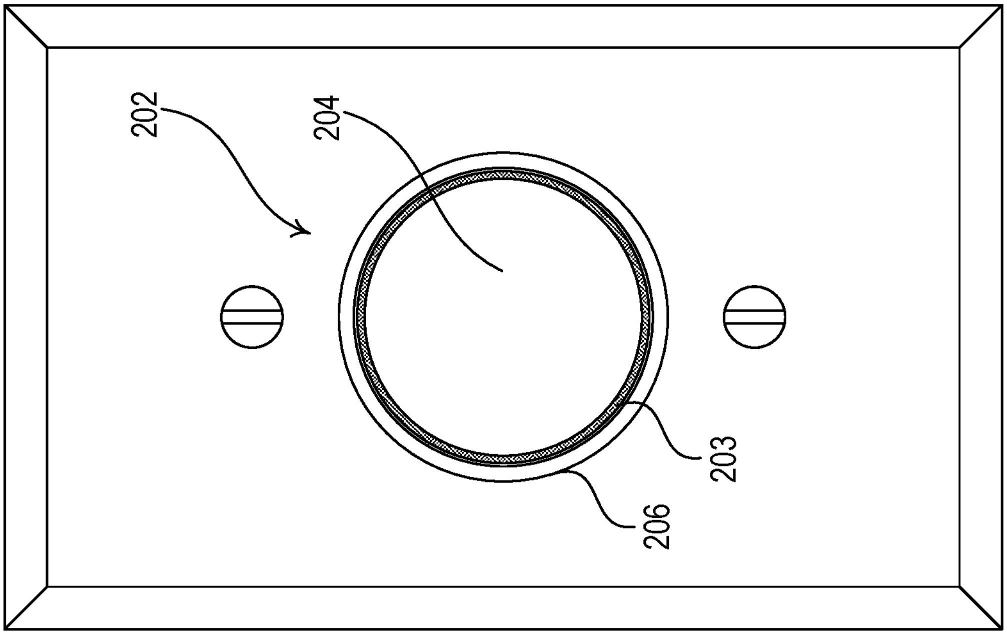
Figure 3:
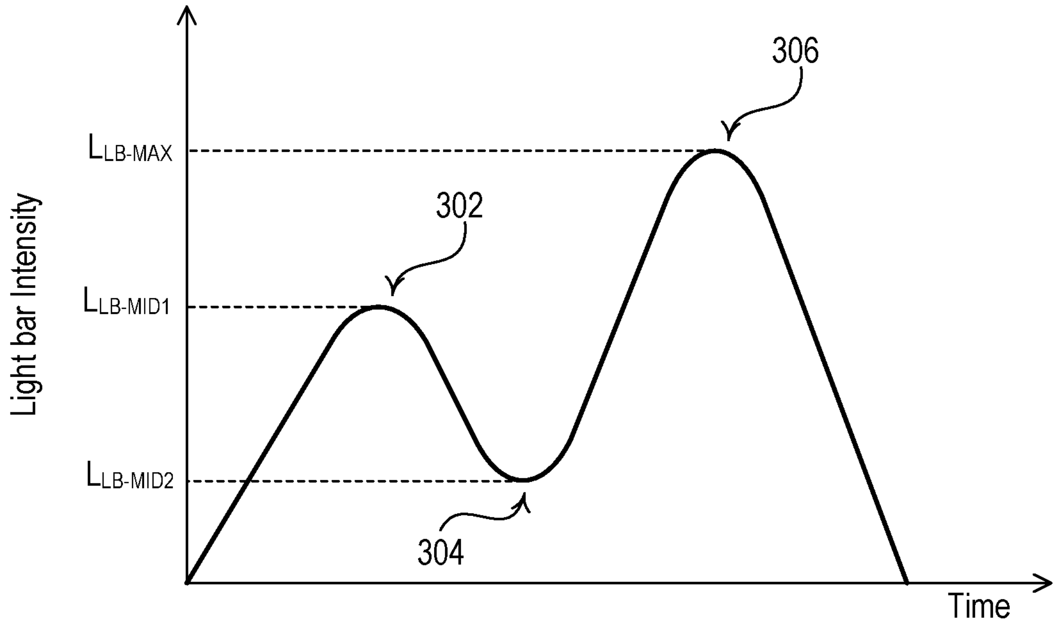
FIG. 3 is a graph that shows an example plot of the intensity level of the status indicator in order to generate an animation.

The status indicator 203 may be illuminated in response to an actuation of the actuation portion 204 to indicate that an electric load is being toggled on or off. For example, the status indicator 203 may be illuminated to display an animation (e.g., a heartbeat animation) when a lighting load is being toggled on or off to provide simple feedback that the actuation portion 204 has been actuated. FIG. 3 shows an example plot of the intensity of the status indicator 203 with respect to time in order to generate the animation. For example, the intensity of the status indicator 203 may be increased to a first intensity 302 over a period of time (e.g., the first mid-level light bar intensity $L_{LB\text{-}MID1}$ as shown in FIG. 2C), decreased to a second intensity 304 over a period of time (e.g., the second mid-level light bar intensity $L_{LB\text{-}MID2}$ as shown in FIG. 2D), increased to a third intensity 306 over a period of time (e.g., the maximum light bar intensity $L_{LB\text{-}MAX}$ as shown in FIG. 2B), and then turned off. When the remote control device 202 is operating in a spin-to-off mode, the status indicator 203 may be illuminated to display an animation (e.g., the heartbeat animation described herein) when the intensity of the lighting load has reached a minimum intensity and is being turned off.

The status indicator 203 may be illuminated to further indicate an amount of power being supplied to an electrical load. For example, instead of illuminating the entire light bar of the status indicator 203, the remote control device 202 may illuminate a portion of the status indicator 203, and adjust the length of the illuminated portion in accordance with control applied by a user. For example, when the light bar of the status indicator 203 is configured to have a circular shape, the illuminated portion may expand or contract around the circumference of the light bar in response to user interface events and/or adjustments in the status of electrical loads. The remote control device 202 may adjust the intensity of the LED that is illuminating an end point of the illuminated portion of the status indicator 203 to provide adjustment of the end point of the illuminated portion as is described in greater detail herein.

Figure 4:
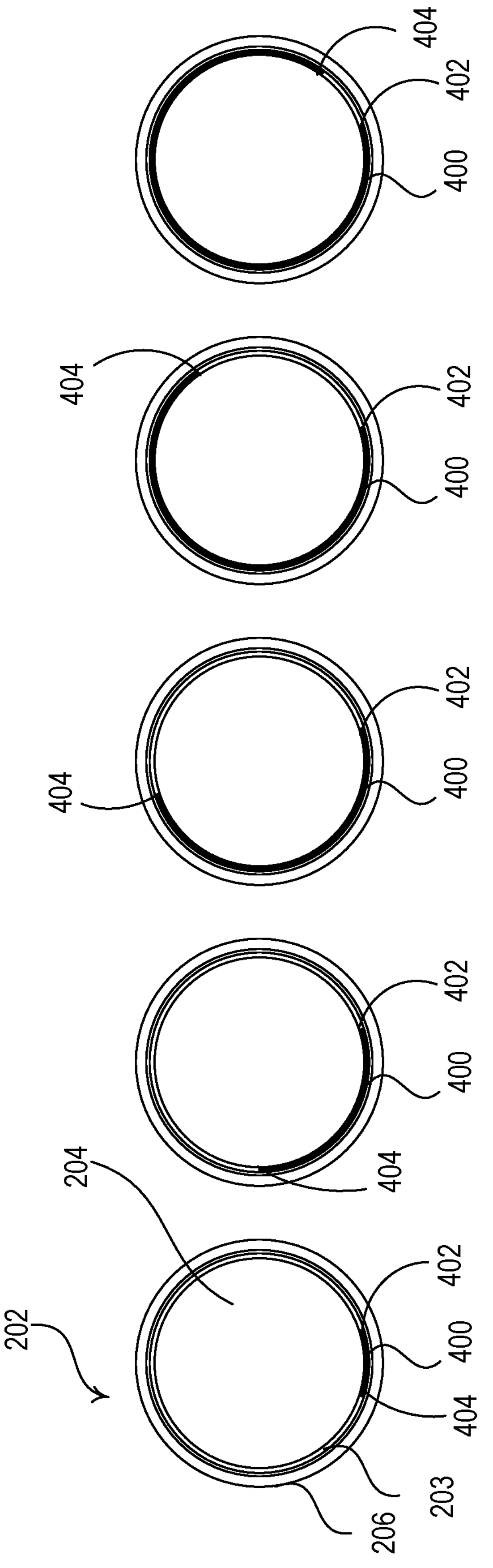
FIG. 4 shows front views of a remote control device with a status indicator that may be illuminated to provide feedback.

FIG. 4 shows front views of the remote control device 202 when the status indicator 203 is illuminated to expand and contract in one direction to provide feedback (e.g., advanced feedback) that indicates the intensity of an electrical load. For example, the sequence shown in FIG. 4 may be used to illustrate an intensity level of a lighting load or of the volume of an audio device as the intensity level increases (e.g., moving from left to right through the illumination configurations shown in FIG. 4) or decreases (e.g., moving from right to left through the illumination configurations shown in FIG. 4).

The remote control device 202 may include a plurality of light sources (e.g., LEDs) configured to illuminate the status indicator 203. In response to an actuation of the remote control device 202 to adjust the intensity level of the lighting load or the volume of the audio device, the remote control device 202 may illuminate a subset of the light sources such that a portion 400 of the status indicator 203 is illuminated to indicate the intensity level corresponding to the actuation. The illuminated portion 400 may begin at a starting point 402 (e.g., at the bottom of the status indicator 203 as shown in FIG. 4) and end at an end point 404 (e.g., along the circumference of the status indicator 203). The length and/or intensity level of the illuminated portion 400 may be indicative of the intensity level of a lighting load or of a volume of an audio device. The subset of light sources may be illuminated uniformly to a common intensity level. Alternatively, the subset of light sources may be illuminated to different intensity levels. For example, the remote control device 202 may illuminate the end point 404 of the illuminated portion 400 of the status indicator 203 to a higher intensity level than the rest of the illuminated portion and may decrease the intensity level of the illuminated portion towards the starting point 402. For example, the illuminated portion 400 of the status indicator 203 may display a gradient from the brightest intensity level at the end point 404 to the dimmest intensity level at the starting point 402. This way, a user may still receive feedback based on the length of the illuminated portion, but less battery power may be consumed to provide the feedback. Alternatively, the dimmest intensity level may be between the end point 404 and the starting point 402.

To illustrate, the remote control device 202 may be configured to increase the length of the illuminated portion 400 (e.g., cause the end point 404 of the illuminated portion to move in a clockwise direction as shown in FIG. 4) when the intensity level of the lighting load or of the volume of the audio device is being raised. The remote control device 202 may be configured to decrease the length of the illuminated portion 400 (e.g., cause the end point 404 of the illuminate portion to move in a counterclockwise direction as shown in FIG. 4) when the intensity level of the lighting load or of the volume of the audio device is being lowered. This way, the illuminated portion 400 may expand and contract as the intensity level of the lighting load or of the volume of the audio device is adjusted.

The illuminated portion 400 may increase and decrease in size gradually or step between predefined segments that indicate a given intensity level. For example, the status indicator 203 may step between illuminated segments to indicate that the present intensity level of a lighting load is approximately 30%, approximately 60%, and approximately 90%, though the status indicator may be illuminated at any number of steps having a difference that is equivalent or inequivalent. When the lighting load or the volume is at a full intensity level (e.g., approximately full intensity level), the entire status indicator 203 may be illuminated. When the remote control device 202 is configured to control multiple lighting loads or audio devices, and set respective intensity levels of the multiple loads to different values, the remote control device 202 may be configured to illuminate the status indicator 203 to indicate an average of the respective intensity levels of the loads, to indicate the intensity level of a lighting load or audio device nearest to the remote control device 202, and/or the like.

In some examples, the remote control device 202 may be configured to adjust the intensity of the light source illuminating the end point 404 of the illuminated portion 400 to provide fine-tune adjustment of the position of the end point 404. For example, the remote control device 202 may adjust the intensity level of the light source that illuminates the end point 404 between 1% and 100% to provide fine-tune adjustment of the position of the end point 404. To illustrate, the remote control device 202 may illuminate the status indicator 203 to a length that indicates the intensity level of the lighting load or of the volume of the audio device controlled by the remote control device 202 is at approximately 30%. At that point, the intensity level of the light source illuminating the end point 404 may be set at 1%. As the intensity level of the lighting load or of the volume of the audio device is further adjusted toward 40%, the remote control device 202 may adjust the intensity level of the end point 404 between 1% and 100% with finer granularity to correspond to respective intermediate intensity levels that are between 30% and 40%. After the intensity level of the lighting load or of the volume of the audio device reaches 40%, the remote control device 202 may illuminate an additional light source (e.g., to an intensity level of 1%) to cause the length of the illuminated portion 400 to expand. The remote control device 202 may then adjust the intensity level of the additional light source that is now illuminating the end point 404 between 1% and 100% as the intensity level of the lighting load is being tuned towards a next level (e.g., 50%).

The remote control device 202 may be configured to indicate a last-known intensity level of the lighting load or of the volume of the audio device upon receiving a user interface event to turn on the lighting load or audio device, respectively. For example, before the lighting load or audio device was turned off, the remote control device 202 may store the intensity level in a memory of the remote control device 202 while decreasing the length of the illuminated portion 400 from the end point 404 to the starting point 402 over a period of time. Subsequently, when the remote control device 202 is actuated to turn the lighting load or audio device back on, the remote control device 202 may illuminate the status indicator 203 to increase the length of the illuminated portion 400 to correspond to the previously stored intensity level over a period of time.

In the examples described herein, the display of the illuminated portion 400 may be obstructed by a user's fingers that are manipulating the remote control device 202. For instance, as the user rotates the rotation portion 206 of the remote control device 202 to adjust the intensity level of the lighting load or of the volume of the audio device, the user's hand may block the leading edge (e.g., the end point 404) of the illuminated portion 400. As a result, the user may not be able to determine whether the illuminated portion is expanding and contracting in response to the rotational movement of the rotation portion 206, and whether the intensity level of the electrical load is being adjusted properly.

The remote control device 202 may control the manner in which the status indicator 203 is illuminated to reduce the likelihood that a user's action may interfere with the feedback indication. For example, the remote control device 202 may be configured to cause the end point 404 of the illuminated portion 400 (e.g., as shown in FIG. 4) to move at a faster or slower angular speed than that of the rotation portion 206 when the rotation portion is rotated. To illustrate, a user may, within a unit of time, rotate the rotation portion 206 by x degrees in order to adjust the intensity level (e.g., raise or lower) of the lighting load or of the volume of the audio device. In response, the remote control device 202 may, within the same unit of time, cause the end point 404 of the illuminated portion 400 to move by x+y or x−y degrees (e.g., in clockwise or counterclockwise direction) such that the leading edge of the illuminated portion 400 represented by the end point 404 may move faster than (e.g., ahead of) or slower than (e.g., lagging behind) the user's hand. This way, despite obstruction by a user's hand, the user may still notice changes in the illuminated portion 400 to know that control is being applied properly.

When the end point 404 of the illuminated portion 400 is configured to move faster than (e.g., ahead of) the rotation portion 206, the remote control device 202 may scale the full intensity level range of the lighting load or of the volume of the audio device over less than a 360-degree rotation of the rotation portion 206 so that the illuminated portion 400 may expand or contract over the entire circumference of status indicator 203 as the intensity level of the lighting load or of the volume of the audio device is being adjusted between the low-end and high-end of an intensity level range. For example, the remote control device 202 may be configured to scale the full intensity level range of the lighting load or of the volume of the audio device over a 210-degree rotation of the rotation portion 206, such that when a rotational movement of the rotation portion 206 reaches 210 degrees, the illuminated portion 400 may cover the entire circumference of the status indicator 203 (e.g., 360 degrees) to indicate that the intensity level of the lighting load or of the volume of the audio device has reached a maximum intensity level. Such a technique may also reduce the amount of rotation used to adjust the intensity level of the lighting load or of the volume of the audio device between the low-end and the high-end. For example, the user may be able to adjust the intensity level over a greater range with less wrist movement.

The remote control device 202 may be configured to illuminate a portion of the status indicator 203 and cause the length of the illuminated portion 400 to expand and contract (e.g., simultaneously from both end points 402, 404 of the illuminated portion 400) to indicate the intensity level of the lighting load or of the volume of an audio device. The illuminated portion may be illuminated uniformly to a common intensity level. Alternatively, different sections of the illuminated portion may be illuminated to different intensity level. For example, the end point 404 of the illuminated portion of the status indicator 400 may be illuminated to a higher intensity level than the rest of the illuminated portion and the intensity level of the illuminated portion 400 may be decreased towards the starting point 402. This way, a user may still receive feedback based on the length of the illuminated portion, but less battery power may be consumed to provide the feedback.

A remote control device (e.g., the remote control device 202) may be configured to provide feedback in response to an adjustment in the intensity levels of lighting devices using relative control (e.g., relative feedback). Relative feedback may be provided via a status indicator of the remote control device (e.g., status indicator 203). The relative feedback may depend on a command used to control lighting devices (e.g., a user interaction event). For example, in response to a clockwise rotation of a rotation portion (e.g., the rotation portion 206) to raise the intensity levels of the lighting devices (e.g., a raise command), the remote control device may be configured to provide relative feedback by illuminating the status indicator to track the intensity level of the associated lighting device with the lowest intensity level. Also, or alternatively, in response to an actuation of an actuation portion (e.g., the actuation portion 204) to toggle on the lighting devices to the respective intensity levels defined by a scene (e.g., an on scene), the remote control device may be configured to provide relative feedback by illuminating the status indicator to track the intensity level of the lighting devices defined by the scene.

Relative feedback may be provided based on the intensity levels of the associated lighting devices. For example, as the intensity levels of the associated lighting devices increase, the percentage of illumination of the status indicator may increase. Similarly, as the intensity levels of the associated lighting devices decrease, the percentage of illumination of the status indicator may decrease. Accordingly, relative feedback may provide an indication of the effect that a user interaction (e.g., an actuation of the actuation portion and/or a rotation of the rotation portion) has on the associated lighting devices.

Figure 5A:
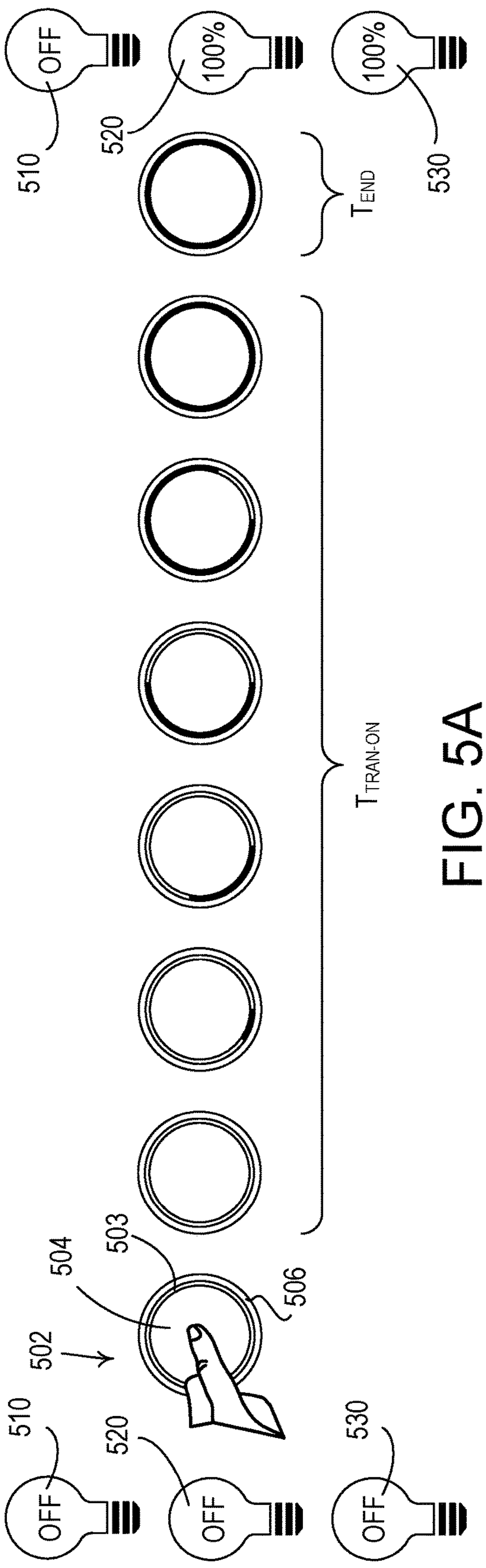
FIGS. 5A and 5B illustrate example scenarios for providing feedback on a status indicator of a remote control device in response to an actuation of an actuator for turning on a lighting device.
Figure 5B:
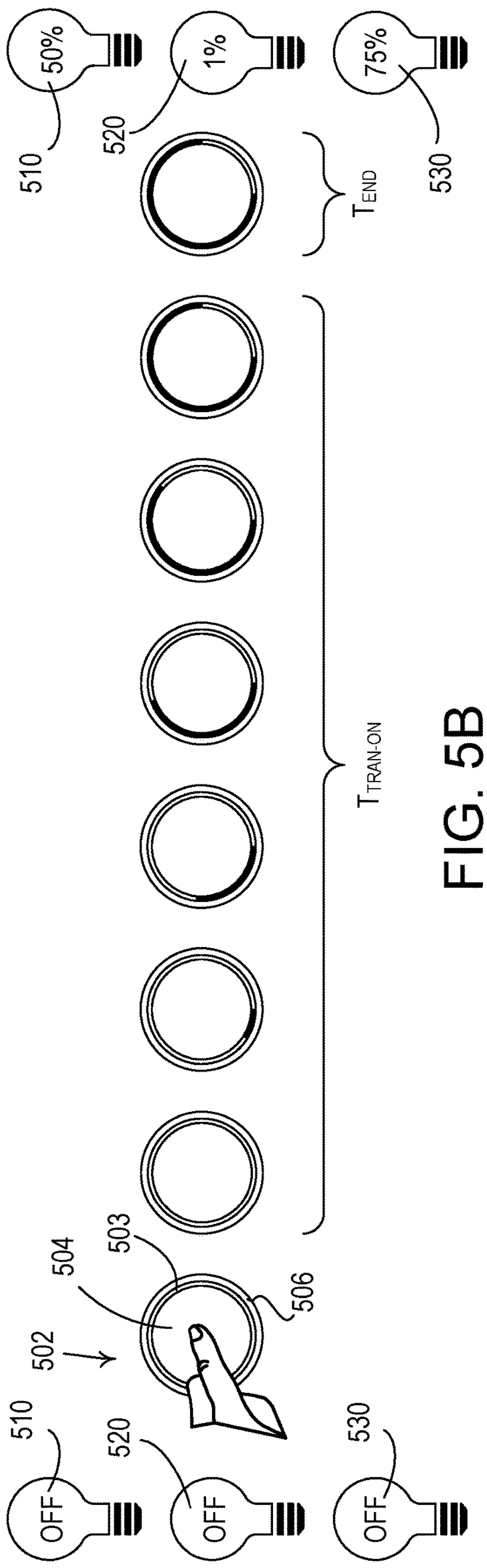

FIGS. 5A and 5B illustrate example scenarios for providing relative feedback via a status indicator 503 of a remote control device 502 in response to an actuation of an actuation portion 504 to turn on lighting devices 510, 520, 530. The actuation of the actuation portion 504 may cause the feedback to be provided according to an on scene. As described herein, the remote control device 502 may include a plurality of light sources (e.g., LEDs) configured to illuminate the status indicator 503. The remote control device 502 may also include a rotation portion 506. Further, the remote control device 502 may be associated with the lighting devices 510, 520, 530 and may be configured to control the intensity levels of the lighting devices 510, 520, 530. The status indicator 503 may be illuminated (e.g., one or more of the plurality of light sources may be illuminated) in response to an actuation of the actuation portion 504.

An actuation of the actuation portion 504 may cause the lighting devices 510, 520, 530 to be turned on or off depending on the present intensity levels of the lighting devices. For example, if any of the lighting devices 510, 520, 530 are on, the actuation of the actuation portion 504 may result in the lighting devices 510, 520, 530 being turned off. If each of the lighting devices 510, 520, 530 are off, the actuation of the actuation portion 504 may result in the lighting devices 510, 520, 530 being turned on. For example, as shown in FIG. 5A, an actuation of the actuation portion 504 may cause the lighting devices 510, 520, 530 to be turned on to respective preset intensity levels defined by a scene (e.g., an on scene). As described herein, a scene may include respective preset intensity levels for associated lighting devices 510, 520, 530. For example, the remote control device 502 may transmit an indication of the actuation of the actuation portion 504 to a master device (e.g., the hub device 180), which may transmit move-to-level commands to each of the lighting devices 510, 520, 530 for turning on the lighting devices to the preset intensity levels and/or transmit an on scene command to the associated lighting devices to cause the lighting devices to change to the respective preset intensity levels.

The remote control device 502 may be configured to perform relative feedback in response to the actuation of the actuation portion 504 to turn on the lighting devices 510, 520, 530 by displaying an animation. The animation displayed on the status indicator 503 of the remote control device 502 may be a transition-up animation. The transition-up animation may be displayed on the status indicator 503 to provide relative feedback in response to the actuation of the actuation portion 504 to turn on the lighting devices 510, 520, 530. The transition up animation may start from a starting illumination $L_{START}$ (e.g., an initial illumination) of the status indicator 503 and transition up the illumination of the status indicator 503 to an ending illumination $L_{END}$ (e.g., a final illumination) over a transition on period $T_{TRAN\text{-}ON}$ (e.g., approximately 400 msec). For example, the starting illumination $L_{START}$ in the transition-up animation may be set to a lowest final intensity level of the lighting device 510, 520, 530 (e.g., 0% as shown in FIG. 5A) and the percentage of the status indicator 503 that is illuminated during the transition-up animation may reflect the present intensity level of the lighting device 2310, 2320, 2330 having the lowest final intensity level. The ending illumination $L_{END}$ may be based on the preset intensity levels of the scene to which the lighting devices 510, 520, 530 are being turned on. For example, the ending illumination $L_{END}$ may be a highest (e.g., brightest) intensity level (e.g., 100% as shown in FIG. 5A) of the preset intensity levels of the lighting devices 510, 520, 530 for the scene. After transitioning to the ending illumination $L_{END}$, the transition-up animation may include illuminating the status indicator 503 at the ending illumination $L_{END}$ for an ending period $T_{END}$ (e.g., approximately 200 msec) before the status indicator 503 is turned off and the remote control device 502 goes to sleep.

As shown in FIG. 5A, relative feedback may be provided via the status indicator 503 of the remote control device 502 in response an actuation of the actuation portion 504 to turn on the lighting devices 510, 520, 530. The lighting devices 510, 520, 530 may each be initially set to an intensity level of 0% (e.g., off). A single actuation of the actuation portion 504 of the remote control device 502 may cause the lighting devices 510, 520, 530 to be turned on to a scene (e.g., an on scene or a favorite scene). For example, as shown in FIG. 5A, the lighting device 510 may be set to an intensity level of 0%, and the lighting devices 520, 530 may be set to a 100% intensity level according to the scene. Upon a single actuation of the actuation portion 504 for turning on the lighting devices 510, 520, 530 (e.g., according to the on scene), the remote control device 502 may be configured to provide relative feedback that the lighting devices 510, 520, 530 are being turned on by displaying the transition-up animation via the status indicator 503.

As illustrated in FIG. 5A, the remote control device 502 may provide relative feedback using the transition-up animation by identifying the starting illumination $L_{START}$ (e.g., 0%) for being displayed on the status indicator 503 (e.g., the initial percentage of the transition-up animation). The starting illumination $L_{START}$ of the status indicator 503 may indicate the lowest initial intensity level (e.g., a present intensity level of 0%) of the lighting devices 510, 520, 530. Over the transition-on period $T_{TRAN\text{-}ON}$, the remote control device 502 may transition the status indicator 503 to illuminate a percentage of the status indicator 503 relative to the intensity levels defined by the scene. A higher percentage of the status indicator 503 may continue to be illuminated over the transition-on period $T_{TRAN\text{-}ON}$ until an illumination is reached that indicates the brightest intensity level for a lighting device 510, 520, 530 defined by the scene. For example, as illustrated in FIG. 5A, when the highest intensity level defined by the scene is 100% (e.g., the intensity level defined for lighting devices 520 and 530), the transition-up animation may transition from illuminating 0% of the status indicator 503 to illuminating 100% of the status indicator. The transition-on period $T_{TRAN\text{-}ON}$ over which the transition occurs may be relative to a period of time over which the intensity levels of the lighting devices 510, 520, 530 change from off to on when turning on. For example, the transition-on period $T_{TRAN\text{-}ON}$ may be equal to or approximately equal to a fade time $T_{FADE}$ used by the lighting devices 510, 520, 530 when turning on (e.g., approximately 400 msec).

The hub device may transmit messages including move-to-level commands to the lighting devices 510, 520, 530 to cause the lighting devices to turn on to the respective intensity levels defined by the on scene. Each move-to-level command may include one or more parameters. For example, the move-to-level command may include a parameter to indicate an intensity level for a respective one of the lighting devices 510, 520, 530 and/or a parameter to indicate a period of time over which the respective lighting device should change to the indicated intensity level (e.g., a fade time $T_{FADE}$). The intensity level may be expressed in terms of a percentage (e.g., an intensity level of 30%). Further, as illustrated in FIG. 5A, after the transition of the illumination of the status indicator 503 from the starting illumination $L_{START}$ to the ending illumination $L_{END}$ is complete, the transition-up animation may include illuminating the status indicator 503 at the ending illumination $L_{END}$ (e.g., 100%) for the ending period $T_{END}$ (e.g., approximately 200 msec) before the status indicator 503 is turned off and the remote control device 502 enters a sleep mode.

FIG. 5B illustrates another example scenario for providing relative feedback via the status indicator 503 of the remote control device 502 in response to an actuation of the actuation portion 504 to turn on the lighting devices 510, 520, 530 (e.g., according an on scene command). As illustrated in FIG. 5B, the lighting devices 510, 520, 530 may each be initially set to an intensity level of 0% (e.g., off). A single actuation of the actuation portion 504 of the remote control device 502 may cause the lighting devices 510, 520, 530 to be turned on to a scene (e.g., an on scene or a favorite scene). For example, as shown in FIG. 5B, the lighting device 510 may be set to an intensity level of 50%, the lighting device 520 may be set to an intensity level of 1%, and the lighting device 530 may be set to an intensity level of 75%. Upon a single actuation of the actuation portion 504 (e.g., for turning on the lighting devices according to the on scene command), the status indicator 503 may provide relative feedback that the lighting devices 510, 520, 530 are being turned on by displaying a transition-up animation on the status indicator 503.

As illustrated in FIG. 5B, the remote control device 502 may provide relative feedback using the transition-up animation by transitioning from the a starting illumination $L_{START}$ (e.g., 0%) of the status indicator to a ending illumination $L_{END}$ (e.g., 75%). Over a transition-on period $T_{TRAN-ON}$, the remote control device 502 may transition the status indicator 503 to illuminate a percentage of the status indicator 503 relative to the intensity levels defined by the scene (e.g., a highest intensity level $L_{HI}$ defined by the on scene). For example, as illustrated in FIG. 5B, when the highest intensity level $L_{HI}$ defined by the on scene is 75% (e.g., the intensity level defined by the on scene for lighting device 530), the transition-up animation may transition from illuminating 0% of the status indicator 503 to illuminating 75% of the status indicator. As described herein, the transition-on period $T_{TRAN-ON}$ may be equal to or approximately equal to a fade time $T_{FADE}$ used by the lighting devices 510, 520, 530 when turning on (e.g., approximately 400 msec). Further, as illustrated in FIG. 5B, after the transition of the illumination of the status indicator 503 from the starting illumination $L_{START}$ to the ending illumination $L_{END}$ is complete, the transition-up animation may include illuminating the status indicator 503 at the final illumination (e.g., 75%) for the ending period $T_{END}$ (e.g., approximately 200 msec), before the status indicator 503 is turned off and the remote control device 502 enters a sleep mode.

Figure 6A:
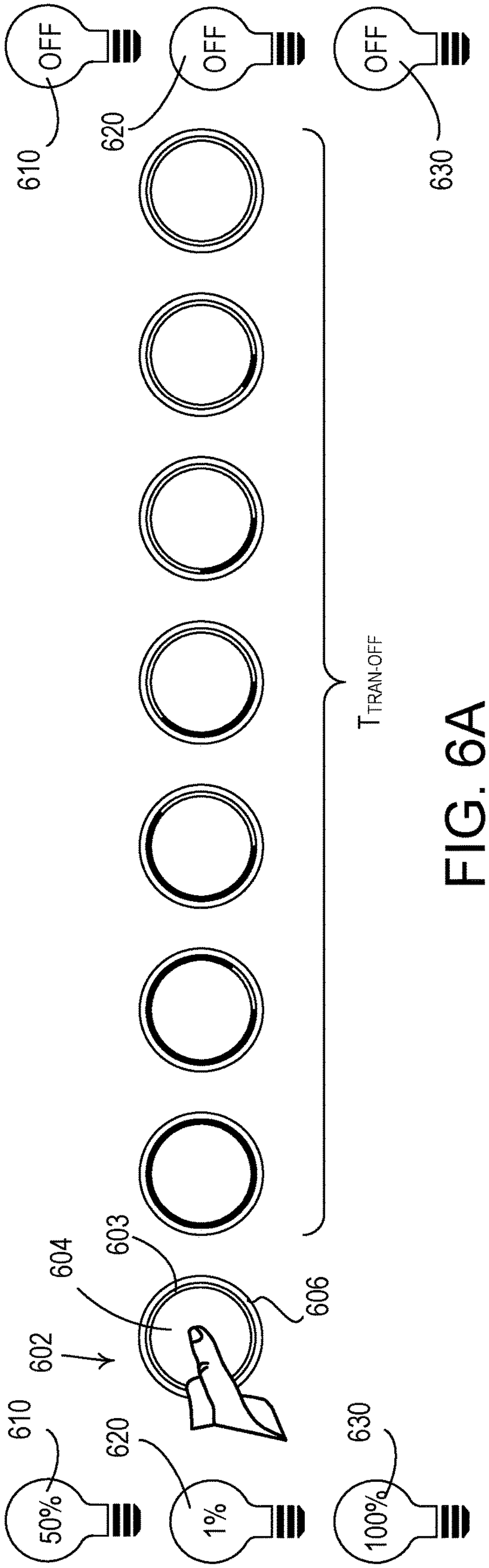
FIGS. 6A and 6B illustrate example scenarios for providing feedback on a status indicator of a remote control device in response to an actuation of an actuator for turning off a lighting device.
Figure 6B:
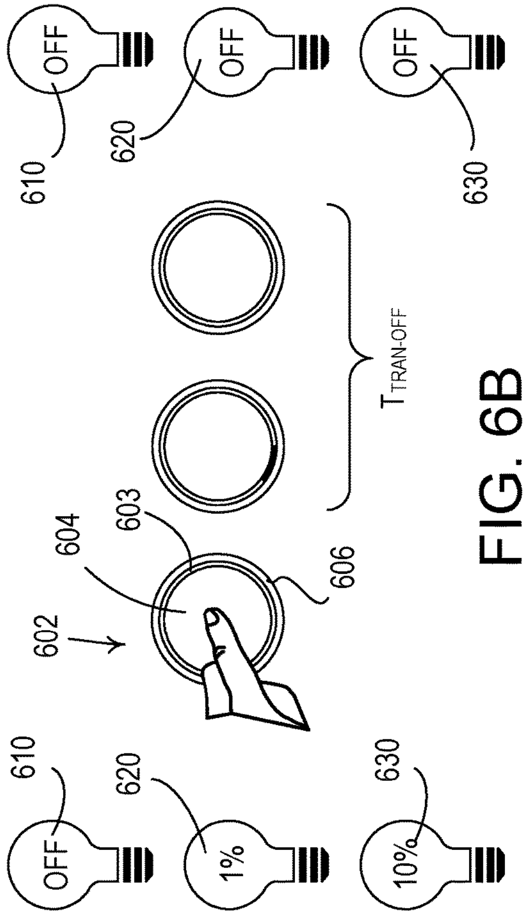

FIGS. 6A and 6B illustrate example scenarios for providing relative feedback via a status indicator 603 of a remote control device 602 in response to an actuation of an actuation portion 604 to turn on lighting devices 610, 620, 630 (e.g., according an off scene). As described herein, the remote control device 602 may include a plurality of light sources (e.g., LEDs), configured to illuminate the status indicator 603. The remote control device 602 may also include a rotation portion 606. Further, the remote control device 602 may be associated with the lighting devices 610, 620, 630 and may be configured to control the intensity levels of the lighting devices 610, 620, 630. The status indicator 603 may be illuminated (e.g., one or more of the plurality of light sources may be illuminated) in response to an actuation of the actuation portion 604.

An actuation of the actuation portion 604 may cause the lighting devices 610, 620, 630 to be turned on or off depending on the present intensity levels of the lighting devices. If any of the lighting devices 610, 620, 630 are on, an actuation of the actuation portion 504 may result in the lighting devices being turned off. If each of the lighting devices 610, 620, 630 are off, the actuation of the actuation portion 504 may result in the lighting devices 610, 620, 630 being turned on. For example, an actuation of the actuation portion 604 may cause the lighting devices 610, 620, 630 to be turned off (e.g., controlled to respective preset intensity levels, such as 0%, as defined by an off scene). For example, the remote control device 602 may transmit an indication of the actuation of the actuation portion 604 to a master device (e.g., the hub device 180), which may transmit move-to-level commands to each of the lighting devices 610, 620, 630 for turning the lighting devices off and/or transmit an off scene command to the associated lighting device to cause the lighting devices to change to an intensity level of 0% (e.g., off).

The remote control device 602 may be configured to perform relative feedback in response to the actuation of the actuation portion 604 to turn on the lighting devices 610, 620, 630 by displaying an animation. The animation displayed on the status indicator 603 of the remote control device 602 may be a transition-down animation. The transition-down animation may be displayed on the status indicator 603 to provide relative feedback in response to the actuation of the actuation portion 604 to turn off the lighting devices 610, 620, 630. The transition-down animation may start from a starting illumination $L_{START}$ (e.g., an initial illumination) of the status indicator 603 and transition down to an ending illumination $L_{END}$ (e.g., a final illumination) over a transition-off period $T_{TRAN-OFF}$ (e.g., approximately 400 msec). For example, the ending illumination $L_{END}$ in the transition-down animation may include illuminating 0% of status indicator 603. The starting illumination $L_{START}$ may be based on the initial intensity levels (e.g., present intensity levels) of the associated lighting devices 610, 620, 630. The starting illumination $L_{START}$ in the transition-down animation may be set to a highest initial intensity level (e.g., present intensity levels) of the lighting device 610, 620, 630 (e.g., 100% as shown in FIG. 6A) and the percentage of the status indicator 603 that is illuminated during the transition-down animation may reflect the present intensity level of the lighting device 610, 620, 630 having the highest initial intensity level (e.g., present intensity level). In addition, the ending illumination $L_{END}$ may be an intensity level other than 0% as defined for lighting devices 610, 620, 630 by the off scene. While not shown in FIG. 6A, after transitioning to the ending illumination $L_{END}$, the transition-down animation may include illuminating the status indicator 2403 at the ending illumination $L_{END}$ (e.g., at a non-zero intensity level) for an ending period $T_{END}$ (e.g., approximately 200 msec) (e.g., before the status indicator 603 is turned off and the remote control device 602 goes to sleep).

As shown in FIG. 6A, the lighting device 610 may be initially set to an intensity level of 50%, the lighting device 620 may be initially set to an intensity level of 1%, and the lighting device 630 may be initially set to an intensity level of 100%. A single actuation of the actuation portion 604 of the remote control 602 may cause the lighting devices 610, 620, 630 to be turned off and/or to preset intensity levels (e.g., 0%) defined by an off scene. Upon a single actuation of the actuation portion 604 for turning off the lighting devices 610, 620, 630 (e.g., a toggle off scene command), the remote control device 602 may be configured to provide relative feedback that the lighting devices 610, 620, 630 are being turned off by displaying the transition-down animation via the status indicator 603.

As illustrated in FIG. 6A, the remote control device 602 may provide relative feedback using the transition-down animation by identifying the starting illumination $L_{START}$ for being displayed on the status indicator 603. The staring illumination $L_{START}$ on the status indicator 630 may indicate the highest initial intensity level (e.g., present intensity level) of the associated lighting devices 610, 620, 630. The percentage of the status indicator 603 that is illuminated may be decreased over the transition-off period $T_{TRAN-OFF}$ until the status indicator 603 is illuminated to the ending illumination $L_{END}$ (e.g., indicating an intensity level of 0% of the lighting devices 610, 620, 630). For example, as illustrated in FIG. 6A, when the highest initial intensity level (e.g., present intensity level) of at least one of the associated lighting devices 610, 620, 630 is 100% (e.g., the intensity level defined for lighting devices 630), the transition-down animation may include initially illuminating 100% of the status indicator 603. Over the transition-off period $T_{TRAN-OFF}$, the fade-down animation may include a transition to illuminating 0% of the status indicator 603. The transition-off period $T_{TRAN-OFF}$ over which the transition occurs may be relative to a period of time over which the intensity levels of the associated lighting devices 610, 620, 630 change from on to off when turning off. For example, the transition-off period $T_{TRAN-OFF}$ may be equal to or approximately equal to a fade time $T_{FADE}$ used by the lighting devices 610, 620, 630 when turning off (e.g., 750 msec).

The hub device may transmit messages including move-to-level commands to the lighting devices 610, 620, 630 to cause the lighting devices to turn off. Each move-to-level command may include one or more parameters. For example, the move-to-level command may include a parameter to indicate an intensity level for a respective one of the lighting device 610, 620, 630 and/or a parameter to indicate a period of time over which the respective lighting device should change to the indicated intensity level (e.g., a fade time $T_{FADE}$). The intensity level may be expressed in terms of a percentage (e.g., an intensity level of 0%).

FIG. 6B illustrates another example scenario for providing relative feedback via the status indicator 603 of the remote control device 602 in response to an actuation of the actuation portion 604 to turn on the lighting devices 610, 620, 630. As illustrated in FIG. 6B, the lighting device 610 may be initially set to an intensity level of 0%, lighting device 620 may be initially set to an intensity level of 1%, and lighting device 630 may be initially set to an intensity level of 10%. A single actuation of the actuation portion of the remote control device 602 may cause the lighting devices 610, 620, 630 to be turned off. Upon a single actuation of the actuation portion 604 for turning off the lighting devices 610, 620, 630, the status indicator 603 may provide relative feedback that the lighting devices 510, 520, 530 are being turned off by displaying a transition-down animation on the status indicator 603.

As illustrated in FIG. 6B, the remote control device 602 may provide relative feedback using the transition-down animation by transitioning from a starting illumination $L_{START}$ of the status indicator 603 (e.g., indicating the highest initial intensity level (e.g., present intensity level) of the lighting devices 610, 620, 630) to an ending illumination (e.g., 0%). The transition-down animation may provide relative feedback that the lighting devices 610, 620, 630 being toggled off by displaying the starting illumination $L_{START}$ on the status indicator 603, which may be dependent upon the highest initial intensity level of the associated lighting 610, 620, 630. For example, as illustrated in FIG. 6B, when the highest initial intensity level of the lighting devices is 10% (e.g., the initial intensity level for lighting device 630), the transition-down animation may include initially illuminating 10% of the status indicator 603. Over the transition-off period $T_{TRAN-OFF}$), the remote control device 502 may transition the status indicator 603 to illuminating the status indicator 503 to the ending illumination $L_{END}$ (e.g., 0%). The transition-off period $T_{TRAN-OFF}$ over which the transition occurs may be relative to a period of time over which the intensity levels of the lighting devices 610, 620, 630 change from on to off when turning off d. For example, the transition-off period $T_{TRAN-OFF}$ may be equal to or approximately equal to a transition time used by the lighting devices 610, 620, 630 when turning off (e.g., 750 msec).

Figure 7A:
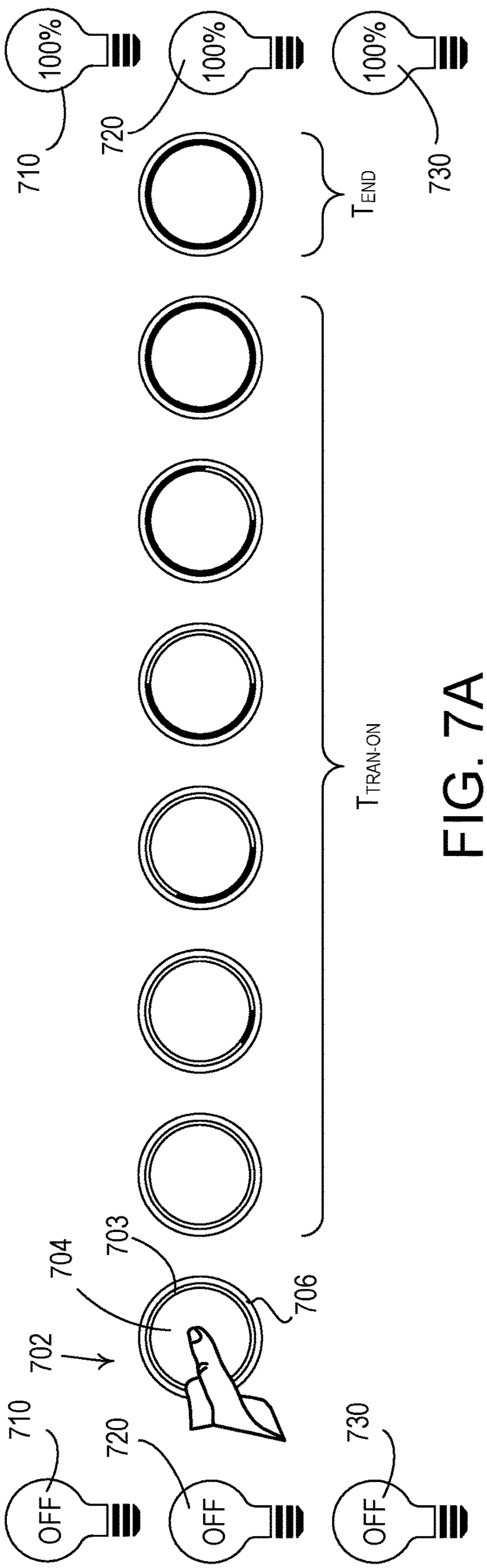
FIGS. 7A and 7B illustrate example scenarios for providing feedback on a status indicator of a remote control device in response to an actuation of an actuator for turning on a lighting device to a maximum intensity level.
Figure 7B:
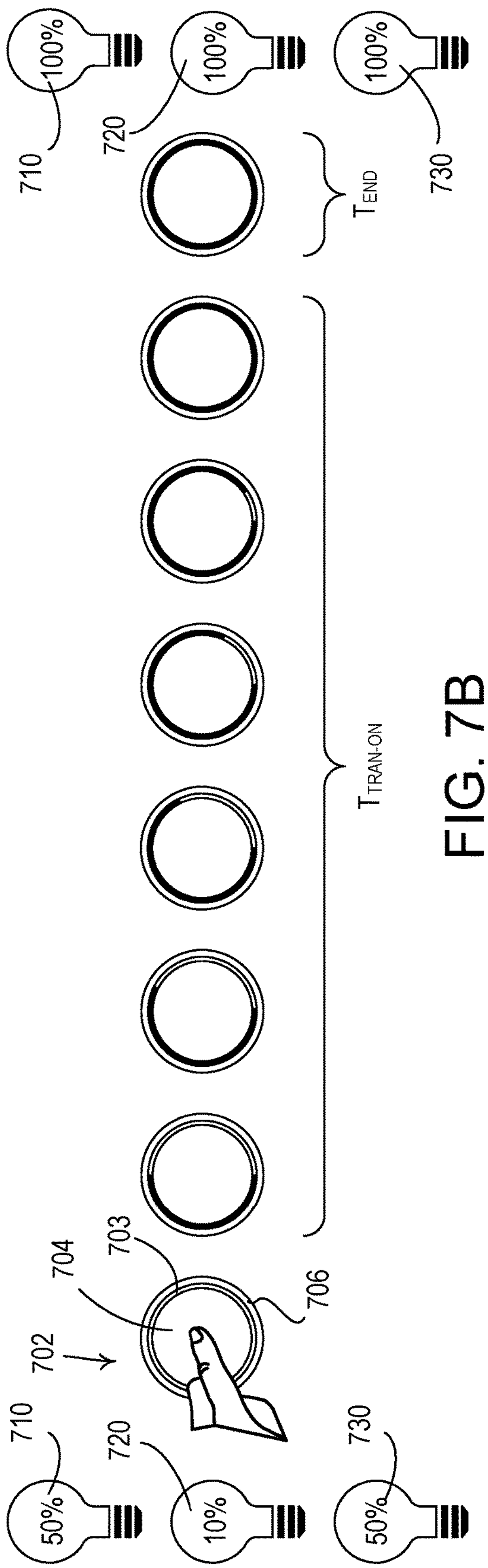

FIGS. 7A and 7B illustrate example scenarios for providing relative feedback via the status indicator of a remote control device 702 in response to an actuation of an actuation portion 704 to turn on lighting devices 710, 720, 730 to a maximum intensity level (e.g., 100%). As described herein, the remote control device 702 may include a plurality of light sources (e.g., LEDs), configured to illuminate the status indicator 703. The remote control device 702 may also include a rotation portion 706. Further, the remote control 702 device may be associated with the lighting devices 710, 720, 730 and may be configured to control the intensity levels of the lighting devices 710, 720, 730. The status indicator 703 may be illuminated (e.g., one or more of the plurality of light sources may be illuminated) in response to an actuation of the actuation portion 704. For example, a double-tap actuation of the actuation portion 704 (e.g., two single actuations of the actuation portion 704 in succession over a period of time) may indicate that the associated lighting devices 710, 720, 730 are to be controlled to an intensity level of 100% (e.g., a full-on command).

The remote control device 702 may be configured to perform relative feedback in response to the actuation of the actuation portion 704 to turn on the lighting devices 710, 720, 730 to the maximum intensity level by displaying an animation. The animation displayed on the status indicator 703 of the remote control device 702 may be a transition-up animation. The transition-up animation may be displayed on the status indicator 703 to provide relative feedback in response to the double-tap actuation of the actuation portion 704 to turn on the lighting devices 710, 720, 730 to the maximum intensity level. The transition-up animation may start from a starting illumination $L_{START}$ (e.g., an initial illumination) of the status indicator 703 and transition up to an ending illumination $L_{END}$ (e.g., a final illumination) of the status indicator 703 over a transition-on period $T_{TRAN-ON}$. For example, the starting illumination $L_{START}$ in the transition-up animation may be set to a lowest initial intensity level (e.g., present intensity level) of the lighting device 710, 720, 730 (e.g., 0% as shown in FIG. 7A) and the percentage of the status indicator 703 that is illuminated during the transition-up animation may reflect the present intensity level of the lighting device 710, 720, 730 having the highest initial intensity level. The ending illumination $L_{END}$ may indicate the intensity level of the associated lighting devices 710, 720, 730 after the full-on command (e.g., a future intensity level of 100%). After the transitioning to the ending illumination $L_{END}$, the transition-up animation may include illuminating the status indicator 703 at the ending illumination $L_{END}$ for an ending period $T_{END}$ (e.g., approximately 200 msec) before the status indicator 703 is turned off and the remote control device 702 goes to sleep).

As shown in FIG. 7A, relative feedback may be provided via the status indicator 703 of the remote control device 702 in response to an actuation of the actuation portion 704 to turn on the lighting devices 710, 720, 730 to the maximum intensity level. The lighting devices 710, 720, and 730 may be initially set to an intensity level of 0% (e.g., off). Two single actuations of the actuation portion 704 in succession over a period of time (e.g., a double-tap actuation over a predefined period of time) may cause the lighting devices 710, 720, 730 to be turned onto the maximum intensity level (e.g., an intensity level of 100%). Upon a double-tap actuation of the actuation portion 704, the remote control device 702 may be configured to provide relative feedback that the lighting devices 710, 720, 730 are being turned on to the maximum intensity level by displaying the transition-up animation via the status indicator 703.

As illustrated in FIG. 7A, the remote control device 502 may provide relative feedback using the transition-up animation by identifying the starting illumination $L_{START}$ (e.g., 0%) for being displayed on the status indicator 703 (e.g., the initial percentage of the transition-up animation). The starting illumination $L_{START}$ of the status indicator 703 may indicate the highest initial intensity level (e.g., a present intensity level of 0%) of the lighting devices 710, 720, 730. Over the transition-on period $T_{TRAN-ON}$, the remote control device 702 may transition the status indicator 703 to illuminate a percentage of the status indicator 703 relative to the intensity level of lighting devices 710, 720, 730 in response to the actuation of the actuation portion 704 to turn on the lighting devices 710, 720, 730 to the maximum intensity level. A higher percentage of the status indicator 703 may continue to be illuminated over the transition-on period $T_{TRAN-ON}$ until the ending illumination $L_{END}$ is reached. For example, as illustrated in FIG. 7A, when the highest initial intensity level (e.g., present intensity level) of the lighting devices 710, 720, 730 associated with the remote control device 702 is 0%, the transition-up animation may include transitioning from illuminating 0% of the status indicator 703 (e.g., the starting illumination $L_{START}$) to illuminating 100% of the status indicator 703 (e.g., the ending illumination $L_{END}$). The transition-on period $T_{TRAN-ON}$ over which the transition occurs may be relative to a period of time over which the intensity levels of the lighting devices 710, 720, 730 change to the maximum intensity level. For example, the transition-on period $T_{TRAN-ON}$ may be equal to or approximately equal to a fade time $T_{FADE}$ used by the lighting devices 710, 720, 730 in response to the double-tap actuation of the actuation portion 704 (e.g., approximately 400 msec).

The hub device may transmit messages including move-to-level commands to the lighting devices 710, 720, 730 to cause the lighting devices to turn on to the maximum intensity level. Each move-to-level command may include one or more parameters. For example, the move-to-level command may include a parameter to indicate an intensity level for a respective one of the lighting devices 710, 720, 730 to which to change and/or a parameter to indicate a period of time over which the respective lighting device should change to the indicated intensity level (e.g., a fade time $T_{FADE}$). Further, as illustrated in FIG. 7A, after the transition of the illumination of the status indicator 703 from the starting illumination $L_{START}$ to the ending illumination $L_{END}$ is complete, the transition-up animation may include illuminating the status indicator 703 at the ending illumination $L_{END}$ (e.g., 100%) for the ending period $T_{END}$ (e.g., approximately 200 msec) before the status indicator 703 is turned off and the remote control device 702 enters a sleep mode.

FIG. 7B illustrates another example scenario for providing relative feedback via the status indicator 703 of the remote control device 702 in response to an actuation of the actuation portion 704 to turn on the lighting devices 710, 720, 730 to the maximum intensity level (e.g., a double-tap actuation). As illustrated in FIG. 7B, the lighting device 710 may be initially set to an intensity level of 50%, the lighting device 720 may be initially set to an intensity level of 10%, and the lighting device 730 may be initially set to an initial intensity level (e.g., present intensity level) of 50%. Upon two single actuations of the actuation portion 704 in succession over a period of time (e.g., a double-tap actuation), the status indicator 703 may provide relative feedback indicating that lighting devices 710, 720, 730 are changing to the maximum intensity level (e.g., an intensity level of 100%) by displaying a transition-up animation on the status indicator 703.

As illustrated in FIG. 7B, the remote control device 602 may provide relative feedback using the transition-up animation by transitioning from a starting illumination $L_{START}$ (e.g., 50%) of the status indicator 703 to an ending illumination $L_{END}$ (e.g., 100%). The transition-up animation provided on the status indicator 703 may start by illuminating a percentage of the status indicator 703 which may be dependent upon the initial intensity levels (e.g., present intensity levels) of lighting devices 710, 720, 730 (e.g., the highest initial intensity level of lighting devices 710, 720, 730). For example, as illustrated in FIG. 7B, when the highest initial intensity level of the lighting devices 710, 720, 730 is 50%, the transition-up animation may transition from illuminating 50% of the status indicator 703 (e.g., the starting illumination $L_{START}$) to illuminating 100% of the status indicator 703 (e.g., the ending illumination $L_{END}$). As described herein, the transitioning may occur over the transition-on period $T_{TRAN-ON}$, which may correspond to a fade time $T_{FADE}$ used by the lighting devices 710, 720, 730 in response to the double-tap actuation of the actuation portion 704 (e.g., approximately 400 msec). Further, as illustrated in FIG. 7B, after the transition is complete, the transition-up animation may include illuminating the status indicator at the ending illumination $L_{END}$ for an ending period $T_{END}$ (e.g., approximately 200 msec) before the status indicator 703 is turned off and the remote control device 702 enters a sleep mode.

Figure 8:
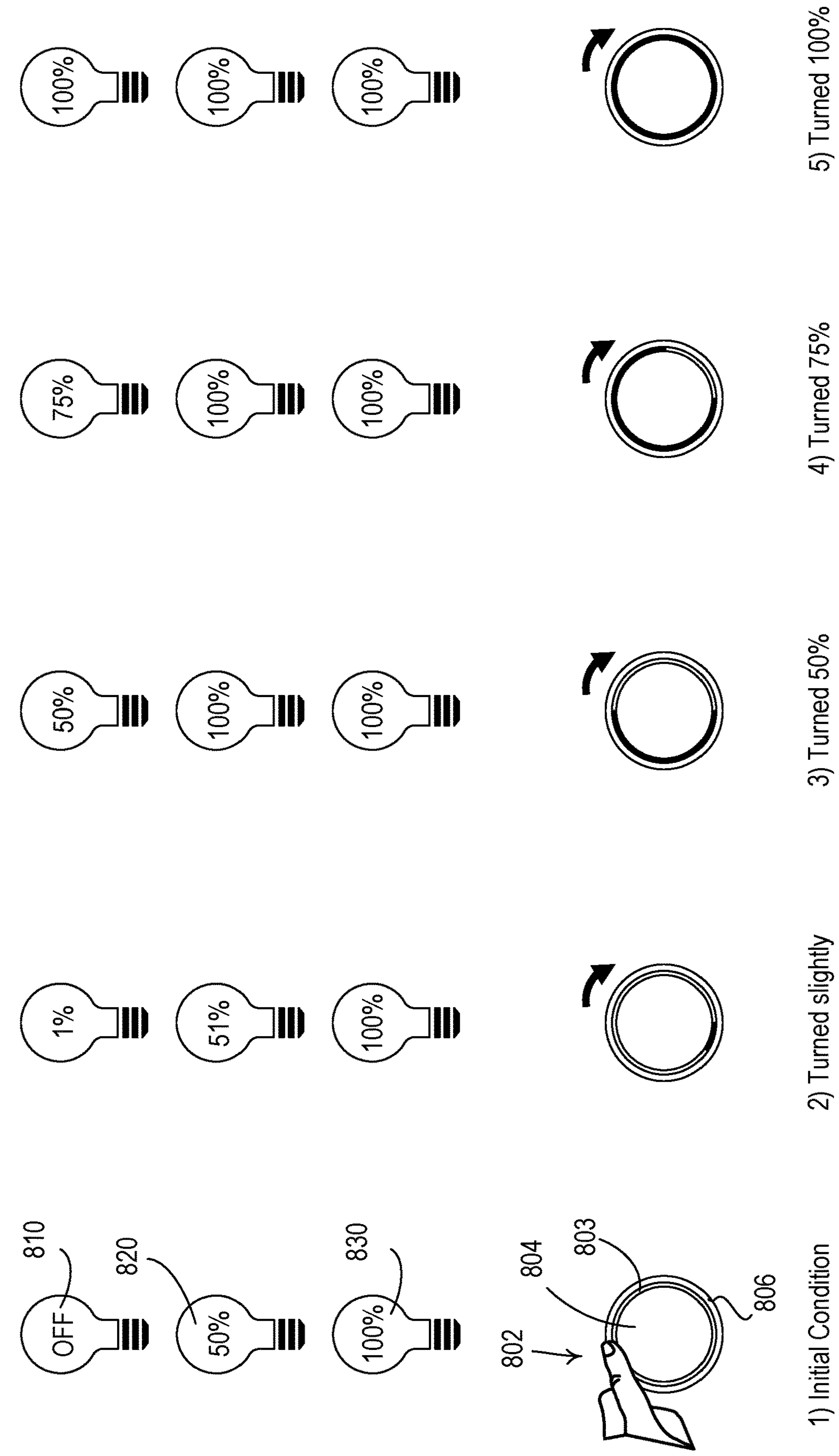
FIG. 8 illustrates an example scenario for providing feedback on a status indicator of a remote control device in response to an actuation of an actuator for raising an intensity level of a lighting device.

FIG. 8 illustrates example scenarios for providing relative feedback via a status indicator 803 of a remote control device 802 in response to an actuation (e.g., a rotation) of a rotation portion 806 to raise intensity levels of lighting devices 810, 820, 830. As described herein, the remote control device 802 may include a plurality of light sources (e.g., LEDs), configured to illuminate the status indicator 803. The remote control device 802 may also include an actuation portion 804. Further, the remote control device 802 may be associated with the lighting device 810, 820, 830 and may be configured to control the intensity levels of the lighting devices 810, 820, 830 in response to rotations of the rotation portion 806. The status indicator 803 may be illuminated (e.g., one or more of the plurality of light sources may be illuminated) in response to a rotation of the rotation portion 806. For example, a clockwise rotation of the rotation portion may indicate a raise command. A raise command may increase the intensity levels of lighting devices 810, 820, 830 to other intensity levels (e.g., by a certain percentage). The percentage increase in the intensity level of each lighting device 810, 820, 830 may be relative to an amount of rotation of the rotation portion 1006. For example, a relationship (e.g., a ratio) may be determined between the amount of rotation and the corresponding percentage increase in the intensity levels of the lighting devices 810, 820, 830. The amount of rotation may be expressed in terms of degrees and/or polarity (e.g., clockwise rotation may be expressed as a positive polarity and counter-clockwise rotation may be expressed as negative polarity). The amount of rotation may correspond to a certain percentage increase in the intensity levels (e.g., based on the relationship). For example, 210 degrees of clockwise rotation may correspond to increasing the associated lighting devices 810, 820, 830 from off (e.g., 0%) to a maximum intensity level (e.g., 100%). Similarly, 105 degrees of clockwise rotation may correspond to increasing the associated lighting device by 50% to another intensity level.

The remote control device 802 may be configured to perform relative feedback in response to the rotation of the rotation portion 806 to increase the intensity levels of the lighting devices 810, 820, 830 by displaying an animation. The animation displayed on the status indicator 803 of the remote control device 802 may be a responsive animation. The responsive animation may be displayed on the status indicator 803 to provide relative feedback in response to the rotation (e.g., the clockwise rotation) of the rotation portion 806 to increase the intensity levels of the lighting devices 810, 820, 830. The responsive animation may start from a staring illumination $L_{START}$ of the status indicator 803. The responsive animation may proceed to track the rotation of the rotation portion 806 as the rotation portion is rotated. After the rotation of the rotation portion 806 ends, the remote control device 802 may illuminate a percentage of the status indicator that to an ending illumination $L_{END}$ that corresponds to a final intensity level of the lighting devices 810, 820, 830. While the rotation portion 806 is being rotated, the responsive animation may include illumination of the status indicator 803 that corresponds to the amount of rotation and/or the intensity level of at least one of the lighting devices 810, 820, 830. For example, the responsive animation may include illumination of a percentage of the status indicator that corresponds to the amount of rotation and/or the final intensity level of a dimmest associated lighting device.

As shown in FIG. 8, lighting devices 810, 820, and 830 may initially be set to intensity levels of 0%, 50%, and 100%, respectively. Upon rotation of the rotation portion 806, the remote control device 802 may be configured to provide the relative feedback in response to a rotation of the rotation portion 806 to increase the intensity levels of the lighting devices 810, 820, 830 (e.g., a clockwise rotation of the rotation portion) by displaying the responsive animation via a status indicator 803. The responsive animation may provide relative feedback that the intensity levels of lighting device 810, 820, 830 are being increased. The remote control device 802 may determine the starting illumination $L_{START}$ of the status indicator 803. This starting illumination $L_{START}$ may correspond to a lowest initial intensity level $L_{LO}$ of the associated lighting device 810, 820, 830. As shown in FIG. 8, when the dimmest lighting device is initially set to an intensity level of 0% (e.g., lighting device 810), the responsive animation may illuminate 0% (e.g., none) of the status indicator in response to clockwise rotation. The remote control device 802 may be configured to adjust the intensity levels to which to which to control the associated lighting devices 810, 820, 830 based on the amount and/or direction of rotation. As the rotation continues in the clockwise direction, the lighting devices 810, 820, 830 may be controlled such that the intensity level of the dimmest associated lighting device may be increased. The percent of illumination of the status indicator may also increase to reflect the increase in the intensity level of the dimmest associated lighting device. For example, as illustrated in FIG. 8, when the rotation portion is initially rotated in the clockwise direction, the responsive animation may be initially illuminated to reflect the intensity level of the dimmest lighting device 810 (e.g., 1%). As the rotation portion continues to be rotated (e.g., by approximately 105 degrees clockwise), the remote control device 802 may transmit one or more messages to cause the present intensity level of the lighting device 810 to be increased (e.g., to approximately 50%). The remote control device 802 may continue to increase the illumination of the status indicator 803 to illuminate 50% of the status indicator 803 (e.g., indicating that the dimmest lighting device 810 is at an intensity level of 50%). As the rotation portion 806 is rotated more (e.g., by approximately 158 degrees clockwise), the remote control device 802 may transmit one or more messages to cause the present intensity level to be increased (e.g., to approximately 75%). The remote control device 802 may continue to increase the illumination of the status indicator 803 to illuminate 75% of the status indicator 803 (e.g., indicating that the dimmest lighting device 810 is at an intensity level of 75%). As the rotation portion 806 is rotated more (e.g., by approximately 210 degrees clockwise), the remote control device 802 may transmit one or more messages to cause the present intensity level of the lighting device 810 to be increased (e.g., by approximately 100%). The remote control device 802 may continue to increase the illumination of the status indicator 803 to illuminate 100% of the status indicator 803 (e.g., indicating that the dimmest lighting device 810 is at an intensity level of 100%).

Figure 9:
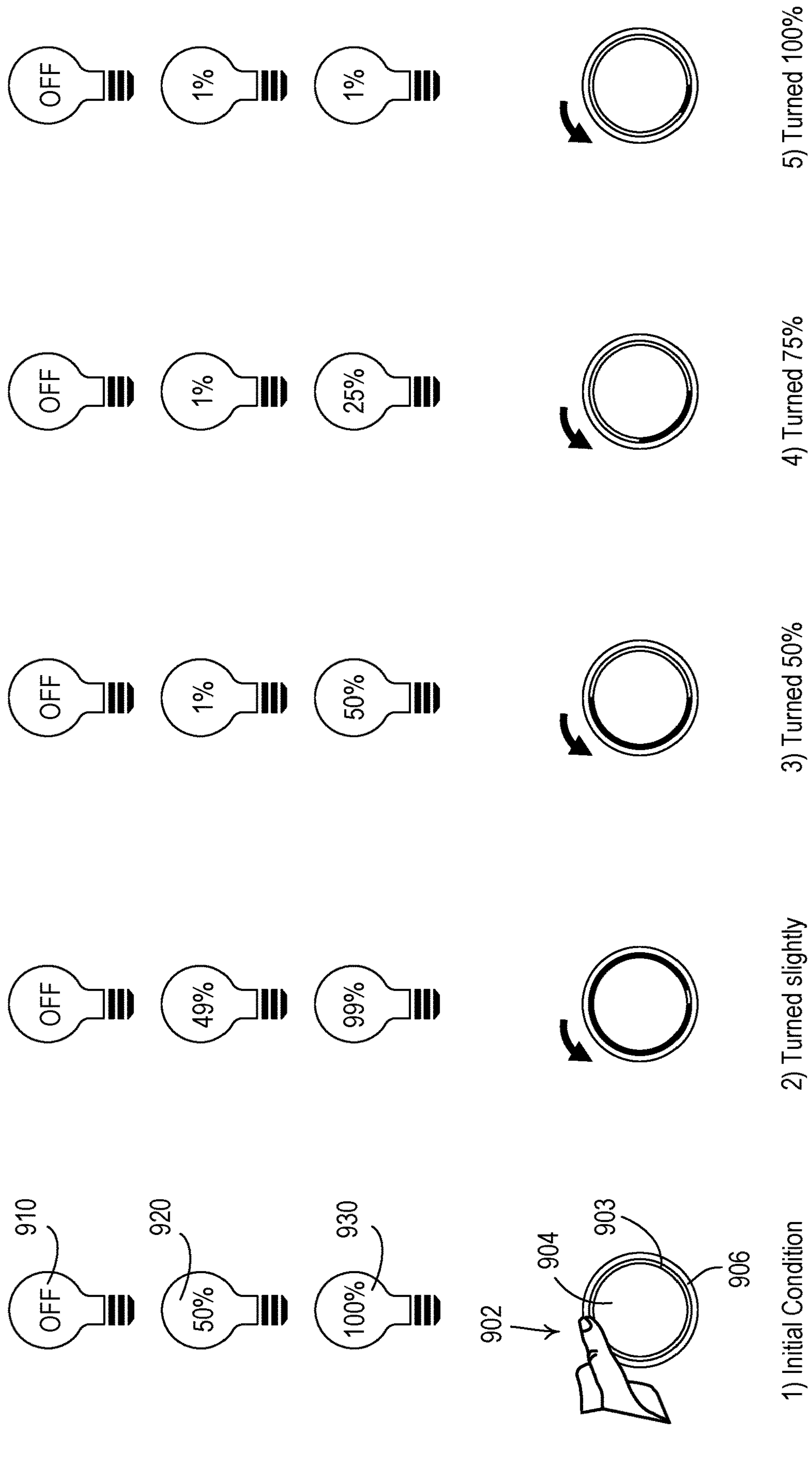
FIG. 9 illustrates an example scenario for providing feedback on a status indicator of a remote control device in response to an actuation of an actuator for lowering an intensity level of a lighting device.

FIG. 9 illustrates example scenarios for providing relative feedback via a status indicator 903 of a remote control device 902 in response to an actuation (e.g., a rotation) of a rotation portion 906 to lower intensity levels of lighting devices 910, 920, 930. As described herein, the remote control device 902 may include a plurality of light sources (e.g., LEDs), configured to illuminate the status indicator 903. The remote control device 902 may also include an actuation portion 904 and. Further, remote control device 902 may be associated with the lighting device 910, 920, 930 and may be configured to control the intensity levels of the lighting devices 910, 920, 930 in response to rotations of the rotation portion 906. The status indicator 903 may be illuminated (e.g., one or more of the plurality of light sources may be illuminated) in response to a rotation of the rotation portion 906. For example, a counter-clockwise rotation of the rotation portion 906 may indicate a lower command. A lower command may decrease the initial intensity level of the lighting devices 910, 920, 930 to another intensity level (e.g., by a certain percentage). The percentage decrease in intensity level may be relative to an amount of rotation. For example, a relationship (e.g., a ratio) may be determined between the amount of rotation and the corresponding percentage increase in the intensity levels intensity levels of the lighting devices 910, 920, 930. The amount of rotation may be expressed in terms of degrees and/or polarity (e.g., clockwise rotation may correspond to positive polarity and counter-clockwise rotation may correspond to negative polarity). The amount of rotation may correspond to a certain percentage decrease in the intensity levels (e.g., based on the relationship). For example, 210 degrees of counter-clockwise rotation may correspond to decreasing the associated lighting devices from a maximum intensity (e.g., 100%) to a minimum intensity (e.g., off or a low-end intensity, such as 0.1%-10%). Similarly, 105 degrees of counter-clockwise rotation may correspond to decreasing the associated lighting device by to another intensity level.

The remote control device 902 may be configured to perform relative feedback in response to the rotation of the rotation portion 906 to increase the intensity levels of the lighting devices 910, 920, 930 by displaying an animation. The animation displayed on the status indicator 903 of the remote control device 902 may be a responsive animation. The responsive animation may be displayed on status indicator 903 to perform relative feedback in response to the rotation (e.g., the counter-clockwise rotation) of the rotation portion 906 to decrease the intensity levels of the lighting devices 910, 920, 930. The responsive animation may start from a starting illumination $L_{START}$ of the status indicator 903. The starting illumination $L_{START}$ may be based on a highest initial intensity level $L_{HI}$ of the lighting devices 910, 920, 930 associated with the remote control device 902 (e.g., the lighting device 930). The responsive animation may continue to track the rotation of the rotation portion 906 as the rotation portion is rotated. After the rotation of the rotation portion 906 ends, the remote control device 902 may illuminate a percentage of the status indicator that corresponds to the final intensity level of the lighting device that had the highest initial intensity level $L_{HI}$ (e.g., the lighting device 930). While the rotation portion 906 is being rotated, the responsive animation may include illumination of a percentage of the status indicator that corresponds to the amount of rotation and/or the intensity level of the lighting device that had the highest initial intensity level $L_{HI}$ (e.g., the lighting device 930).

As shown in FIG. 9, the lighting devices 910, 920, and 930 may be initially set to intensity levels of 0%, 50%, and 100%, respectively. In response to a counter-clockwise rotation of the rotation portion 906, the remote control device 902 may illuminate a percentage of the status indicator that corresponds to the highest initial intensity level $L_{HI}$ of the lighting devices 910, 920, 930 (e.g., the brightest associated lighting device). As shown in FIG. 9, when the lighting device having the highest initial intensity level $L_{HI}$ is initially set to an intensity level of 100% (e.g., lighting device 930), the responsive animation may include initially illuminating 100% of the status indicator in response to counter-clockwise rotation. The remote control device 902 may be configured to adjust the intensity levels to which to which to control the associated lighting devices 910, 920, 930 based on the amount and/or direction of rotation. As the rotation continues in the counter-clockwise direction, the lighting devices 910, 920, 930 may be controlled such that the intensity level of the brightest associated lighting device is decreased. The percent of illumination of the status indicator may also decrease to reflect the increase in the intensity level of the brightest associated lighting device. For example, as illustrated in FIG. 9, when the rotation portion is initially rotated in the counter-clockwise direction, the responsive animation may be initially illuminated to reflect the intensity level of the brightest lighting device 930 (e.g., 100%). As the rotation portion continues to be rotated (e.g., by approximately 105 degrees clockwise), the remote control device 802 may transmit one or more messages to cause the present intensity level by of the lighting device 810 to be decreased (e.g., to approximately 50%). The remote control device 902 may continue to change the animation to illuminate 50% of the status indicator 903 (e.g., indicating that the brightest lighting device 910 is at an intensity level of 50%). As the rotation portion 906 is rotated more (e.g., by approximately 158 degrees counter-clockwise), the remote control device 902 may transmit one or more messages to cause the present intensity level to be decreased (e.g., to approximately 25%). The remote control device 902 may continue to change the animation to illuminate 25% of the status indicator 903 (e.g., indicating that the brightest lighting device 810 is at an intensity level of 25%). As the rotation portion 906 is rotated more (e.g., by approximately 210 degrees counter-clockwise), the remote control device 902 may transmit one or more lower messages to cause the present intensity level to be decreased (e.g., to approximately 1%). The remote control device 802 may continue to change to illuminate 1% of the status indicator 903 (e.g., indicating that the brightest lighting device 930 is at a low-end intensity level of 1%).

Figure 10A:
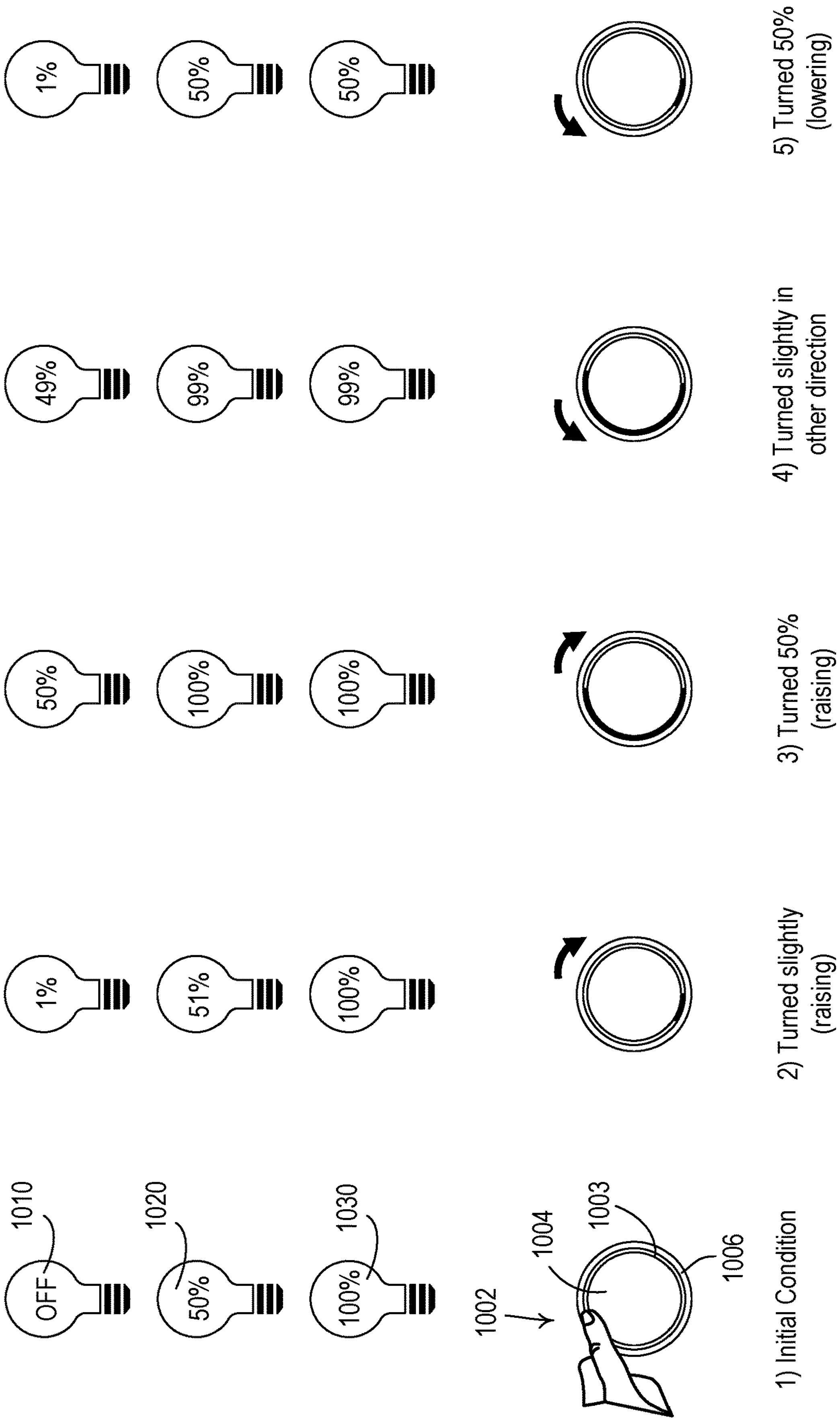
FIGS. 10A and 10B illustrate example scenarios for providing feedback on a status indicator of a remote control device in response to actuations of an actuator for raising and lowering an intensity level of a lighting device.

FIG. 10A illustrates an example scenario for providing relative feedback via a status indicator 1003 of a remote control device 1002 in response to a clockwise rotation of a rotation portion 1006 followed by a counter-clockwise rotation of the rotation portion 1006. As described herein, the remote control device 1002 may include a plurality of light sources (e.g., LEDs), configured to illuminate the status indicator 1003. The remote control device 1002 may also include an actuation portion 1004. Further, the remote control device 1002 may be associated with lighting devices 1010, 1020, 1030 and may be configured to control the intensity levels of the lighting devices 1010, 1020, 1030 in response to rotations of the rotation portion 1006. The status indicator 1003 may be illuminated (e.g., one or more of the plurality of light sources may be illuminated) in response to a rotation of the rotation portion 1006. For example, a clockwise rotation of the rotation portion 1006 may cause the lighting devices 1010, 1020, 1030 to raise the respective intensity levels (e.g., a raise command), and a counter-clockwise rotation of the rotation portion 1006 may cause the lighting devices 1010, 1020, 1030 to lower the respective intensity levels (e.g., a lower command). As described herein, a raise command may increase the intensity levels of the lighting devices 1010, 1020, 1030 to other intensity level. Similarly, a lower command may decrease the intensity levels of the lighting devices 1010, 1020, 1030 to other intensity levels. The changes in the intensity levels of the associated lighting devices may be relative to an amount of rotation of the rotation portion 1006. For example, a relationship (e.g., a ratio) may be determined between the amount of rotation and the percentage increase or decrease in intensity levels of the lighting devices 1010, 1020, 1030. The amount of rotation may be expressed in terms of degrees and/or polarity (e.g., clockwise rotation is positive polarity and counter-clockwise rotation is negative polarity). In certain situations, for example, a clockwise rotation of the rotation portion 1006 (e.g., to raise the intensity levels of the lighting devices 1010, 1020, 1030) may be followed by a counter-clockwise rotation of the rotation portion 1006 (e.g., to lower the intensity levels of the lighting devices 1010, 1020, 1030).

The remote control device 1002 may be configured to display one or more animations in response to a clockwise rotation of the rotation portion 1006 followed by a counter-clockwise rotation of the rotation portion 1006. The animation displayed on the status indicator 1003 of the remote control device 1002 may be a responsive animation. The responsive animation initially displayed in response to a clockwise rotation of the rotation portion 1006 may track the intensity level of the dimmest associated lighting device. If the clockwise rotation of the rotation portion 1006 is followed by (e.g., followed by without ceasing movement for longer than a predefined period of time) a counter-clockwise rotation of the rotation portion 1006, the responsive animation may continue to track the intensity level of the dimmest associated lighting device during the counter-clockwise rotation. The responsive animation may continue to track the intensity level of the dimmest associated lighting device (e.g., regardless of the direction of rotation) until rotation has completed. Tracking the dimmest associated lighting device (e.g., rather than switching from tracking the dimmest associated lighting device to tracking the brightest associated lighting device), for example, may avoid displaying abrupt changes in the responsive animation (e.g., abrupt changes in the percentage of illumination of the status indicator 1003).

A responsive animation displayed in response to a clockwise rotation of the rotation portion 1006 followed by a counter-clockwise rotation of the rotation portion 1006 may start from a starting illumination $L_{START}$ of the status indicator 1003. The starting illumination $L_{START}$ may be based on a lowest initial intensity level $L_{LO}$ of the lighting devices 1010, 1020, 1030 associated with the remote control device 1002. The responsive animation may continue to track the rotation of the rotation portion 1006 and illuminate a percentage of the status indicator that corresponds to the present intensity level of the dimmest lighting device associated with the remote control device 1002. While the rotation portion is being rotated, the responsive animation may illuminate a percentage of the status indicator 1003 that corresponds to the present intensity level of the dimmest lighting device associated with the remote control device 1002 based on the amount of rotation.

FIG. 10A illustrates an example scenario for providing relative feedback via the status indicator 1003 of the intensity levels of the load control devices 1010, 1020, and 1030, which may be initially set to intensity levels of 0%, 50%, and 100%, respectively. In response to an initial clockwise rotation of the rotation portion 1006 followed by (e.g., followed by without ceasing movement for a predefined period of time) a subsequent counter-clockwise rotation of the rotation portion 1006, the responsive animation may illuminate a percentage of the status indicator 1003 that corresponds to the present intensity level of the dimmest associated lighting device. When the dimmest lighting device is initially set to an intensity level of 0% (e.g., the lighting device 1010), the responsive animation may initially illuminate 0% of the status indicator 1003. As the rotation continues in the clockwise direction, the lighting devices 1010, 1020, 1030 may be controlled such that the intensity level of the dimmest associated lighting devices may be increased. The percent of illumination of the status indicator 1003 may also increase to reflect the increase in the intensity level of the dimmest associated lighting device. For example, as illustrated in FIG. 10A, when the rotation portion 1006 is rotated slightly clockwise (e.g., by a relatively short distance, such as approximately 2 degrees), the dimmest lighting device may be controlled to an intensity level of 1%. The responsive animation may illuminate 1% of the status indicator 1003. As the rotation continues in the clockwise direction, the percentage of illumination of the status indicator may increase. For example, as illustrated in FIG. 10A, when the rotation portion 1006 is rotated by approximately 105 degrees clockwise, the dimmest lighting device may be controlled to an intensity level of approximately 50% and the responsive animation may illuminate 50% of the status indicator 1003.

When the rotation changes direction to the counter-clockwise direction, the lighting devices 1010, 1020, 1030 may be controlled such that the intensity level of the dimmest associated lighting devices may be decreased. The percent of illumination of the status indicator may also decrease to reflect the increase in the intensity level of the dimmest associated lighting device. For example, as illustrated in FIG. 10A, when the rotation portion 1006 is rotated slightly counter-clockwise (e.g., by a relatively short distance, such as approximately 2 degrees), the dimmest lighting device may be controlled to an intensity level of 49%. The responsive animation may illuminate 49% of the status indicator 1003. As the rotation continues in the counter-clockwise direction, the percentage of illumination of the status indicator 1003 may decrease. For example, as illustrated in FIG. 10A, when the rotation portion 1006 is rotated by approximately 105 degrees counter-clockwise, the dimmest lighting device may be controlled to an intensity level of approximately 1% and the responsive animation may illuminate approximately 1% of the status indicator 1003.

Figure 10B:
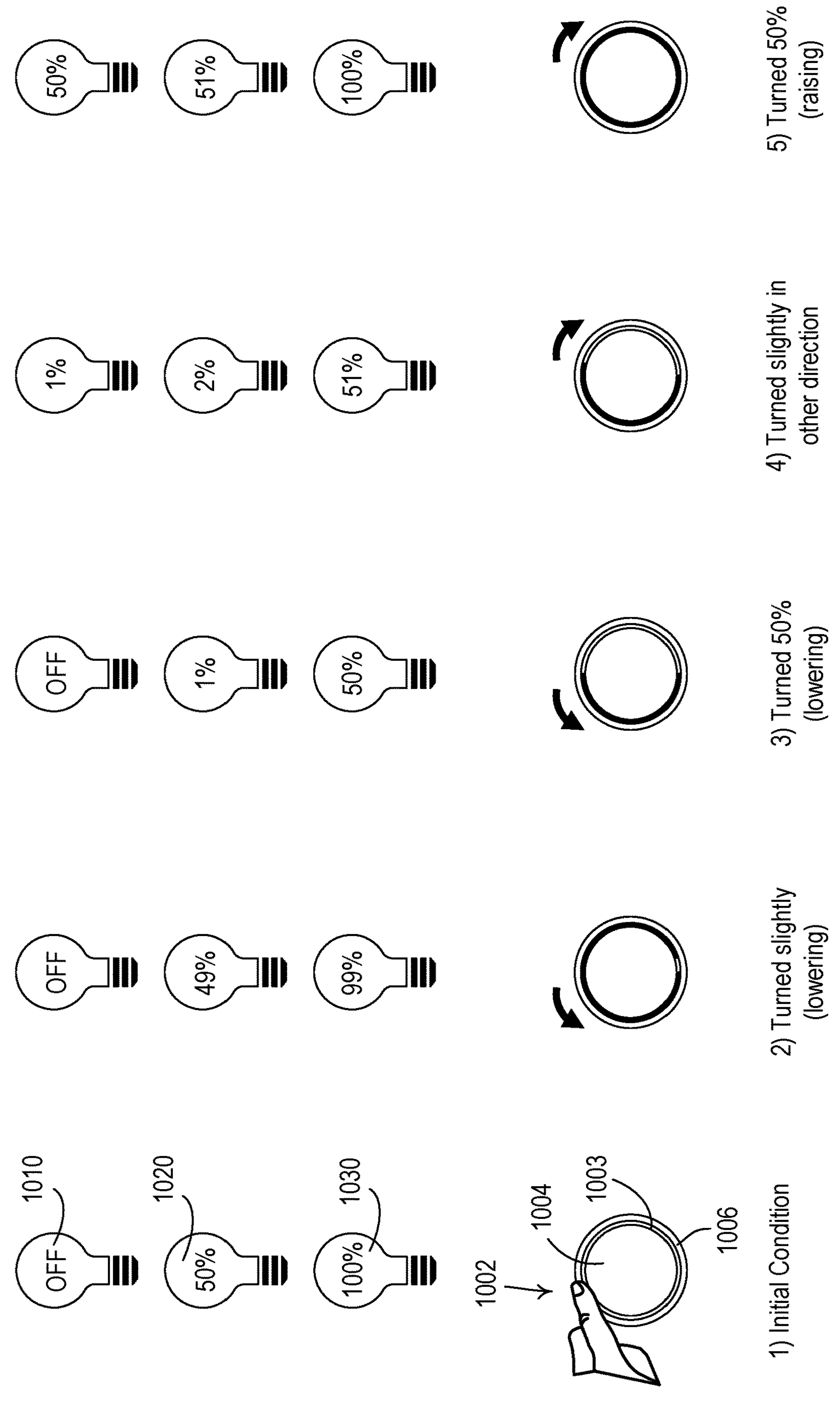

In certain situations, for example, a counter-clockwise rotation of the rotation portion 1006 may be followed by a clockwise rotation of the rotation portion 1006. FIG. 10B illustrates an example scenario for providing relative feedback via the status indicator 1003 of the remote control device 1002 in response to a counter-clockwise rotation of the rotation portion 1006 followed a clockwise rotation of the rotation portion 1006. If a counter-clockwise rotation of the rotation portion 1006 is followed by (e.g., followed by without ceasing movement for a predefined period of time) a clockwise rotation of the rotation portion 1006, the responsive animation may track the intensity level of the brightest associated lighting device. The responsive animation may continue to track the brightest associated lighting device (e.g., regardless of the direction of rotation) until rotation has completed. Tracking the brightest associated lighting device (e.g., rather than switching from tracking the brightest associated lighting device to tracking the dimmest associated lighting device), for example, may avoid displaying abrupt changes in the responsive animation (e.g., abrupt changes in the percentage of illumination of the status indicator 1003).

A responsive animation displayed in response to a counter-clockwise rotation of the rotation portion 1006 followed by a clockwise rotation of the rotation portion 1006 may start from a starting illumination $L_{START}$ of the status indicator 1003. The starting illumination $L_{START}$ may be based on a highest initial intensity level $L_{HI}$ of the lighting devices 1010, 1020, 1030 associated with the remote control device 1002. The responsive animation may continue to track the rotation of the rotation portion 1006 and illuminate a percentage of the status indicator that corresponds to the present intensity level of the brightest lighting device associated with the remote control device 1002. For example, while the rotation portion is being rotated (e.g., regardless of the direction of rotation), the responsive animation may include illuminating a percentage of the status indicator 1003 that corresponds to the present intensity level of the brightest lighting device associated with the remote control device 1002 based on the amount of rotation.

FIG. 10B illustrates an example scenario for providing relative feedback via the status indicator 1003 of the remote control device 1002 in response to a counter-clockwise rotation of the rotation portion 1006 followed by a clockwise rotation of the rotation portion 1006. As illustrated in FIG. 10B, the lighting devices 1010, 1020, 1030 may be initially set to intensity levels of 0%, 50%, and 100%, respectively. In response to an initial counter-clockwise rotation of the rotation portion 1006 followed by (e.g., followed by without ceasing movement for a predefined period of time) a clockwise rotation of the rotation portion 1006, the responsive animation may illuminate a percentage of the status indicator 1003 that corresponds to the present intensity level of the brightest associated lighting device. As shown in FIG. 10B, when the brightest lighting device is initially set to an intensity level of 100% (e.g., the lighting device 1030), the responsive animation may illuminate 100% of the status indicator 1003. As the rotation continues in the counter-clockwise direction, the lighting devices 1010, 1020, 1030 may be controlled such that the intensity level of the brightest associated lighting devices may be decreased. The percent of illumination of the status indicator 1003 may also decrease to reflect the decrease in the intensity level of the dimmest associated lighting device. For example, as illustrated in FIG. 10B, when the rotation portion 1006 is rotated by slightly counter-clockwise (e.g., a relatively short distance, such as by approximately 2 degrees), the brightest lighting device may be controlled to an intensity level of 99%. The responsive animation may illuminate 99% of the status indicator 1003. As the rotation continues in the counter-clockwise direction, the percentage of illumination of the status indicator may decrease. For example, as illustrated in FIG. 10A, when the rotation portion 1006 is rotated by approximately 105 degrees counter-clockwise, the brightest lighting device may be controlled to an intensity level of approximately 50% and the responsive animation may illuminate 50% of the status indicator 1003.

When the rotation changes direction to the clockwise direction, the lighting devices 1010, 1020, 1030 may be controlled such that the intensity level of the brightest associated lighting devices may be increased. The percent of illumination of the status indicator 1003 may also increase. For example, as illustrated in FIG. 10B, when the rotation portion 1006 is rotated by slightly clockwise (e.g., by a relatively short distance, such as approximately 2 degrees), the brightest lighting device may be controlled to an intensity level of 51%. The responsive animation may illuminate 51% of the status indicator 1003. As the rotation continues in the clockwise direction, the percentage of illumination of the status indicator 1003 may increase. For example, as illustrated in FIG. 10B, when the rotation portion 1006 is rotated by approximately 105 degrees clockwise, the brightest lighting device may be controlled to an intensity level of approximately 100% and the responsive animation may illuminate approximately 100% of the status indicator 1003.

Figure 11A:
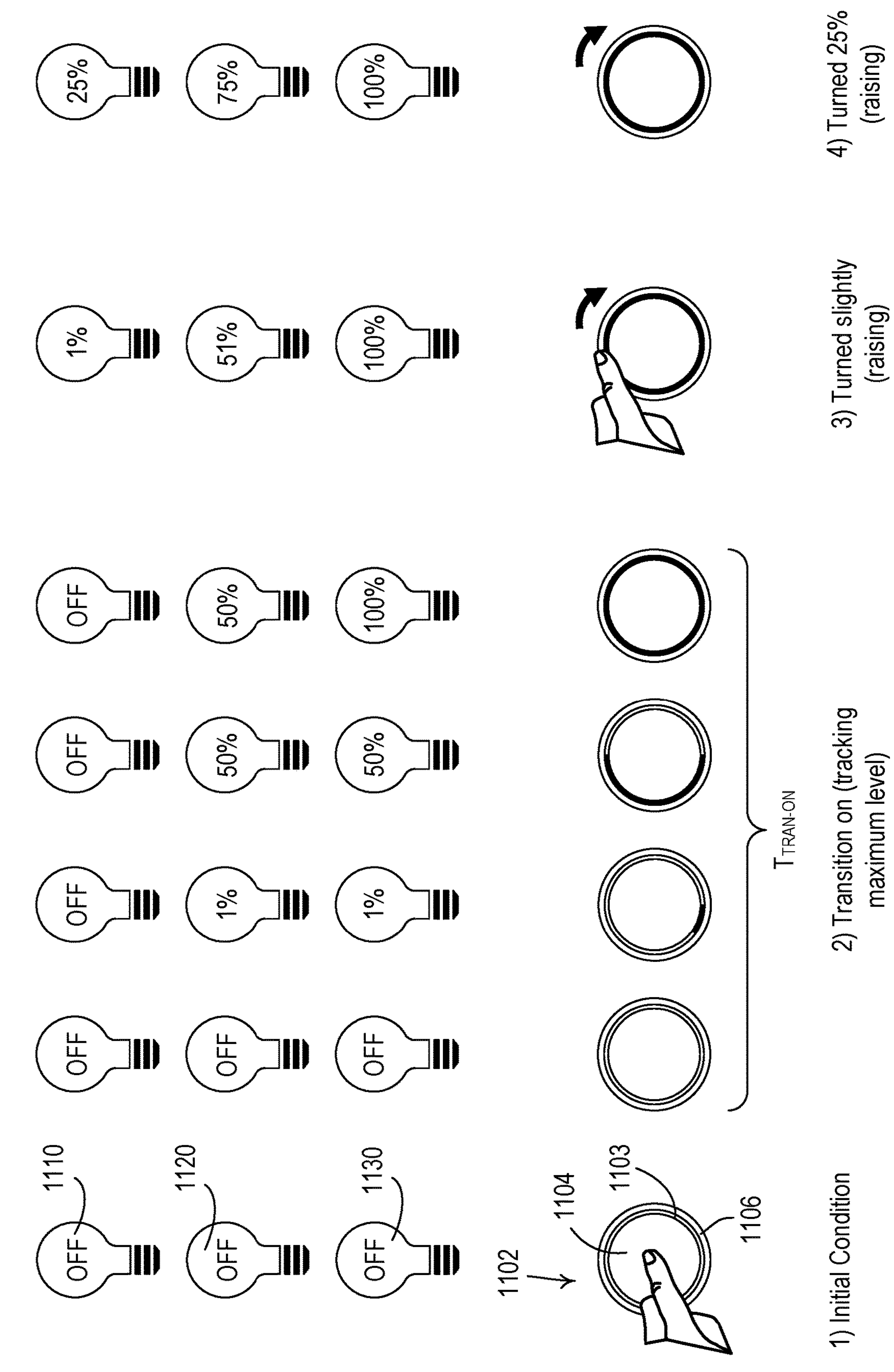
FIG. 11A illustrates an example scenario for providing feedback on a status indicator of a remote control device in response to an actuation of an actuator for turning on a lighting device following an actuation of an actuator for raising an intensity level of the lighting device.
Figure 11B:
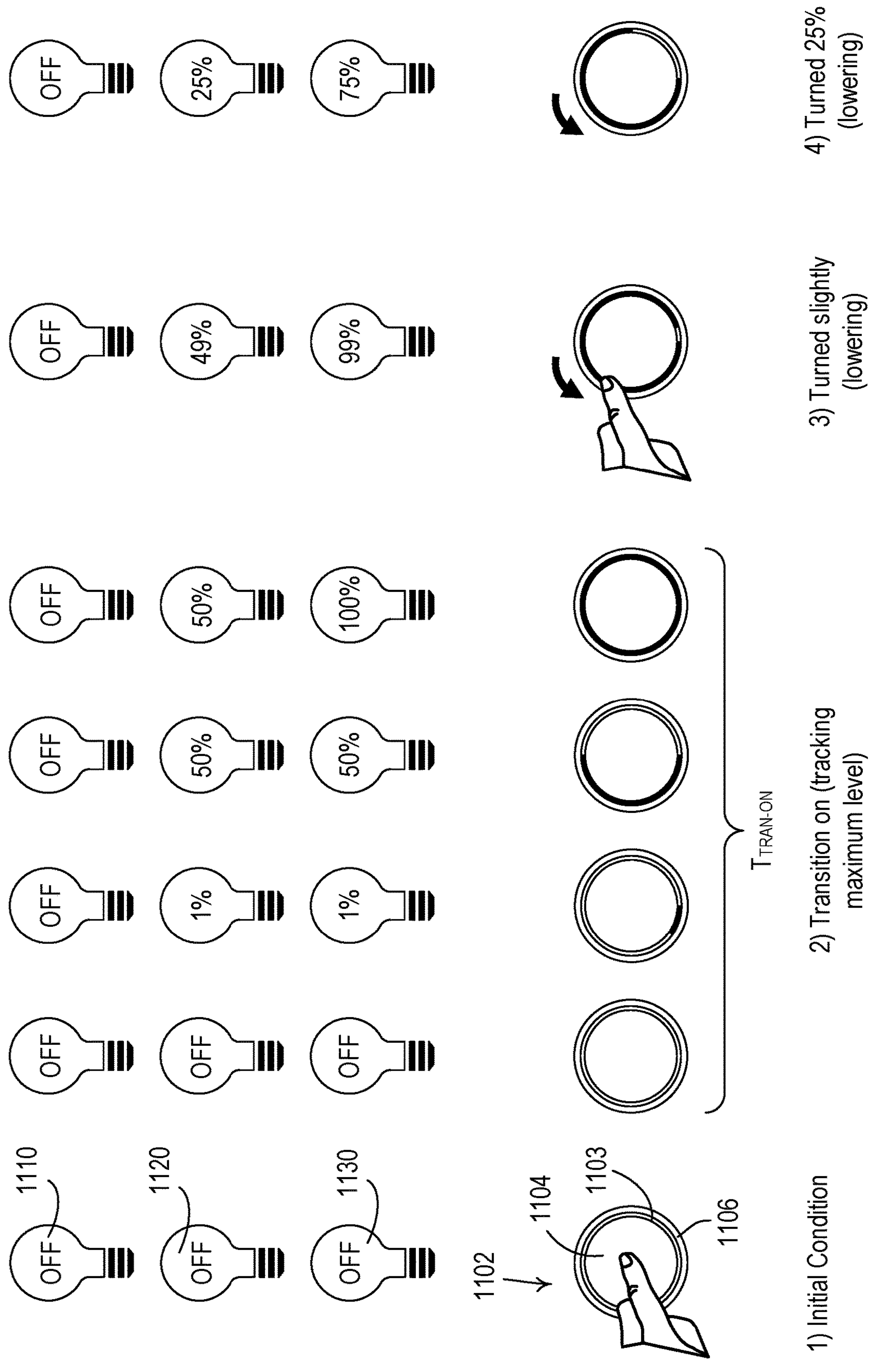
FIG. 11B illustrates an example scenario for providing feedback on a status indicator of a remote control device in response to an actuation of an actuator for turning on a lighting device following an actuation of an actuator for lowering an intensity level of the lighting device.

FIGS. 11A and 11B illustrate example scenarios for providing relative feedback via a status indicator 1103 of a remote control device 1102 in response to an actuation of an actuation portion 1104 followed by a rotation of a rotation portion 1106. As described herein, the remote control device 1102 may include a plurality of light sources (e.g., LEDs), configured to illuminate a status indicator 1103. As described herein, an actuation of the actuation portion 1104 may cause the lighting devices 1110, 1120, 1130 to turn on (e.g., an on command), and a clockwise rotation of the rotation portion 1106 may cause the lighting devices 1110, 1120, 1130 to raise the respective intensity levels (e.g., a raise command), and/or a counter-clockwise rotation of the rotation portion 2906 may cause the lighting devices 1110, 1120, 1130 to lower the respective intensity levels (e.g., a lower command). In certain situations, for example, an actuation of the actuation portion 1104 to turn on the lighting devices 1110, 1120, 1130 may be followed by a clockwise rotation of a rotation portion 1106 to increase the respective intensity levels of the lighting devices 1110, 1120, 1130 (e.g., within 200 msec). In other situations, for example, an actuation of the actuation portion 1104 to turn on the lighting devices 1110, 1120, 1130 may be followed by a counter-clockwise rotation of a rotation portion 1106 to decrease the respective intensity levels of the lighting devices 1110, 1120, 1130 (e.g., within 200 msec). The remote control device 1102 may be configured to display a transition-up animation followed by a responsive animation. A transition-up animation and a responsive animation may be types of relative feedback. For example, a responsive animation may be a type of relative feedback that tracks the intensity level of the brightest lighting device in response to an actuation of the actuation portion 1104 to turn on the lighting devices 1110, 1120, 1130 followed by a clockwise rotation of a rotation portion 1106. Similarly, in response to an actuation of the actuation portion 1104 to turn on the lighting devices 1110, 1120, 1130 that is followed by a counter-clockwise rotation of a rotation portion 1106 d, the remote control device 1102 may be configured to perform relative feedback by displaying a transition-up animation followed by displaying a responsive animation that tracks the intensity level of the brightest lighting device.

FIG. 11A illustrates an example scenario for providing relative feedback via the status indicator 1103 of the remote control device 1102 in response to an actuation of the actuation portion 1104 to turn on the lighting devices 1110, 1120, 1130 followed by a clockwise rotation of the rotation portion 1106 to increase the respective intensity levels of the lighting devices 1110, 1120, 1130. As illustrated in FIG. 11A, the lighting devices 1110, 1120, and 1130 may each be initially set to an intensity level of 0% (e.g., off). As illustrated in FIG. 11A, in response to the initial actuation of the actuation portion 1104, the remote control device 1102 may be configured to perform relative feedback by displaying a transition-up animation. The transition-up animation may include initially illuminating 0% of the status indicator and, over the transition-on period $T_{TRAN-ON}$ (e.g., 400 msec), transitioning up to illuminate 100% of the status indicator 1103. Over the transition-on period $T_{TRAN-ON}$ during which the transition-up animation is displayed, the lighting devices 1110, 1120, 1130 may change to preset intensity levels defined by an on scene that may be selected in response to the actuation of the actuation portion 1104. For example, as illustrated in FIG. 11A, the lighting devices 1110, 1120, 1130 may change to an intensity level of 0% (e.g., off), an intensity level of 50%, and an intensity level of 100%, respectively.

If the actuation of the actuation portion 1104 is followed by a clockwise rotation of a rotation portion 1106 (e.g., within 200 msec), the remote control device 1102 may be configured to perform relative feedback by displaying a responsive animation that tracks the present intensity level of the brightest associated lighting device at the end of the transition-on period $T_{TRAN-ON}$. For example, as illustrated in FIG. 11A, when the brightest lighting device is presently set to an intensity level of 100% (e.g., the lighting device 1130), the responsive animation may illuminate 100% of the status indicator 1103. As the rotation continues in the clockwise direction, the intensity levels of the associated lighting devices (e.g., that presently have intensity levels less than 100%) may increase (e.g., the lighting devices 1110, 1120). The status indicator 1103 may track the present intensity level of the brightest associated light device (e.g., the lighting device 1130) and illuminate 100% of the status indicator 1103. For example, as illustrated in FIG. 11A, when the rotation portion 1106 is rotated slightly clockwise (e.g., a relatively short distance, such as approximately 2 degrees for increasing the present intensity level by 1%), the responsive animation may continue to track the intensity level of the brightest associated lighting device and continue to illuminate 100% of the status indicator 1103. The intensity levels of lighting device 1110, and 1120 may increase to an intensity level of 1% and an intensity level of 51%, respectively. When the rotation portion 1106 is rotated approximately 52 degrees clockwise (e.g., corresponding to increasing the present intensity level by 25%), the responsive animation may continue to track the intensity level of the brightest associated lighting device and continue to illuminate 100% of the status indicator 1103. The intensity levels of the lighting devices 1110, and 1120 may increase to an intensity level of 25% and an intensity level of 75%, respectively.

FIG. 11B illustrates an example scenario for providing relative feedback via the status indicator 1103 of the remote control device 1102 in response to an actuation of the actuation portion 1104 to turn on the lighting devices 1110, 1120, 1130 followed by a counter-clockwise rotation of the rotation portion 1106 to decrease the respective intensity levels of the lighting devices 1110, 1120, 1130. As illustrated in FIG. 11B, the lighting devices 1110, 1120, 1130 may each be initially set to an intensity level of 0% (e.g., off). As illustrated in FIG. 11B, in response to the initial actuation of the actuation portion 1104, the remote control device 1102 may be configured to perform relative feedback by displaying a transition-up animation. The transition-up animation may include initially illuminating 0% of the status indicator 1103 and, over the transition-on period $T_{TRAN-ON}$ of time (e.g., 400 msec), transitioning up to illuminate 100% of the status indicator 1103. Over the transition-on period $T_{TRAN-ON}$ during which the transition-up animation is displayed, the lighting devices 1110, 1120, 1130 may change to preset intensity level defined by an on scene that may be selected in response to the actuation of the actuation portion 1104. For example, as illustrated in FIG. 11B, the lighting devices 1110, 1120, 1130 may change to an intensity level of 0% (e.g., off), an intensity level of 50%, and an intensity level of 100%, respectively.

If the actuation of the actuation portion 1104 is followed by a counter-clockwise rotation of a rotation portion 1106 (e.g., within 200 msec), the remote control device 1102 may be configured to display a responsive animation that tracks the present intensity level of the brightest associated lighting device at the end of the transition-on period $T_{TRAN-ON}$. For example, as illustrated in FIG. 11B, when the brightest lighting device is presently set to an intensity level of 100% (e.g., the lighting device 1130), the responsive animation may illuminate 100% of the status indicator 1103. As the rotation continues in the counter-clockwise direction, the intensity levels of the associated lighting devices may decrease. The status indicator 1103 may track the present intensity level of the brightest associated light device (e.g., the lighting device 1130). For example, as illustrated in FIG. 11B, when the rotation portion 1106 is rotated slightly counter-clockwise (e.g., a relatively short distance, such as approximately 2 degrees corresponding to decreasing the present intensity level by 1%), the responsive animation may continue to track the intensity level of the brightest associated lighting device and illuminate 99% of the status indicator 1103. The intensity levels of lighting device 1120 and 1130 may decrease to an intensity level of 49% and an intensity level of 99%, respectively. When the rotation portion 1102 is rotated approximately 52 degrees counter-clockwise (e.g., corresponding to increasing the present intensity level by 25%), the responsive animation may continue to track the intensity level of the brightest associated lighting device and illuminate 75% of the status indicator 1103. The intensity levels of the lighting devices 1120, and 1130 may decrease to an intensity level of 25% and an intensity of 75%, respectively.

As previously mentioned, a device may be configured to adjust the intensity of one or more associated lighting devices using relative control in response to adjustment of intensity levels of lighting devices using relative control. The relative control of the one or more associated lighting devices may be performed in response to a user interaction event, such as, a rotation of a rotation portion (e.g., the rotation portion 206). In response to the user interaction event, the device (e.g., remote control device 202 and/or the hub device 180) may be configured to transmit one or more messages (e.g., digital messages) to decrease and/or increase the intensity levels of the one or more associated lighting devices by an amount relative to the present intensity level of the one or more lighting devices. For example, the message may indicate a percentage (e.g., a percentage of a full dim range of a lighting device) to decrease and/or increase the intensity levels of the one or more associated lighting devices. Further, the amount to increase and/or decrease the intensity levels (e.g., the percentage to increase and/or decrease the present intensity levels) of the one or more lighting devices may be based on the user interaction event (e.g., the amount of rotation).

A single device may be used to perform relative control in response to a user command. For example, a remote control device (e.g., remote control device 202) may perform relative control in response to a user interaction event (e.g., a rotation of the rotation portion 204). As described herein, the user interaction event may correspond to a user command. Accordingly, the remote control device may be configured to determine a user command based on the user interaction event (e.g., an actuation of the actuation portion 204 and/or a rotation of the rotation portion 206). For example, the remote control device may be configured to determine that a clockwise rotation of the rotation portion corresponds to a raise command.

Also or alternatively, multiple devices may be used to perform relative control in response to a user command. For example, a remote control device (e.g., remote control device 202) and a master device (e.g., hub device 180) may be used to perform relative control in response to a user interaction event. The remote control device may be configured to receive a user interaction event (e.g., an actuation of the actuation portion 204 and/or a rotation of the rotation portion 206). Accordingly, the remote control device may be configured to transmit a message (e.g., a digital message) to the master device in response to the user interaction. The master device may be configured to determine a user command based on the message, user interaction, and/or a present intensity level of one or more lighting devices associated with the remote control device. For example, if the master device receives a message indicating that an actuation of the actuation portion has occurred and the present intensity level of a lighting device is greater than 0% (e.g., if any of the associated lighting devices are on), the master device may determine that the user command is an off command. Also or alternatively, if the master device receives a message indicating that a clockwise rotation of the rotation portion has occurred, the master device may determine that the user command is a raise command.

After determining a user command based on the user interaction event, the master device may transmit a message to the remote control that includes information for the remote control device to perform feedback. For example, the master device may transit a message to the remote control device indicating the lighting levels (e.g., intensity levels) of one or more paired lighting devices (e.g., lighting devices response to the remote control device). After receiving the message indicating the lighting levels, the remote control device may be configured to perform relative feedback. For example, as described herein, the remote control device may be configured to display a transition-down animation based on the lighting levels in response to an off command.

The master device may transmit one or more messages (e.g., digital messages to decrease and/or increase the intensity level) to one or more lighting devices associated with the remote control device based on the user command. For example, the master device may transmit messages to increase and/or decrease the intensity level by an amount relative (e.g., a percentage to increase and/or decrease by an amount relative) to the present intensity level of the lighting devices associated with the remote control device. Also or alternatively, the messages may include an indication of a period of time over which the increase and/or decrease in the intensity level is to occur (e.g., a fade time $T_{FADE}$). Accordingly, the master device may maintain and/or track the present intensity levels of the lighting devices associated with the remote control device. The master device may be in communication with one or more other lighting devices that are not associated with the remote control device and/or one or more additional remote control devices. Accordingly, the master device may maintain and/or track the lighting devices associated with a respective remote control device.

A remote control device (e.g., remote control device 202) may be configured to perform relative control of lighting devices and/or provide relative feedback via a status indicator of the remote control device (e.g., status indicator 203). As described herein, the remote control device may include a rotation portion (e.g., rotation portion 206). A rotation of the rotation portion may be used to perform relative control of the intensity level for one or more lighting devices. For example, a clockwise rotation of the rotation portion (e.g., a raise command) may increase the intensity level of the lighting devices. Similarly, a counter clockwise rotation of the rotation portion may decrease the intensity level of one or more lighting devices.

The remote control device may include one or more attributes to provide relative control of one or more lighting devices and/or provide relative feedback on the status indicator of the remote control device. The attributes may be configurable and/or non-configurable. The attributes may include an indication of the rotation degrees per encoder tick, which may be used to perform relative control and/or relative feedback. The attribute to indicate the rotation degrees per encoder tick may be set in a granularity of one-tenth of a degree (e.g., 0.1 degree units). The attribute indicating the rotation degrees per encoder tick may be based on the number of ticks associated with the remote control device. For example, if remote control device includes 34 ticks per rotation, the rotation degrees per encoder tick may include a value representative of 10.6 degrees (e.g., 360 degrees divided by 34 ticks). Also, or alternatively, the attribute's value may be expressed as an integer value. For example, 10.6 degrees of rotation per encoder tick may be expressed as 106.

A rotation amount may be determined based on the attribute that indicates the rotation degrees per encoder tick. For example, when the attribute indicates that the rotation degrees per encoder tick is 10.6 degrees, a rotation amount that corresponds to a single tick may indicate 10.6 degrees of rotation. Similarly, a rotation amount that corresponds to two ticks may indicate 21.2 degrees of rotation. As described herein, the amount of rotation may be used to perform relative control and/or relative feedback of the lighting devices associated with the remote control device.

The remote control device may include an attribute that indicates the degrees of travel for the full dim range of a lighting device, which may be used to perform relative control and/or relative feedback in response to a user command. The attribute that indicates the degrees of travel for the full dim range of a lighting device may be set in a granularity of one-tenth of a degree (e.g., 0.1 degree units). The attribute that indicates the degrees of travel for the full dim range of a lighting device may provide the remote control with the ability to perform relative feedback via the status indicator (e.g., display the intensity level of one or more associated lighting devices). Also or alternatively, the attribute that indicates the degrees of travel for the full dim range of a lighting device may provide the remote control with the ability to perform relative control of the lighting devices associated with the remote control device (e.g., increase and/or decrease the present intensity of the associated lighting devices by a relative amount).

The attribute that indicates the degrees of travel for the full dim range of a lighting device may be used to determine the relative amount to increase and/or decrease the present intensity level of the associated lighting devices. For example, the remote control device may be configured to determine a relationship between an amount of rotation of the rotation portion and a change in the intensity level of one or more lighting devices based on the indication of the degrees of travel for the full dim range one or more lighting devices. For example, if the degrees of travel for the full dim range of a lighting device is 210, 21 degrees of clockwise rotation (e.g., determined based on the attribute that indicates the rotation degrees per encoder tick) may increase the intensity level of the lighting device by 10% (e.g., 21 degrees of rotation divided by 210 degrees of travel for a full dim range). Similarly, if the degrees of travel for the full dim range of a lighting device is 210, 105 degrees of counterclockwise rotation may decrease the intensity level of the lighting device by 50%.

As described herein, a device may be configured to perform relative control of one or more lighting devices. Similarly, the device may be configured to perform relative feedback based on a user command. Further, multiple devices (e.g., a remote control device and/or master device) may be used to perform relative control and relative feedback. The multiple device may be configured to transmit messages (e.g., digital messages) to perform relative control and/or relative feedback. Certain messages may be transmitted by a remote control device (e.g., the remote control device 202) to a master device (e.g., the hub device 180). For example, the messages transited by the remote control device to the master device may include indications of one or more user interaction events (e.g., an actuation of the actuation portion 204 and/or a rotation of the rotation portion 206).

A remote control device may be configured to transmit one or more messages to indicate a rotation of the rotation portion (e.g., a rotation session). The remote control device may be configured to transmit a message to indicate the start of a rotation of the rotation portion (e.g., a start rotation session message). The start rotation session message may include one or more parameters. For example, the parameters may include an indication of an amount of rotation. As described herein, the amount of rotation may be determined based on an attribute, such as, the attribute to indicate the rotation degrees per encoder tick. The indication of the amount rotation may be expressed in terms of degrees. The indication of the amount of rotation may include a direction (e.g., clockwise or counter-clockwise), which may be expressed in terms of positive or negative values. For example, the remote control device may be configured to transmit a start-rotation message to indicate the start of the rotation of the rotation portion. The start-rotation message may include an initial amount of rotation. The initial amount of rotation may be a positive amount of rotation to indicate a clockwise rotation of the rotation portion (e.g., a raise command), or alternatively, a negative amount of rotation to indicate a counter-clockwise rotation (e.g., a lower command).

The remote control device may be configured to receive (e.g., expect to receive) one or more responses to the start-rotation message (e.g., a rotation-level-info message). A response to a start rotation message may provide the remote control device with the ability to provide relative feedback based on a rotation of the rotation portion (e.g., a raise command and/or a lower command) via the status indicator. As described herein, relative feedback based on the rotation of a rotation portion may include illuminating the status indicator to indicate the present intensity level of one or more lighting devices. Accordingly, a rotation-level-info message may be received in response to a start-rotation message to provide the remote control device with the ability to perform relative feedback based on the rotation of the rotation portion (e.g., a raise command or a lower command) via the status indicator. For example, the rotation-level-info message may include the present intensity levels of one or more lighting devices.

The remote control device may be configured to transmit a message to indicate an update of the rotation of the rotation portion (e.g., a rotation-update message). The rotation update message may include an indication of the cumulative amount of rotation since the rotation of the rotation portion began (e.g., the cumulative amount of rotation since a start rotation session message was transmitted). The rotation update message may include one or more parameters. For example, the parameters may indicate the total amount of rotation during the rotation session. As described herein, the total amount of rotation may be determined based on an attribute, such as, the attribute to indicate the rotation degrees per encoder tick. The indication of the cumulative amount updated rotation may be expressed in terms of degrees. The indication of the cumulative amount of rotation may include a direction (e.g., clockwise or counter-clockwise), which may be expressed in terms of positive or negative values. The rotation-update message may be periodically transmitted throughout a rotation of the rotation portion (e.g., every 100 msec).

The remote control device may be configured to transmit a message to indicate the end of a rotation of the rotation message (e.g., an end-rotation message). The end-rotation message may include one or more parameters. For example, the parameters may include an indication of cumulative amount of rotation since the rotation of the rotation portion began. As described herein, the cumulative amount of rotation may be determined based on an attribute, such as, the attribute to indicate the rotation degrees per encoder tick. The indication of the cumulative amount rotation may be expressed in terms of degrees. The indication of the cumulative amount of rotation may include a direction (e.g., clockwise or counter-clockwise), which may be expressed in terms of positive or negative values. For example, the remote control device may be configured to transmit an end-rotation message that includes a positive amount of rotation to indicate a clockwise rotation of the rotation portion (e.g., a raise command). Also, or alternatively, the remote control device may be configured to transmit an end-rotation message that includes a negative amount of rotation to indicate a counter-clockwise rotation (e.g., a lower command). The remote control device may be configured to transmit the end-rotation message when rotation of the rotation portion stops for a certain period of time. After transmitting the end-rotation message, the remote control device may be configured to sleep (e.g., stop tracking rotation of the rotation portion).

The remote control device may be configured to transmit a message (e.g., a button-press message) to indicate a single actuation of the actuation portion. As described herein, a single actuation of the actuation portion may indicate a command type (e.g., either an on command or an off command). For example, the on command may cause the associated lighting devices to turn on to intensity levels defined by an on scene. Further, in order to provide relative feedback based on a single actuation of the actuation portion, the remote control device may be configured to determine whether a single actuation of the actuation portion indicates an on command or an off command. Accordingly, the remote control device may be configured to receive (e.g., expect to receive) one or more responses to the button-press message (e.g., a transition-level-info message) to indicate the user command.

A response to the button-press message (e.g., a transition-level-info message) may provide the remote control device with the ability to provide the relative feedback based on an actuation of the actuation portion (e.g., relative feedback in response to an on command and/or an off command) via the status indicator. As described herein, relative feedback based on the actuation of the actuation portion may include displaying an animation (e.g., a transition-up animation and/or transition-down animation) depending on the of user command. Accordingly, a transition-level-info message may include a starting illumination $L_{START}$ and an ending illumination $L_{END}$ for the animation, as well as a transition time over which the remote control device may adjust the status indicator from the starting illumination $L_{START}$ to the ending illumination $L_{END}$. For example, the starting illumination $L_{START}$ may be less than the ending illumination $L_{END}$ for a transition-up animation, and the starting illumination $L_{START}$ may be greater than the ending illumination $L_{END}$ for a transition-down animation.

The remote control device may be configured to transmit a message (e.g., a double-press message) to indicate a double actuation of the actuation portion (e.g., two single actuations of the actuation portion in succession over a period of time). As described herein, a double actuation of the actuation portion may indicate a full-on command (e.g., a command to transition the intensity levels of the associated lighting devices to 100%). Accordingly, the remote control device may be configured to receive (e.g., expect to receive) one or more response to the double button press message (e.g., a transition-level-info message). A response to a double-press message may provide the remote control device with the ability to provide the relative feedback in response to a double actuation of the actuation portion. As described herein, relative feedback based on the double actuation of the actuation portion may include displaying an animation (e.g., a transition-up animation) via the status indicator. Accordingly, a transition-level-info message may include a starting illumination $L_{START}$ and/or an ending illumination $L_{END}$ for the animation, as well as a transition time $T_{TRAN}$ over which the remote control device may adjust the status indicator from the starting illumination $L_{START}$ to the ending illumination $L_{END}$.

A master device (e.g., the hub device 180) may be configured to transmit one or more messages (e.g., digital messages) to perform relative control of one or more lighting devices and/or provide relative feedback. For example, certain messages may be transmitted by the master device to the remote control device to provide the remote control device with the ability to perform relative feedback. Other messages may be transmitted by the master device may be transmitted to one or more lighting devices to perform relative control.

A master device may be configured to transmit a message to provide a remote control device with the ability to perform relative feedback in response to a rotation of the rotation portion (e.g., a raise command and/or a lower command). For example, the master device may be configured to transmit a rotation-level-info message to the remote control device in response to receiving a start-rotation message from the remote control device. The rotation session level message may include one or more parameters. A parameter may include an indication of a highest intensity level $L_{HI}$ of the lighting devices (e.g., the present intensity level of a brightest lighting device) controlled by a remote control device. Another parameter may include an indication of a lowest intensity level $L_{LO}$ of the lighting devices (e.g., the present intensity level of a dimmest lighting device) controlled by a remote control device. As described herein, in response to receiving the rotation-level-info message, the remote control device may be configured to display a responsive animation (e.g., tracking the intensity level of an associated lighting device) in response to a rotation of the rotation portion.

A master device may be configured to transmit a message (e.g., a transition-level-info message) to provide a remote control device with the ability to perform relative feedback in response actuations of the actuation portion (e.g., an on command, an off command, and/or a full-on command). For example, the master device may be configured to transmit a transition-level-info message in response to receiving a button-press message and/or a double-press message. The transition-level-info message may include one or more parameters. A parameter may include an indication of a starting illumination $L_{START}$ to be initially displayed in an animation (e.g., a transition-up animation and/or transition-down animation). Another parameter may include an indication of an ending illumination $L_{END}$ to be displayed at the end of the animation (e.g., the transition-up animation and/or the transition-down animation). Another parameter may include an indication of the transition time (e.g., an amount of time to transition from the starting illumination $L_{START}$ to the ending illumination $L_{END}$). As described herein: the starting illumination $L_{START}$ and/or the ending illumination $L_{END}$ may be dependent upon the intensity levels of one or more lighting devices.

A master device may be configured to transmit a message to perform relative control a lighting device (e.g., a move-to-level message). For example, a master device may be configured to transmit a move-to-level message in response to receiving an indication of a user interaction event (e.g., an actuation of the actuation portion 206 and/or a rotation of the rotation portion 204) and/or user command (e.g., an on command, an off command, a raise command, and/or a lower command). The move-to-level message may include one or more parameters. A parameter may indicate an intensity level to which a lighting device may change. The parameter indicating the intensity level to which to change to may be expressed in terms of a percentage (e.g., an intensity level of 30%). Another parameter may include an indication of an amount of time over which the lighting device should transition to the indicated intensity level (e.g., a fade time $T_{FADE}$). As described herein, the fade time $T_{FADE}$ may be approximately equal to a transition time $T_{TRAN}$ used by a remote control device performing relative feedback (e.g., the transition-on period $T_{TRAN\text{-}ON}$ and/or the transition-off period $T_{TRAN\text{-}OFF}$). For example, if the move-to-level command is transmitted in response to an actuation of the actuation portion to turn off the lighting devices (e.g., an off command), the fade time $T_{FADE}$ indicated in the move-to-level message and the transition time $T_{TRAN}$ used in an animation displayed by the remote control device performing relative feedback (e.g., a transition-down animation) may be the same (e.g., 750 msec). Accordingly, the transitioning of the animation and the fading of the intensity levels may be completed simultaneously.

Figure 12A:
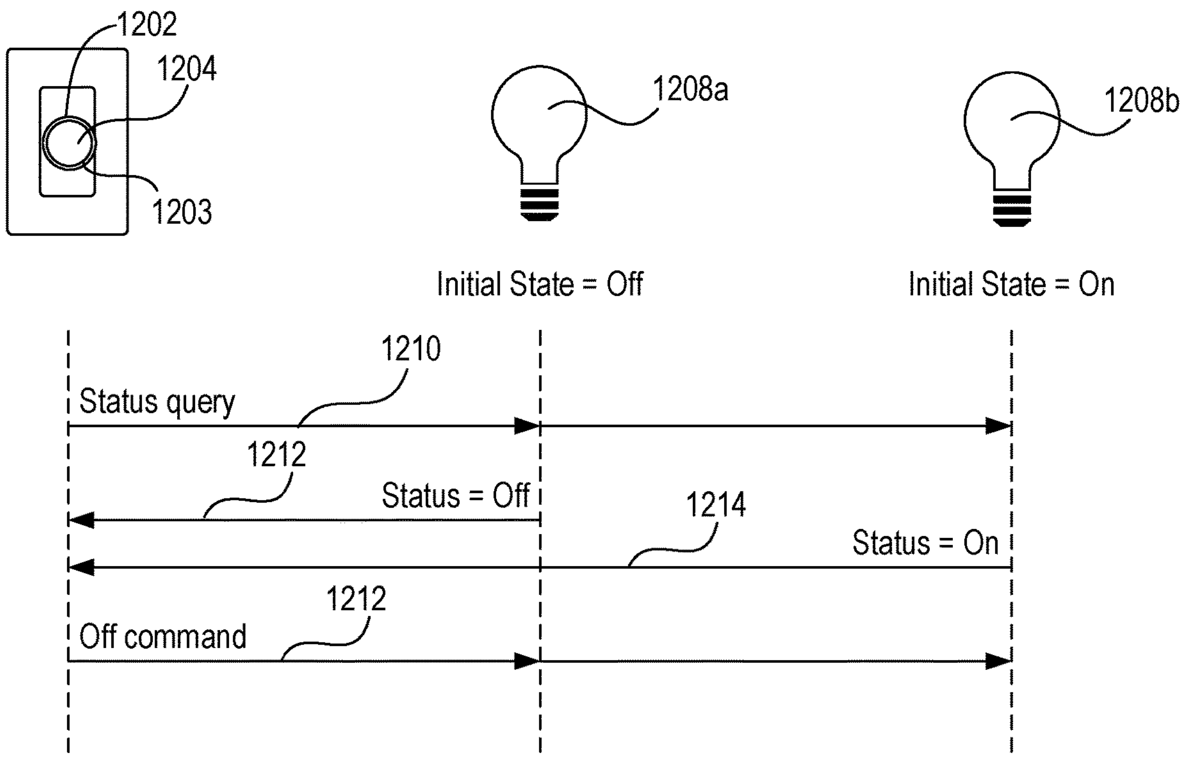
FIGS. 12A-12C are communication sequence diagrams depicting example message flows for querying for a current status of lighting devices and generating lighting control commands in response to the identified status.
Figure 12B:
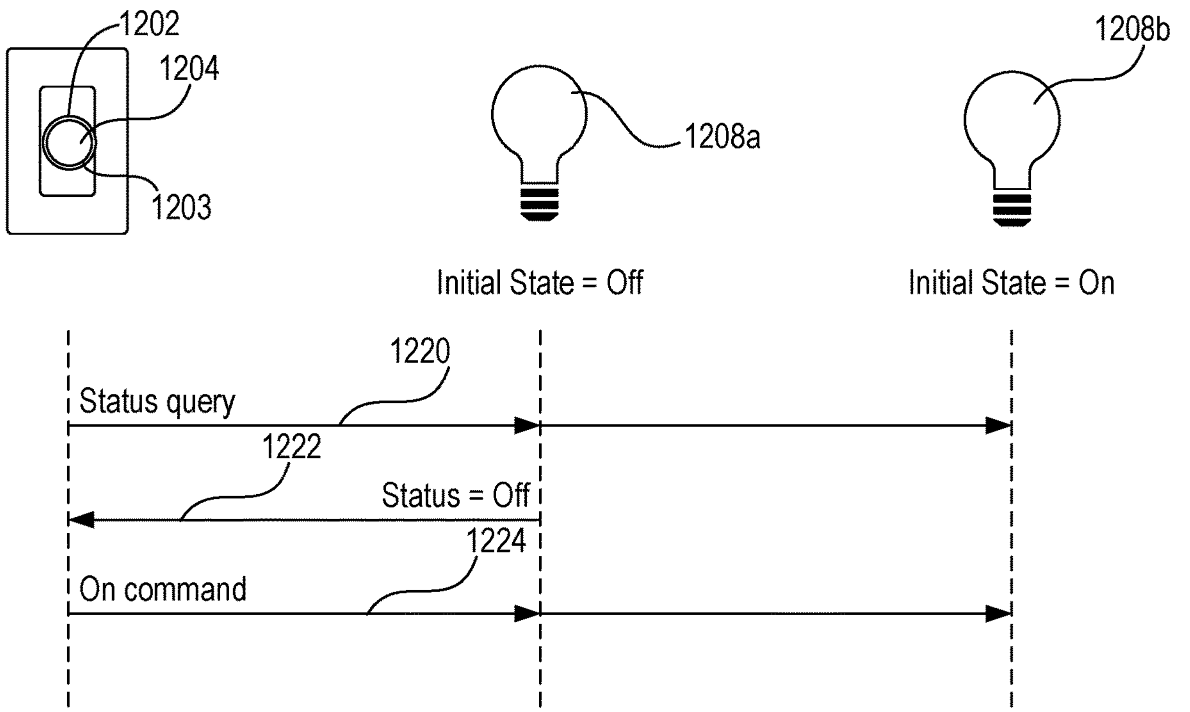
Figure 12C:
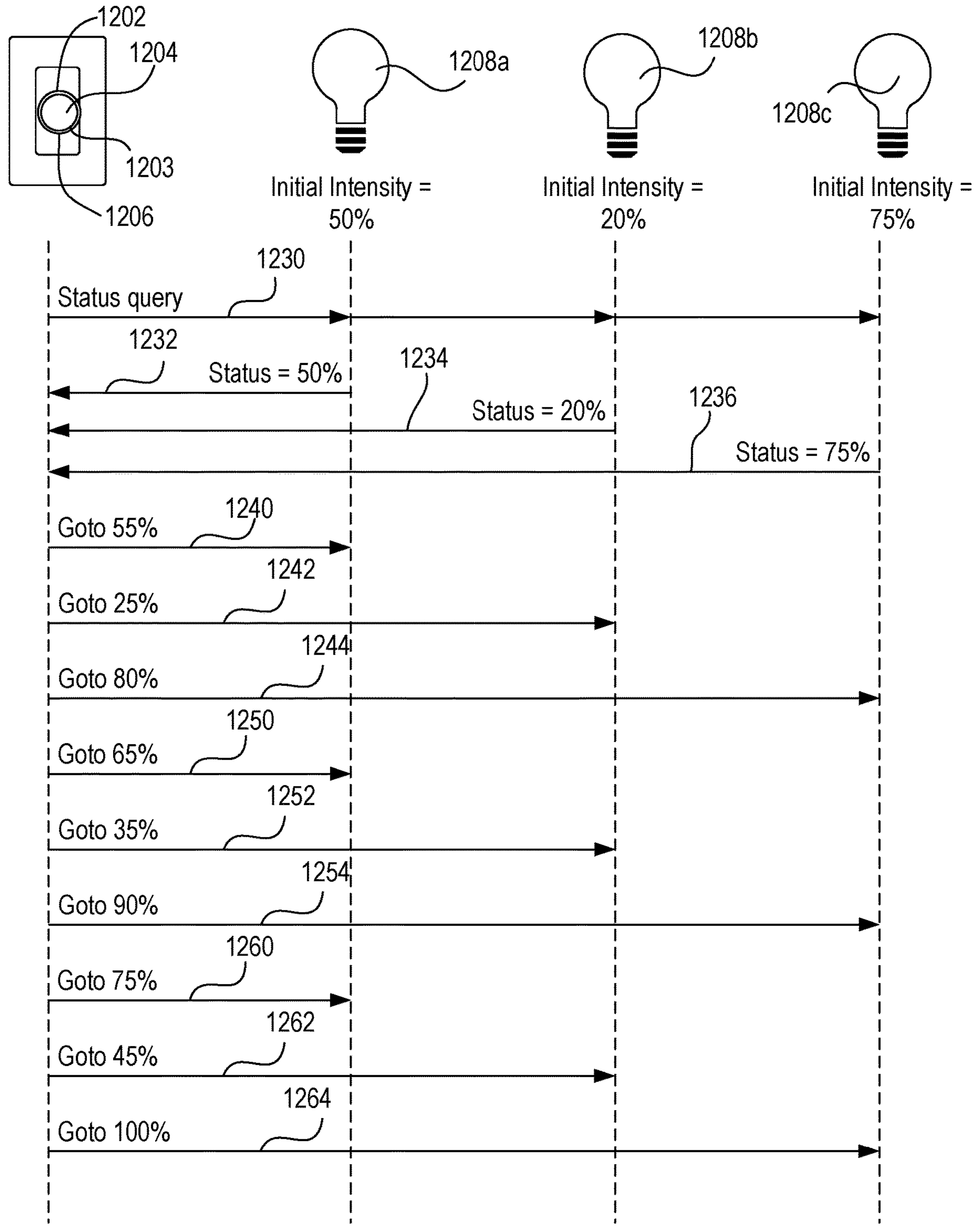

FIGS. 12A-12C are communication sequence diagrams depicting example message flows (e.g., digital message flows) for generating lighting control commands in response to an actuation of an actuator (e.g., the actuation portion 117 and/or the rotation portion 118 of the remote control device 116). FIGS. 12A and 12B depict example message flows for querying for current statuses of one or more lighting devices 1208*a*, 1208*b* (e.g., the lighting devices 112*a*, 112*b*, 122) in response to an actuation of an actuation portion 1204 and generating lighting control commands in response to the identified status. As shown in FIG. 12A, the remote control device 1202 may transmit a status query message 1210 for identifying the status of the lighting devices 1208*a*, 1208*b*. The status query message 1210 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 1210 may be sent as a multicast message (e.g., as shown in FIG. 12A) or individual unicast messages that are received by the lighting devices 1208*a*, 1208*b*.

The remote control device 1202 may receive a response to the status query message 1210 from each of the lighting devices 1208*a*, 1208*b* that receive the status query message 1210 and/or with which the remote control device 1202 is associated. For example, the lighting device 1208*a* may transmit a status response message 1212 in response to the status query message 1210 that indicates that the lighting device 1208*a* is in the off state. The lighting device 1208*b* may transmit a status response message 1214 in response to the status query message 1210 that indicates that the lighting device 1208*b* is in the on state. The status response messages may also, or alternatively, indicate an intensity level (e.g., a lighting level or brightness), a color (e.g., a color temperature), or other status of the lighting device from which the status message is transmitted.

If the remote control device 1202 determines that any of the lighting devices 1208*a*, 1208*b* are in the on state, the remote control device 1202 may be configured to transmit an off command 1216. The off command 1216 may be sent as a multicast message (e.g., as shown in FIG. 12A) or individual unicast messages that are received by the lighting devices 1208*a*, 1208*b*. Though an off command 1216 may be transmitted as shown in FIG. 12A, the remote control device 1202 may transmit an on command or another command in response to identifying the statuses of one or more of the lighting devices 1208*a*, 1208*b*. The lighting device 1208*b* may turn off in response to receiving the off command 1216.

As shown in FIG. 12B, the remote control device 1202 may determine the control instructions for being sent to the lighting devices 1208*a*, 1208*b* based on the statuses of a subset of the lighting devices 1208*a*, 1208*b*. For example, the remote control device 1202 may determine the control instructions for being sent to the lighting devices 1208*a*, 1208*b* based on the statuses of one or more of the lighting devices that respond to a status query message 1220 (e.g., the first lighting device to respond to the status query message 1210 as shown in FIG. 12B). The remote control device 1202 may control the states of both of the lighting devices 1208*a*, 1208*b* (e.g., in response to the status query message 1210) by sending a command to control the lighting devices. As shown in FIG. 12B, the remote control device 1202 may respond to the status of the lighting device 1208*a* (e.g., the first lighting device to respond to a status query message 1200). For example, the status query message 1220 may be sent as a multicast message (e.g., as shown in FIG. 12B) or a unicast message to each lighting device 1208*a*, 1208*b*. The lighting device 1208*a* may be the first device to receive the status query message 1220 and/or from which a status response message 1222 is received in response. The status response message 1222 may indicate the status of the lighting device 1208*a*, which may cause the remote control device 1202 to send a command to control the lighting devices 1208*a*, 1208*b* to the opposites states (e.g., an on command 1224). The on command 1224 may be sent as a multicast message (e.g., as shown in FIG. 12B) or a unicast message. While not shown in FIG. 12B, the lighting device 1208*b* may be the first device to receive the status query message 1220 and/or from which a status response message is received in response. The status response message may indicate the status of the lighting device 1208*b*, which may cause the remote control device 1202 to send a command to control the lighting devices 1208*a*, 1208*b* to the opposite state (e.g., the off command 1234). The off command 1234 may be sent as a multicast message or a unicast message.

FIG. 12C depicts an example message flow for querying for a current status (e.g., intensity levels) of lighting devices in response to an actuation of an intensity adjustment actuator (e.g., the rotation portion 118) and generating lighting control commands in response to the identified statuses. As shown in FIG. 12C, the remote control device 1202 may transmit a status query message 1230 for identifying the intensity level of lighting devices, such as lighting devices 1208*a*, 1208*b*, 1208*c*. The status query message 1230 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 1230 may be sent as a multicast message (e.g., as shown in FIG. 12C) or individual unicast messages that are received by the lighting devices 1208*a*, 1208*b*, 1208*c*.

The remote control device 1202 may determine the control instructions for being sent to the lighting devices 1208*a*, 1208*b*, 1208*c* based on the statuses of one or more of the lighting devices 1208*a*, 1208*b*, 1208*c* (e.g., a subset of the lighting devices). For example, the remote control device 1202 may determine the control instructions for being sent to the lighting devices 1208*a*, 1208*b*, 1208*c* based on the status (e.g., an intensity level) of a first lighting device to respond to the status query message 1230. In addition, the remote control device 1202 may determine the control instructions for being sent to the lighting devices 1208*a*, 1208*b*, 1208*c* based on the statuses (e.g., intensity levels) of the lighting devices that respond to the status query message 1230 with a timeout period (e.g., each of the lighting devices 1208*a*, 1208*b*, 1208*c* as shown in FIG. 12C). For example, the lighting device 1208*a* may transmit a status response message 1232 that may indicate that the lighting device 1208*a* is at an intensity level of 50%, the lighting device 1208*b* may transmit a status response message 1234 that may indicate that the lighting device 1208*b* is at an intensity level of 20%, and the lighting device 1208*c* may transmit a status response message 1236 that may indicate that the lighting device 1208*c* is at an intensity level of 75% within the timeout period as shown in FIG. 12C.

The remote control device 1202 may control the intensity levels of each of the lighting devices 1208*a*, 1208*b*, 1208*c* based the intensity levels of the lighting devices 1208*a*, 1208*b*, 1208*c* that responded to the status query message 1230 with the timeout period. For example, the remote control device 1202 may be configured to provide relative control of the intensity levels of each of the lighting devices 1208*a*, 1208*b*, 1208*c* as shown in FIG. 12C. The remote control device 1202 may be configured to control the intensity levels of the lighting devices from which the remote control did not receive a status response message based on the intensity levels of the lighting devices from which the remote control did receive a status response message (e.g., a brightest or dimmest lighting device from which a status response message was received).

The remote control device 1202 may use the intensity levels of the lighting devices 1208*a*, 1208*b*, 1208*c* that respond to the status query message 1230 (e.g., the intensity levels of each of the lighting devices) to control the lighting devices. In response to receiving the status response messages 1232, 1234, 1236, the remote control device 1202 may transmit a command message 1240 including a move-to-level command (e.g., a goto command) to go to an updated intensity level $L_{UPDATED}$ of 55% to the lighting device 1208*a*. The remote control device 1202 may then transmit a command message 1242 including a move-to-level command to go to an updated intensity level $L_{UPDATED}$ of 25% to the lighting device 1208*b*, and transmit a command message 1244 including a move-to-level command to go to an updated intensity level $L_{UPDATED}$ of 80% to the lighting device 1208*c*. The command messages 1240, 1242, 1244 may be transmitted as unicast messages (e.g., as shown in FIG. 12C). The remote control device 1202 may be configured to determine a desired amount of change in the intensity levels of each of the lighting devices 1208*a*, 1208*b*, 1208*c* in response to an amount of rotation of the rotation portion (e.g., a change in an angular position of the rotation portion) since the rotation of the rotation portion first began until the command message 1240 is transmitted, and to determine the updated intensity level $L_{UPDATED}$ to which to control the lighting devices 1208*a*, 1208*b*, 1208*c* in response to the desired amount of change in the intensity level.

The remote control device 1202 may continue to transmit command messages to the lighting devices 1208*a*, 1208*b*, 1208*c* as the rotation portion is rotated. For example, the remote control device 1202 may transmit command messages 1250, 1252, 1254 to the respective lighting devices 1208*a*, 1208*b*, 1208*c*, where the command messages each include a respective move-to-level command to go to updated intensity levels $L_{UPDATED}$ of 65%, 35%, and 90%, respectively. The command messages 1250, 1252, 1254 may be transmitted as unicast messages (e.g., as shown in FIG. 12C). The remote control device 1202 may be configured to determine the updated intensity levels $L_{UPDATED}$ to which to control the lighting devices 1208*a*, 1208*b*, 1208*c* in response to an amount of rotation of the rotation portion since the command message 1240 was transmitted until the command message 1250 is transmitted.

The remote control device 1202 may then transmit command messages 1260, 1262, 1264 to the respective lighting devices 1208*a*, 1208*b*, 1208*c*, where the command messages each include a respective move-to-level command to go to updated intensity levels $L_{UPDATED}$ of 75%, 45%, and 100%, respectively. The command messages 1260, 1262, 1264 may be transmitted as unicast messages (e.g., as shown in FIG. 12C). The remote control device 1202 may be configured to determine the updated intensity levels $L_{UPDATED}$ to which to control the lighting devices 1208*a*, 1208*b*, 1208*c* in response to an amount of rotation of the rotation portion since the command message 1250 was transmitted until the command message 1260 is transmitted.

FIGS. 13A-13D are communication sequence diagrams depicting example message flows using the messages (e.g., digital messages) described herein. As described herein, the message may be transmitted by a remote control device 1302 (e.g., the remote control device 116) and/or a master device 1305 (e.g., the hub device 180). Further, the remote control device 1302 and/or the master device 1305 may be configured to transmit the messages to perform relative feedback and/or relative control.

Figure 13A:
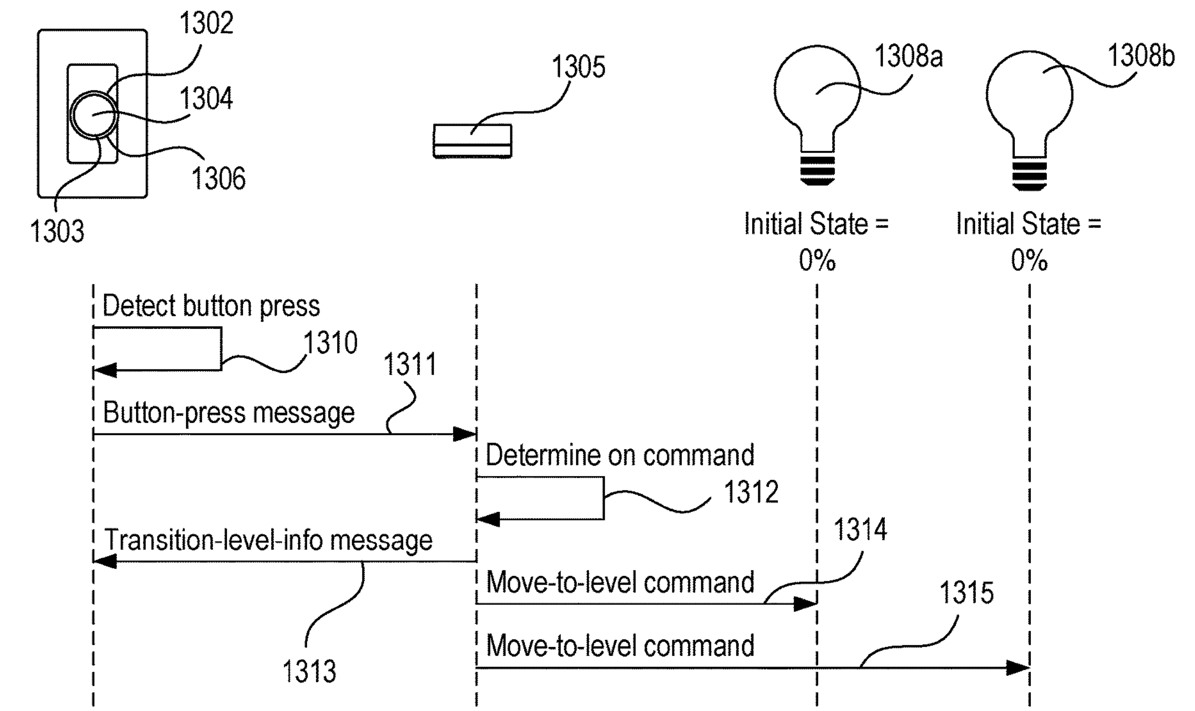
FIG. 13A illustrates a communication sequence diagram depicting example message flows transmitted for performing relative control of one or more lighting devices and providing relative feedback in response to an actuation of an actuator for turning on a lighting device.

FIG. 13A illustrates a communication sequence diagram depicting example message flows (e.g., digital message flows) for performing relative control of lighting devices 1308*a*, 1308*b* and providing relative feedback via a status indicator 1303 of the remote control device 1302 in response to an actuation of an actuation portion 1304 to turn on the lighting devices (e.g., an on command). The lighting devices 1308*a* and/or 1308*b* may be associated with the remote control device 1302. As described herein, the remote control device 1302 may also include a rotation portion 1306. The master device 1305 may maintain and/or track the present state of lighting devices 1308*a*, 1308*b*. Also, or alternatively, the master device may be in communication with additional lighting devices. Similarly, the master device 1305 may be in communication with additional remote control devices. Accordingly, the master device 1305 may maintain and/or track which remote control device that a respective lighting device is associated with. Also or alternatively, the master device 1305 may maintain the preset states of one or more associated lighting devices defined by a scene.

The remote control device 1302 may detect a button press (e.g., an actuation of the actuation portion 1304) at 1310. The remote control device may be configured to awaken from a sleep state after detecting a button press. At 1311, the remote control device 1302 may be configured to transmit a button-press message that indicates that a button press has occurred to the master device 1305. As described herein, a button press may indicate an on command and/or an off command. Accordingly, in response to receiving the button-press message, the master device 1305 may be configured to determine a user command.

The master device 1305 may determine a user command in response to receiving a button-press message based on the present state of lighting devices 1308*a*, 1308*b*. For example, if the present states of the lighting devices associated with the remote control device 1302 (e.g., each of the lighting devices associated with the remote control device) are off (e.g., 0% states), the master device 1305 may determine an on command. Also or alternatively, if the present states of lighting devices associated with the remote control device 192 are states that are greater than 0%, the master device may determine an off command. Accordingly, as illustrated in FIG. 13A, at 1312 the master device 1305 may determine an on command based on the 0% initial states of the lighting devices 1308*a*, 1308*b*. After determining that the user command is an on command, the master device 1305 may determine preset states for the lighting devices 1308*a*, 1308*b* defined by a scene (e.g., an on scene). As described herein, the master device 1305 may store the preset states of one the lighting devices 1308*a*, 1308*b* defined by the scene.

The master device 1305 may transmit a transition-level-info message to the remote control device 1302 at 1313. As described herein, the transition-level-info message may provide the remote control device 1302 with the ability to perform relative feedback of the on command. For example, a transition-level-info message may include a starting illumination $L_{START}$ to be initially displayed in an animation, an ending illumination $L_{END}$ to be displayed at the end of the animation, and/or a transition time $T_{TRAN}$ (e.g., the amount of time to transition from the starting illumination $L_{START}$ to the ending illumination $L_{END}$). As illustrated in FIG. 13A, at 1314 the master device 1305 may transmit a transition-level-info message that includes an indication that the starting illumination $L_{START}$ is 0%, an indication that the ending illumination $L_{END}$ is 80%, and/or an indication that the transition time $T_{TRAN}$ is 400 msec. As described herein, the remote control device 1302 may perform relative feedback of the on command by displaying a transition-up animation. The transition-up animation may include initially illuminating 0% of the status indicator and transitioning over a period of 400 msec to illuminating 80% of the status indictor. Further, as described herein, the transition of the transition-up animation and the change of the intensity levels of the lighting devices 1308*a*, 1308*b* to 80% may complete simultaneously.

The master device 1305 may transmit one or more move-to-level messages to the lighting devices 1308*a*, 1308*b*. As described herein, the move-to-level messages may each include a state (e.g., an intensity level) to which to change and/or a period of time over which the change to the indicated state occurs. Accordingly, at 1314, the master device 1305 may transmit a move-to-level message to lighting device 1308*a*. Similarly, at 1315, the master device 1305 may transmit a move-to-level message to the lighting device 1336*b*. As illustrated in FIG. 13A, the move-to-level messages may each include an indication that lighting devices 1308*a*, 1308*a* are to change to an intensity level of 80% over a period of 400 ms. As described herein, the adjustment of the lighting devices 1308*a*, 1308*b* to intensity levels of 80% and the transition of the transition-up animation to illuminate 80% of the status indicator 1303 may occur simultaneously.

Figure 13B:
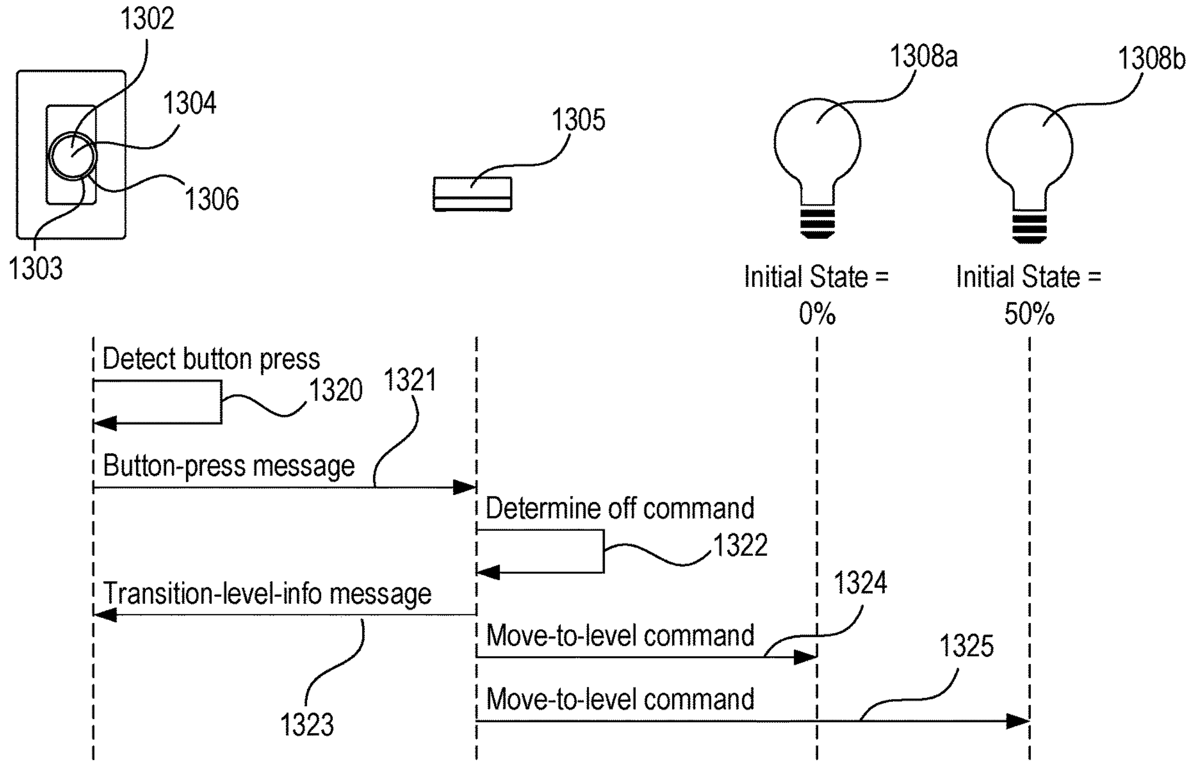
FIG. 13B illustrates a communication sequence diagram depicting example message flows transmitted for performing relative control of one or more lighting devices and providing relative feedback in response to an actuation of an actuator for turning off a lighting device.

FIG. 13B illustrates a communication sequence diagram depicting example message flows (e.g., digital message flows) transmitted for performing relative control of the lighting devices 1308*a*, 1308*b* and providing relative feedback via the status indicator 1303 of the remote control device 1292 in response to an actuation of the actuation portion 1304 to turn off the lighting devices (e.g., an off command). The remote control device 1302 may detect a button press (e.g., an actuation of the actuation portion 1304)

at 1320. The remote control device 1302 may be configured to awake from a sleep state after detecting a button press. At 1321, the remote control device 1302 may be configured to transmit a button-press message that indicates that a button press has occurred to the master device 1305. As described herein, a button press may indicate an on command and/or an off command. Accordingly, in response to receiving the button-press message, the master device 1305 may be configured to determine a user command.

The master device may determine a user command in response to receiving a button-press message based on the present state of lighting devices 1308*a*, 1308*b*. For example, if the present states of the lighting devices 1308*a*, 1308*b* associated with the remote control device 1302 includes an intensity level greater than 0% (e.g., if any of the lighting devices are on), the master device may determine an off command. Accordingly, as illustrated in FIG. 13B, at 1322 the master device may determine an off command based on the present intensity level of the lighting device 1308*b* is 50%.

The master device 1305 may transmit a transition-level-info message to the remote control device 1302 at 1323. As described herein, the transition-level-info message may provide the remote control device 1302 with the ability to perform relative feedback in response to the off command. The transition level information message may include a starting illumination $L_{START}$ to be initially displayed in an animation, an ending illumination $L_{END}$ to be displayed at the end of the animation, and/or a transition time $T_{TRAN}$ (e.g., an amount of time to transition from the starting illumination $L_{START}$ to the ending illumination $L_{END}$). For example, at 1323 the master device may transmit a transition-level-info message that includes an indication that the starting illumination $L_{START}$ is 50%, an indication that the ending illumination $L_{END}$ is 0%, and an indication that the transition time $T_{TRAN}$ is 750 msec. As described herein, the remote control device 1302 may perform relative feedback in response to the off command by displaying a transition-down animation. The transition-down animation may include initially illuminating 50% of the status indicator and transitioning over a period of 750 msec to illuminating 0% of the status indictor. Further, as described herein, the transition of the transition-down animation and the adjustment of the intensity levels of the lighting devices 1306*a*, 1306*b* to 0% may complete simultaneously.

The master device 1305 may transmit one or more move-to-level messages to the lighting devices 1308*a*, 1308*b*. As described herein, the move-to-level message may include a state (e.g., an intensity level) to which to change and/or a period of time over which the change occurs. Accordingly, at 1324, the master device 1305 may transmit a move-to-level message to the lighting device 1308*a*. Similarly, at 1325, the master device 1305 may transmit a move-to-level message to lighting device 1306*b*. As illustrated in FIG. 13B, the move-to-level messages transmitted to the lighting devices 1308*a* and 1308*b* may each include an indication that lighting devices 1308*a*, 1308*a* are to change to an intensity level of 0% over a period of 750 msec. As described herein, the adjustment of the lighting devices 1308*a*, 1308*b* to intensity levels of 0% and the transition of the transition-down animation to illuminate 0% of the status indicator 1303 may occur simultaneously.

Figure 13C:
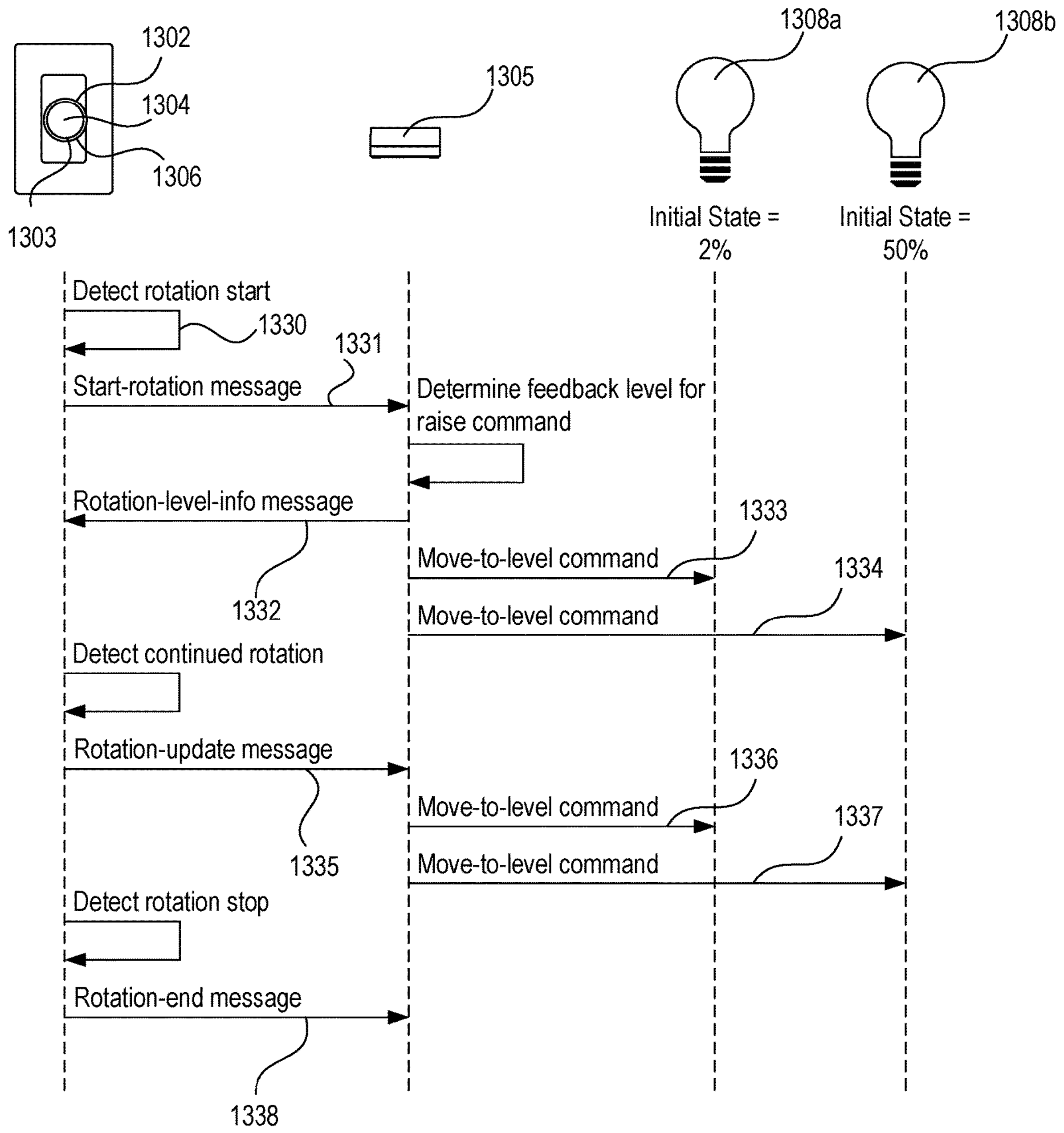
FIG. 13C illustrates a communication sequence diagram depicting example message flows transmitted for performing relative control of one or more lighting devices and providing relative feedback in response to an actuation of an actuator for raising an intensity level of a lighting device.

FIG. 13C illustrates a communication sequence diagram depicting example message flows (e.g., digital message flows) transmitted for performing relative control of the lighting devices 1308*a*, 1308*b* and providing relative feedback via the status indicator 1303 of the remote control device 1302 in response to a rotation of the rotation portion 1306 to raise the intensity levels of the lighting devices (e.g., a raise command). The remote control device 1302 may detect a clockwise rotation of the rotation portion 1306 at 1330. As described herein, a rotation of the rotation portion 1306 may awaken the remote control device 1302 from a sleep state. The remote control device 1302 may be configured to transmit a message to the master device 1305 that indicates that a rotation of the rotation portion 1306 has occurred (e.g., a start-rotation message) at 1331. As described herein, a start-rotation message may include an indication of the amount of rotation (e.g., based on an attribute that indicates the rotation degrees per encoder tick) and/or the direction of rotation. For example, the start-rotation message may include an indication that the rotation portion has been rotated 10.6 degrees clockwise.

In response to receiving the start-rotation message, the master device 1305 may be configured to transmit a rotation-level-info message to the remote control device 1302 at 1332. As described herein, the rotation-level-info message may include an indication of the present intensity levels of the lighting devices 1308*a*, 1308*b* associated with the remote control device 1302 (e.g., a lowest intensity level $L_{LO}$ and a highest intensity level $L_{HI}$ of the lighting devices of the lighting devices). As illustrated in FIG. 13C, the rotation-level-info message may indicate that the lowest intensity level $L_{LO}$ of the lighting devices 1308*a*, 1308*b* is 2% and the highest intensity level $L_{HI}$ is 50%.

The rotation-level-info message may provide the remote control device 1302 with the ability to perform relative feedback via the status indicator 1303. As described herein, in response to a clockwise rotation of the rotation portion (e.g., a raise command), the remote control device 1302 may be configured to perform relative feedback by displaying a responsive animation via the status indicator 1303. The responsive animation may indicate the state of the dimmest associated lighting device based on the amount and direction of rotation. For example, referring to FIG. 13C, the responsive animation may track the intensity level of the lighting device 1308*a* via the status indicator 1303. The responsive animation may start by indicating the lowest intensity level $L_{LO}$ of the lighting devices 1308*a*, 1308*b* included in the rotation-level-info message.

The master device 1305 may be configured to determine a user command based on the start-rotation message and/or an attribute of the remote control device 1302. For example, the master device 1305 may be configured to determine the user command based on the amount and direction of rotation indicated by the start-rotation message, and/or an attribute of the remote control device 1302 (e.g., indicating that the degrees of travel for the full dim range of a lighting device is 210 degrees). As illustrated in FIG. 13C, the master device 1305 may determine that the user command includes a command to raise the intensity levels of the lighting devices 1308*a*, 1308*b* by 5% based on receiving a start-rotation message that indicates 10.6 degrees of clockwise rotation (e.g., 10.6/210=5%).

After determining the user command, the master device 1305 may be configured to perform relative control of the associated lighting devices 1308*a*, 1308*b*. The master device 1305 may be configured to perform relative control by transmitting one or more move-to-level commands to the associated lighting devices 1308*a*, 1308*b*. As described herein, the move-to-level commands may each include an indication of an updated intensity level to which to change the associated lighting device and/or and indication of a period of time over which the change to the indicated intensity level is to occur. For example, as illustrated in FIG. 13C, the master device 1305 may transmit a move-to-level command that indicates to change the intensity level to 7% over 100 ms to the first lighting device 1308*a* at 1333. Similarly, the master device 1305 may transmit a move-to-level command that indicates to change the intensity level to 55% over 100 ms to the second lighting device 1308*b* at 1334.

The remote control device 1302 may be configured to periodically transmit (e.g., every 100 msec) a rotation-update message that indicates the amount of rotation in response to detecting continued rotation to the master device 1305. As described herein, the rotation-update message may include an indication of the cumulative amount of rotation since the rotation of the rotation portion began, which may be expressed in units of degrees. For example, as illustrated in FIG. 13C, the remote control device 1302 may be configured to transmit a rotation-update message to the master device 1305 at 1335. The rotation-update message may indicate that, since the start-rotation message was sent, the rotation portion 1306 has been rotation a total of 42.4 degrees clockwise.

In response to receiving a rotation-update message, the master device 1305 may be configured to perform relative control based on the updated amount of rotation. As described herein, the master device 1305 may determine a percentage to increase and/or decrease the present intensity levels of the associated light devices 1308*a*, 1308*b* based on the rotation update message and/or the degrees of travel for the full dim range attribute. For example, as illustrated in FIG. 13C, the master device 1305 may determine to increase the present state of the associated lighting devices 1308*a*, 1308*b* by 15. Accordingly, the master device 1305 may transmit a move-to-level command indicating a change to an intensity level of 22% over 100 ms to the first lighting device 1308*a* at 1336. Similarly, the master device 1305 may transmit a move-to-level command indicating a change to an intensity level of 70% over 100 ms to the second lighting device 1308*b* at 1337.

The remote control device 1302 may be configured to transmit an end-rotation message after detecting that rotation of the rotation portion has stopped. As described herein, the end-rotation message may include a parameter that indicates the total amount of rotation during the rotation session, which may be expressed in degrees. For example, as illustrated in FIG. 13C, the remote control device 1302 may be configured to transit an end-rotation message indicating a total of 42.4 degrees of clockwise rotation at 1338.

Figure 13D:
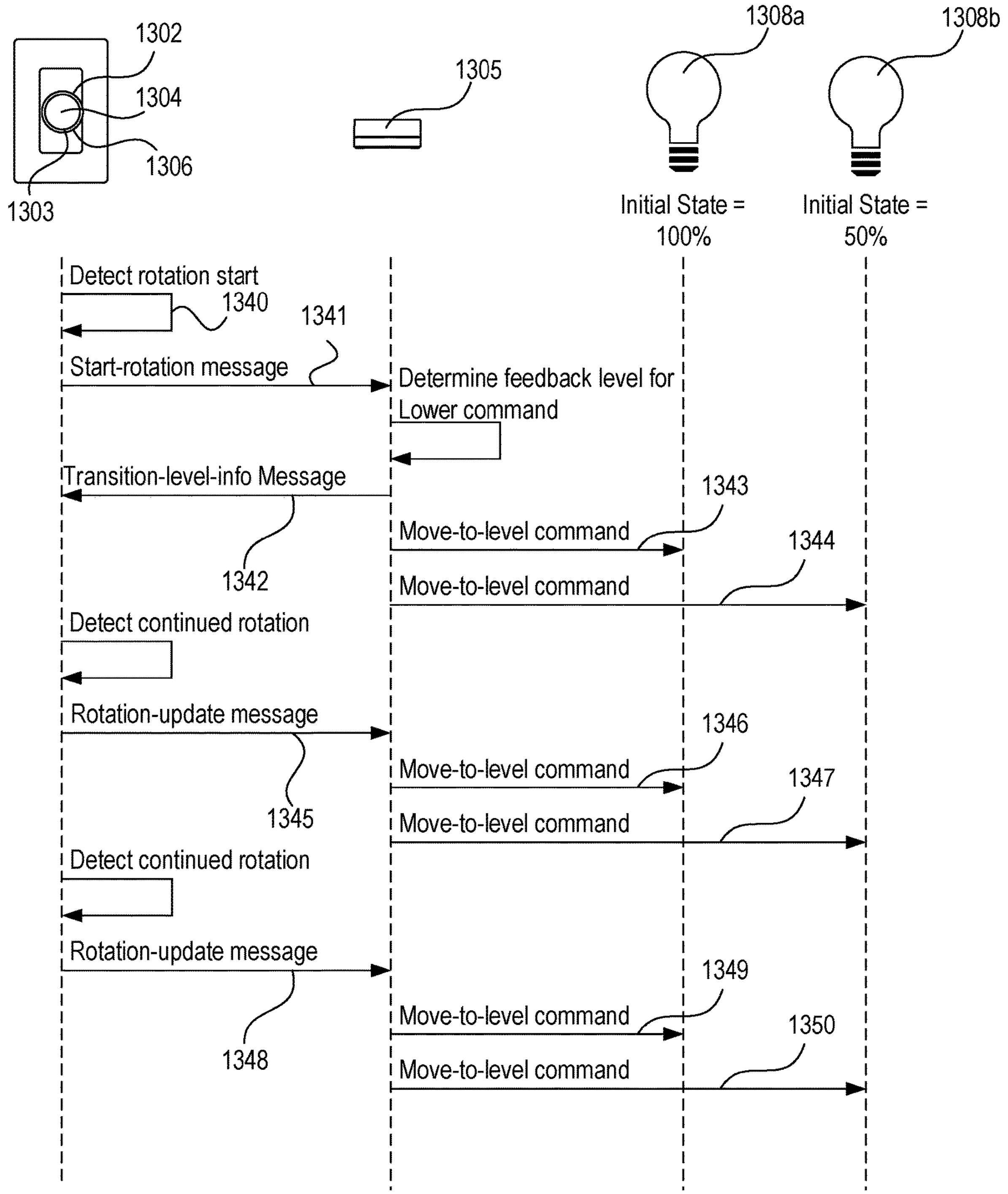
FIG. 13D illustrates a communication sequence diagram depicting example message flows transmitted for performing relative control of one or more lighting devices and providing relative feedback in response to an actuation of an actuator for lowering an intensity level of a lighting device.

FIG. 13D illustrates a communication sequence diagram depicting example message flows (e.g., digital message flows) transmitted for performing relative control of the lighting devices 1308*a*, 1308*b* and providing relative feedback via the status indicator 1303 of the remote control device 1302 in response to a rotation of the rotation portion 1306 to raise the intensity levels of the lighting devices (e.g., a lower command). The remote control device 1302 may detect a start of rotation of the rotation portion at 1340. For example, at 1340, the remote control device 1302 may detect a counter-clockwise rotation of the rotation portion 1306. As described herein, a rotation of the rotation portion 1306 may awaken the remote control device 1302 from a sleep state. The remote control device 1302 may be configured to transmit a message to the master device 1305 that indicates that a rotation of the rotation portion 1306 has occurred (e.g., a start-rotation message) at 1341. As described herein, a start-rotation message may include an indication of the amount of rotation and/or the direction of rotation (e.g., a positive value may indicate clockwise rotation and a negative value may indicate counter-clockwise rotation). For example, the start-rotation message may include an indication that the rotation portion 1306 has been rotated 21.2 degrees counter-clockwise.

In response to receiving a start-rotation message, the master device 1305 may be configured to transmit a rotation-level-info message to the remote control device 1302 at 1342. As described herein, the rotation-level-info message may include an indication of the present intensity levels of the lighting devices 1308*a*, 1308*b* associated with the remote control device 1302 (e.g., a lowest intensity level $L_{LO}$ and a highest intensity level $L_{HI}$ of the lighting devices of the lighting devices). The rotation-level-info message may indicate that the highest intensity level $L_{HI}$ of lighting devices 1308*a*, 1308*b* is 100% and the lowest intensity level $L_{LO}$ is 50%.

The rotation-level-info message may provide the remote control device 1302 with the ability to perform relative feedback via the status indicator 1303. As described herein, in response to a counter-clockwise rotation of the rotation portion (e.g., a lower command), the remote control device 1302 may be configured to perform relative feedback by displaying a responsive animation. The responsive animation may indicate the state of the brightest associated lighting device based on the amount and direction of rotation. For example, referring to FIG. 13D, the responsive animation may track the intensity level of the lighting device 1308*a* via the status indicator 1303.

The master device 1305 may be configured to determine a user command based on the start-rotation message and/or an attribute of the remote control device 1302. For example, the master device 1305 may be configured to determine the user command based on the amount and direction of rotation indicated by a start rotation session message, and/or an attribute of the remote control device 1302 (e.g., indicating that the degrees of travel for the full dim range of a lighting device is 210 degrees). As illustrated in FIG. 13D, the master device 1305 may determine that the user command includes a command to lower the intensity levels of the lighting devices 1308*a*, 1308*b* based on receiving a start-rotation message that indicates 21.2 degrees of counter-clockwise rotation (e.g., 21.2/210=10%).

After determining the user command, the master device 1305 may be configured to perform relative control of the associated lighting devices 1308*a*, 1308*b*. The master device 1305 may be configured to perform relative control by transmitting one or more move-to-level commands to the associated lighting devices 1308*a*, 1308*b*. As described herein, the move-to-level commands may each include an indication of an updated intensity level to which to change the associated lighting device and/or an indication of a period of time over which the change to the indicated intensity level is to occur. For example, as illustrated in FIG. 13D, the master device 1305 may transmit a move-to-level command that indicates to change the intensity level to 90% over 100 ms to the first lighting device 1308*a* at 1343 (e.g., a 10% decrease from the initial intensity level of 100%). Similarly, the master device 1305 may transmit a move-to-level command that indicates to change the intensity level to 40% to the second lighting device 1308*b* at 1344 (e.g., a 10% decrease from the initial intensity level of 50%).

The remote control device 1302 may be configured to periodically transmit (e.g., every 100 msec) a rotation-update message to the master device 1305 upon detecting continued rotation. As described herein, the rotation-update message may include an indication of the cumulative amount of rotation since the rotation of the rotation portion 1306 began, which may be expressed in units of degrees. For example, at 1345, the remote control device 1302 may be configured to send a rotation-update message to the master device 1305. The rotation-update message may indicate that, since the start rotation message was sent, the rotation portion 1306 has been rotation a total of 53 degrees counter-clockwise (e.g., 31.8 degrees of counter-clockwise rotation since the start-rotation message was transmitted).

In response to receiving a rotation-update message, the master device 1305 may be configured to perform relative control based on the updated amount of rotation. As described herein, the master device 1305 may determine a percentage to increase and/or decrease the present intensity levels of the associated light devices 1308*a*, 1308*b* based on the rotation-update message and/or the degrees of travel for the full dim range attribute. For example, as illustrated in FIG. 13D, the master device 1305 may determine to decrease the present intensity levels of the associated lighting devices 1308*a*, 1308*b* by 15% (e.g., 31.8 degrees of updated rotation divided by 210 degrees of travel for the full dim range of each of the lighting devices). Accordingly, the master device 1305 may transmit a move-to-level command indicating a change to an intensity level of 74% state over 100 ms to the first lighting device 1308*a* at 1346. Similarly, the master device 1305 may transmit a move-to-level command indicating a change to an intensity level of 25% over 100 ms to the second lighting device 1308*b* at 1347.

At 1348, the remote control device 1302 may to transmit a second rotation-update message that indicates the updated amount of rotation to the master device 1305. As illustrated in FIG. 13D, the rotation-update message may indicate that, since the start of rotation, the rotation portion 1306 has been rotated a total of 63.3 degrees counter-clockwise (e.g., 42.4 degrees of counter-clockwise rotation since the start-rotation message was transmitted and/or 10.6 degrees of counter-clockwise rotation since the previous rotation-update message was transmitted).

In response to receiving the second rotation-update message, the master device 1305 may be configured to perform relative control based on the updated amount of rotation. As described herein, the master device 1305 may determine a percentage to increase and/or decrease the present intensity levels of the associated lighting devices 1308*a*, 1308*b* based on the rotation-update message and/or the degrees of travel for the full dim range attribute. For example, the master device 1305 may determine to decrease the present intensity levels of the associated lighting devices by 5% (e.g., 10.6 degrees of updated rotation divided by 210 degrees of travel for the full dim range of each of the lighting devices). Accordingly, the master device 1305 may transmit a move-to-level command indicating a change to an intensity level of 69% over 100 ms to the first lighting device 1308*a* at 1349. Similarly, the master device 1305 may transmit a move-to-level command indicating a change to an intensity level of 20% over 100 ms to the second lighting device 1308*b* at 1350.

Figure 14:
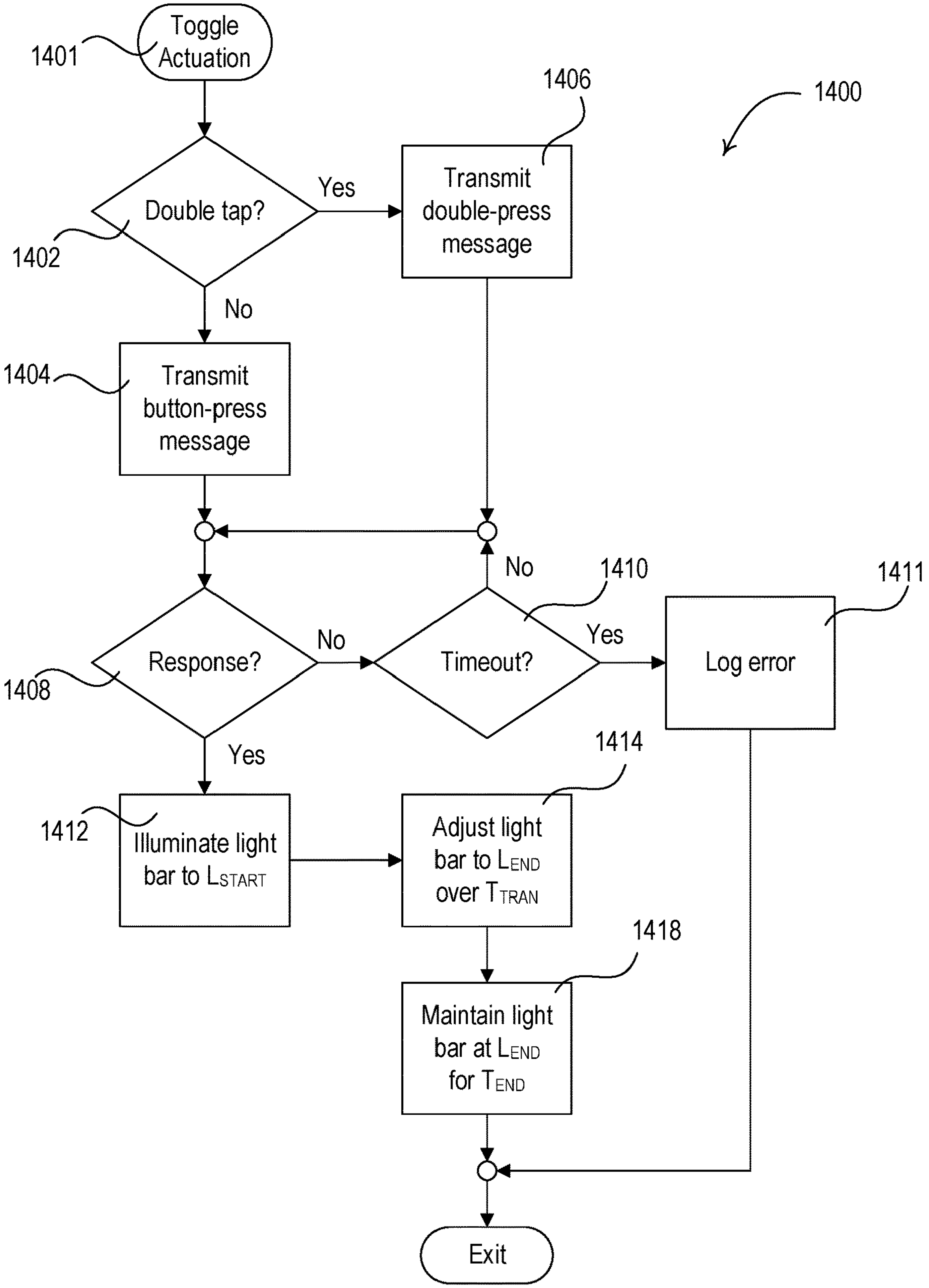
FIG. 14 is a flowchart that illustrates an example procedure that may be performed in response to one or more actuations of an actuation portion.

FIG. 14 is a flowchart illustrating an example procedure 1400 for transmitting various messages and/or providing feedback in response to an actuation (e.g., a button press) of an actuation portion on a remote control device. The procedure 1400 may be performed by a remote control device (e.g., the remote control device 116), which may include an actuation portion (e.g., the actuation portion 117) and/or a status indicator (e.g., the status indicator 119). As described herein, an actuation of the actuation portion may cause the remote control device to wake up. The remote control device may be associated or paired with one or more lighting devices, such that the actuations at the remote control device may cause changes in intensity level at the lighting devices. As illustrated in FIG. 14, the procedure 1400 may be performed in response to an actuation (e.g., a toggle actuation) of the actuation portion at 1401. For example, as described herein, a user may actuate the actuation portion to turn on, turn off, or toggle the state one or more lighting devices.

At 1402, the remote control device may determine a number of successive actuations that have been performed. For example, the remote control device may determine whether a single actuation of the actuation portion (e.g., a single-tap actuation) or two successive actuations of the actuation portion (e.g., a double-tap actuation) has occurred. Different forms of control may be performed based on a different number of actuations. If a double-tap actuation has not been detected at 1402 (e.g., a single-tap actuation of the actuation portion has occurred), the remote control device may transmit a button-press message at 1404. As described herein, the button-press message may be transmitted to a master device, which may forward the command to the paired lighting devices. Additionally or alternatively, the button-press message may be transmitted directly to the paired lighting devices. A button-press message may be indicative of an on command (e.g., an on scene command) or an off command (e.g., an off scene command). Accordingly, the button-press message may be transmitted to the master device, which may be able to determine the command for controlling the lighting devices. The command for controlling the lighting devices may be based on the present intensity levels of each of the paired lighting devices. For example, when the paired lighting devices are each set to an intensity level of 1% or higher, a button-press message may include an off command, which may change the intensity level of each of the paired lighting devices to 0% intensity level. Similarly, when the paired lighting devices are each set to an intensity level of 0%, a button-press message may include an on command, which may change the intensity level of each of the paired lighting devices to full on or the intensity level defined by a scene.

If, however, a double-tap actuation has been detected at 1402, the remote control device may transmit a double-press message at 1404. For example, the remote control device may detect the double-tap actuation in response to detecting a single-tap actuation of the actuation during a first execution of the procedure 1400 and then detecting another actuation of the actuation portion during a subsequent executing of the procedure 1400 (e.g., within a short period of time of the first execution of the procedure 1400). The double-press message may be transmitted to the paired lighting devices and/or to a master device, which may forward the message to the paired lighting devices. As described herein, a double-press message may be indicative of a full-on command. A full-on command may adjust one or more lighting devices to a 100% intensity level.

The feedback provided on the remote control device may be based on information received from the master device and/or the paired lighting devices. At 1408, the remote control device may determine whether a response to the message including the command (e.g., the button-press message transmitted at 1404 and/or the double-press message transmitted at 1406) was received. For example, a response may be a message from a master device and/or the paired lighting devices that includes device information indicating the feedback to be provided on the remote control device, or indicating a status of the lighting devices for the remote control device to determine the feedback to be provided. For example, the device information from the master device may include a starting illumination $L_{START}$, an ending illumination $L_{END}$, and/or a transition time $T_{TRAN}$ (e.g. a transition-level-info message). If the response has not been received, the remote control device may determine whether a timeout period since the message was transmitted has elapsed at 1410. If a timeout period has elapsed since the transmission of the message, the remote control device may log an error at 1411. The timeout period may be pre-defined or pre-configured, and may, for example, indicate the period of time by which devices are to respond to messages. In response to the timeout period expiring at 1410, the remote control device may also retransmit the message, request a response, and/or await another toggle actuation at the device.

The remote control device may provide feedback based on the information in the response message. Accordingly, if a response is received at 1410, the remote control device may illuminate the status indicator as indicated in the information in the response message. For example, the remote control device may illuminate the status indicator (e.g., a light bar) to a starting illumination $L_{START}$ at 1412. The starting illumination $L_{START}$ may be based on or representative of the present intensity level at the paired lighting devices, as described herein. At 1414, the remote control device may adjust the light bar to illuminate at the ending illumination $L_{END}$ at 1416. The adjustment may occur over the transition time $T_{TRAN}$. The ending illumination $L_{END}$ may be based on or representative of the intensity level at the lighting devices in response to receiving a command (e.g., the button-press message transmitted at 1404 and/or the double-press message transmitted at 1406). At 1418, the remote control device may maintain the light bar at the ending illumination $L_{END}$ for an end time $T_{END}$.

As illustrated in FIG. 14, the procedure 1400 may be used to provide feedback in response to an actuation of the actuation portion. In addition, the provided feedback may be based on the command and/or the intensity levels at the respective lighting devices, one or more of which the remote control device performing the procedure 1400 may be unaware of. As a result, the remote control device may communicate with a master device, which may be aware of (e.g., track or maintain the information used to determine) the command and/or the intensity levels at the respective lighting devices. As illustrated in FIG. 14, the remote control device may use the information provided by the master device to determine the command and the intensity levels at the respective lighting devices, and provide feedback accordingly.

Figure 15:
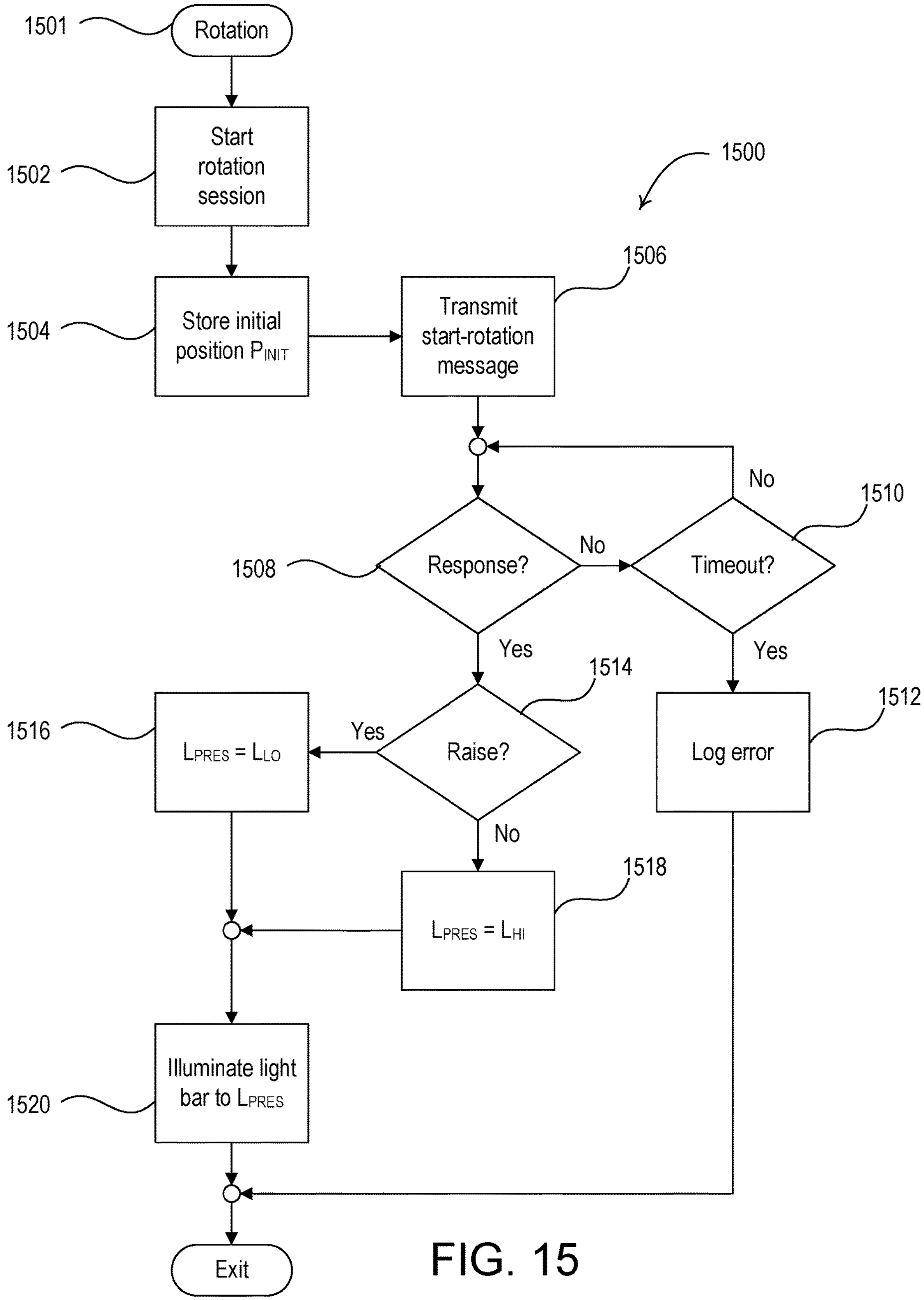
FIG. 15 is a flowchart that illustrates an example procedure that may be performed in response to rotation of a rotation portion.

FIG. 15 is a flowchart illustrating an example procedure 1500 for transmitting messages in response to rotation of a rotation portion. The procedure 1500 may be performed by a remote control device (e.g., the remote control device 116), which may include a light bar (e.g., the status indicator 119) and/or a rotation portion (e.g., the rotation portion 118). As illustrated in FIG. 15, the procedure 1500 may be performed in response to a start of a rotation of the rotation portion at 1501.

A rotation session may be used by a remote control device to determine an amount of rotation of the rotation portion that has occurred. Therefore, after rotation of the rotation portion has started, the remote control device may start a rotation session at 1502 and store an initial position $P_{INIT}$ of the rotation portion at 1504. For example, the remote control device may be configured to store the initial position $P_{INIT}$ as a number of counted edges of rotational position sensing signals, which may be generated by an internal rotational position sensing circuit. The remote control device may also set a previous position $P_{LB\text{-}PRV}$ (e.g., which may be used to control the intensity level indicated by the light bar) equal to the initial position $P_{INT}$ of the rotation portion at 1504. At 1506, the remote control device may transmit a message that indicates the start of a rotation session (e.g., a start-rotation message). For example, the start-rotation message may be transmitted to a master device (e.g., the hub device 180). At 1508, the remote control device may determine whether a response to the start-rotation message has been received. The response to the start-rotation message may be a message that includes device information indicating the feedback to be provided on the remote control device, or indicating a status of the lighting devices for the remote control device to determine the feedback to be provided. For example, the response message (e.g., the device information) from the master device may include an indication of a highest intensity level $L_{HI}$ of the associated or paired lighting devices and/or a lowest intensity level $L_{LO}$ of the associated or paired lighting devices (e.g., a rotation-level-info message). The device information may be transmitted by a master device. For example, the remote control device may use the device information to provide relative feedback in response to rotation of the rotation portion.

If a response (e.g., the device information) is not received, the remote control device may determine whether a timeout period has elapsed since the start-rotation message was transmitted at 1510. If a timeout period has elapsed, the remote control device may log an error condition at 1512. As described herein, the timeout period may be pre-defined or pre-configured, and may, for example, indicate the period of time by which devices are to respond to messages. In response to the timeout period expiring at 1510, the remote control device may also retransmit the message, request a response, and/or await another toggle actuation at the device.

The remote control device may provide relative feedback in response to rotation of the rotation portion, for example, by displaying a responsive animation. At 1514, the remote control device may determine whether the rotation of the rotation portion indicates for the paired lighting devices to raise or increase their respective intensity levels (e.g., a raise command). For example, a clockwise rotation of the rotation portion may indicate a raise command. A counter-clockwise rotation of the rotation portion may indicate for the paired lighting devices to lower or decrease their respective intensity levels (e.g., a lower command). If the rotation of the rotation portion indicates a raise command at 1514, the remote control device may set a present light intensity level $L_{PRES}$ (e.g., the present light intensity level of the light bar) to the lowest intensity level $L_{LO}$ of the lighting devices at 1516. If the rotation of the rotation portion does not indicate a raise command at 1514 (e.g., the rotation of the rotation portion indicates a lower command), the remote control device may set the present light intensity level $L_{PRES}$ to the highest intensity level $L_{HI}$ of the lighting devices at 1518. The present light intensity value $L_{PRES}$ may be used to control the intensity level of the light bar.

The present light intensity level $L_{PRES}$ may be used to provide feedback in response to rotation of the rotation portion. At 1520, the remote control device may illuminate a portion of the light bar to indicate the present light intensity level $L_{PRES}$. For example, when the rotation of the rotation portion indicates a raise command, the remote control device may control the light bar to indicate the intensity level of a paired lighting device with the lowest intensity level (e.g., the lowest intensity level $L_{LO}$ received in the start-rotation message). Similarly, when the rotation of the rotation portion indicates a lower command, the remote control device may control the light bar to indicate the intensity level of the paired lighting device with a highest intensity level (e.g., the highest intensity level $L_{HI}$ received in the start-rotation message).

Figure 16:
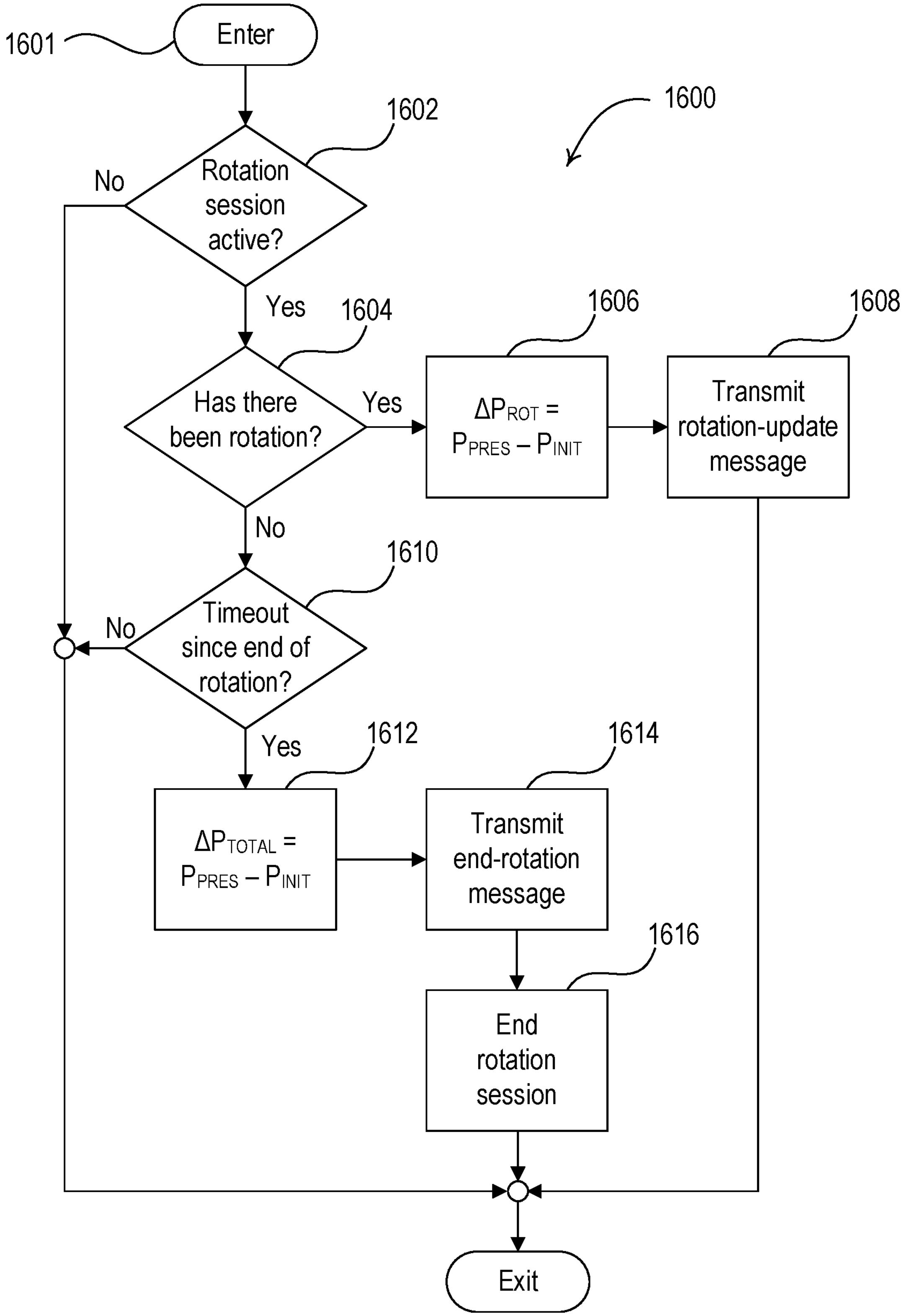
FIG. 16 is a flowchart that illustrates an example procedure that may be performed while a rotation portion is being rotated (e.g., a rotation session).

FIG. 16 is a flowchart that illustrates a procedure 1600 for transmitting messages while rotation of the rotation portion is occurring. The procedure 1600 may be performed by a remote control device (e.g., the remote control device 116), which may include a light bar (e.g., the status indicator 119) and/or a rotation portion (e.g., the rotation portion 118). The procedure 1600 may be performed periodically. At 1601, the procedure 1600 may start. For example, the procedure 1600 may be executed periodically while a rotation session is active (e.g., while the rotation portion is being rotated). At 1602, the remote control device may determine whether there is an active rotation session (e.g., a rotation session started at 1502 of the procedure 1500). If the remote control device determines that a rotation session is not active, the procedure 1600 may exit.

At 1604, the remote control device may determine whether the rotation portion has been rotated. For example, the remote control device may determine whether the rotation portion has been rotated since a previous execution of the procedure 1600. If the remote control device determines that the rotation portion has been rotated, the remote control device may determine a change $\Delta P_{ROT}$ in position of the rotation portion at 1606. For example, the remote control device may be configured to determine the change $\Delta P_{ROT}$ in position of the rotation portion as a number of counted edges of the rotational position sensing signals generated by the internal rotational position sensing circuit. The remote control device may set the change $\Delta P_{ROT}$ in position of the rotation portion to, for example, the difference between a present position $P_{PRES}$ of the rotation portion and an initial position $P_{INIT}$ of the rotation portion (e.g., as stored at 1504 of the procedure 1500). The change $\Delta P_{ROT}$ in position of the rotation portion may indicate the change in position of the rotation portion since the rotation of the rotation portion started (e.g., at 1501 of the procedure 1500). The present position $P_{PRES}$ may indicate the present position of the rotation portion. The initial position $P_{INIT}$ may indicate the initial position of the rotation portion, for example, as stored at 1504 of the procedure 1500. At 1608, the remote control device may transmit a message that indicates the total amount of rotation during the rotation session (e.g, a rotation-update message). For example, the rotation-update message may include in indication of the total change in position $\Delta P_{ROT}$ of the rotation portion the rotation of the rotation portion started. The rotation-update message may be transmitted to a master device.

At 1610, the remote control device may determine whether a timeout period of time has elapsed since the end of rotation of the rotation portion. For example, when a timeout period of time elapses since rotation of the rotation portion has last occurred, the remote control device may determine that the rotation session (e.g., the rotation session started at 1502 of the procedure 1500) has ended. At 1612, the remote control device may set a total change in position of the rotation portion $\Delta P_{TOTAL}$ to the difference between the present position $P_{PRES}$ and the initial position $P_{INIT}$. The total change in position of the rotation portion $\Delta P_{TOTAL}$ may indicate the total change in position of the rotation portion during a respective rotation session, which may indicate the total amount of rotation of the rotation portion for the rotation session. At 1614, the remote control device may transmit a message that indicates that the rotation session has ended (e.g., an end-rotation message). For example, the remote control device may transmit the end-rotation message to a master device, which may indicate to the master device that the lighting intensities of the respective lighting devices are to remain unchanged. After transmitting the end-rotation message, the remote control device may end the active rotation session at 1616, and the procedure 1600 may exit.

Figure 17:
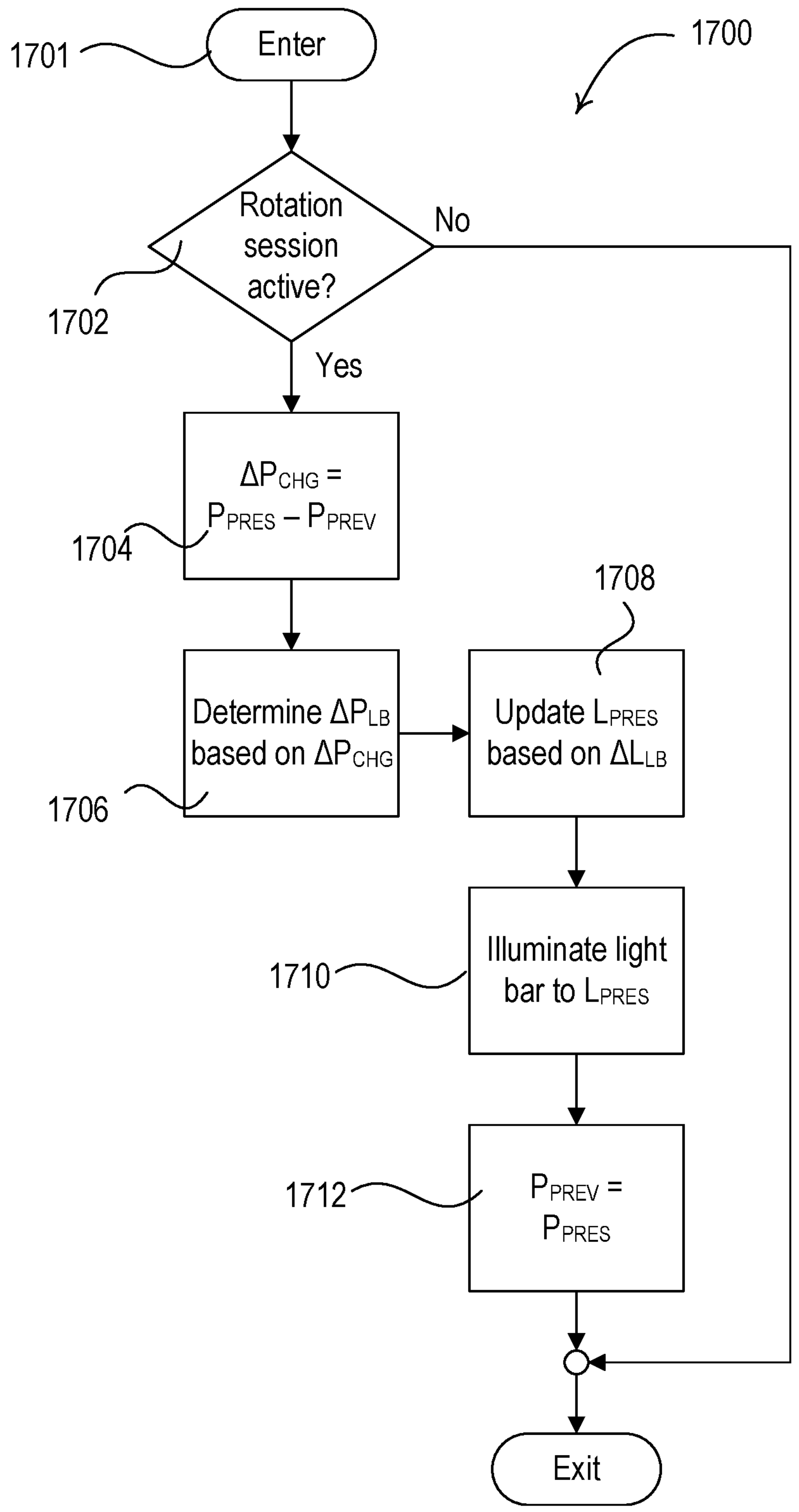
FIG. 17 is an example flowchart that illustrates an example procedure for providing feedback via a status indicator.

FIG. 17 is a flowchart illustrating an example procedure 1700 for providing relative feedback during a rotation session. The procedure 1700 may be performed by a remote control device (e.g., the remote control device 116), which may include a light bar (e.g., the status indicator 119) and/or a rotation portion (e.g., the rotation portion 118). As described herein, the remote control device may provide relative feedback in response to rotation of the rotation portion, for example, by displaying a responsive animation. The remote control device may be associated with and/or paired with one or more lighting devices. The procedure 1700 may be periodically performed, for example, during the pendency of a rotation session.

At 1701, the procedure 1700 may begin or enter. At 1702, the remote control device may determine whether a rotation session is currently active (e.g., the rotation session started at 1502 of the procedure 1500). If a rotation session is active, the remote control device may determine at 1704 a change $\Delta P_{CHG}$ in the position of the rotation portion for use in updating the light bar. For example, the remote control device may set the change $\Delta P_{CHG}$ in the position of the position of the rotation portion to the difference between a present position $P_{PRES}$ of the rotation portion and a previous position $P_{PREV}$ of the rotation portion (e.g., the position of the rotation portion during a previous execution of the procedure 1700). The present position $P_{PRES}$ of the rotation portion may be equal to and/or based on of the present position $P_{PRES}$ of the rotation portion described in the procedure 1600 of FIG. 16. The first time that the procedure 1700 is executed during a rotation session, the previous position $P_{PREV}$ of the rotation portion may be equal to the initial position $P_{INIT}$ (e.g., as stored at 1504 of the procedure 1500).

At 1706, the remote control device may determine an amount $\Delta L_{LB}$ to change the indication on the light bar based on the change $\Delta P_{CHG}$ in the position of the rotation portion. At 1708, the remote control device may update the present light intensity level $L_{PRES}$ to which to control the light bar based on the amount $\Delta L_{LB}$ to change the indication on the light bar as determined at 1706, e.g., $L_{PRES}=L_{PRES}+\Delta L_{LB}$. For example, the remote control device may increase the present light intensity level $L_{PRES}$ of the light bar when the change $\Delta P_{CHG}$ in the position of the rotation portion is positive and decrease the present light intensity level $L_{PRES}$ of the light bar when the change $\Delta P_{CHG}$ in the position of the rotation portion is negative. In addition, the remote control device may determine the present light intensity level $L_{PRES}$ of the light bar in response to a total amount of rotation of the rotation portion since the rotation session began (e.g., the change $\Delta P_{TX}$ in position of the rotation portion as determined at 1606 of the procedure 1600).

As described herein, the light bar of the remote control device may be used to provide relative feedback. For example, the light bar may be dimmed and/or brightened to track or indicate the present light level of one or more of the paired lighting devices. At 1710, the remote control device may illuminate the light bar to the present light intensity value $L_{PRES}$. As described herein, the present light intensity value $L_{PRES}$ may represent or indicate the intensity level of one or more of the lighting devices paired with the remote control device (e.g., which may be determined using the responses received from a master device, such as the hub device 180). Further, the light bar may be illuminated to the present light intensity value $L_{PRES}$ to provide feedback (e.g., relative feedback) of the present intensity level of the paired lighting devices. The feedback provided by the remote control device via the light bar may enable a user to identify changes in the present intensity level of the paired light devices and determine an appropriate amount of rotation to reach the desired intensity level of the paired lighting devices. At 1712, the remote control device may set the previous position $P_{PREV}$ of the rotation portion equal to the present position $P_{PRES}$ of the rotation portion, which as described herein may be used during a subsequent execution of the procedure 1700.

Figure 18:
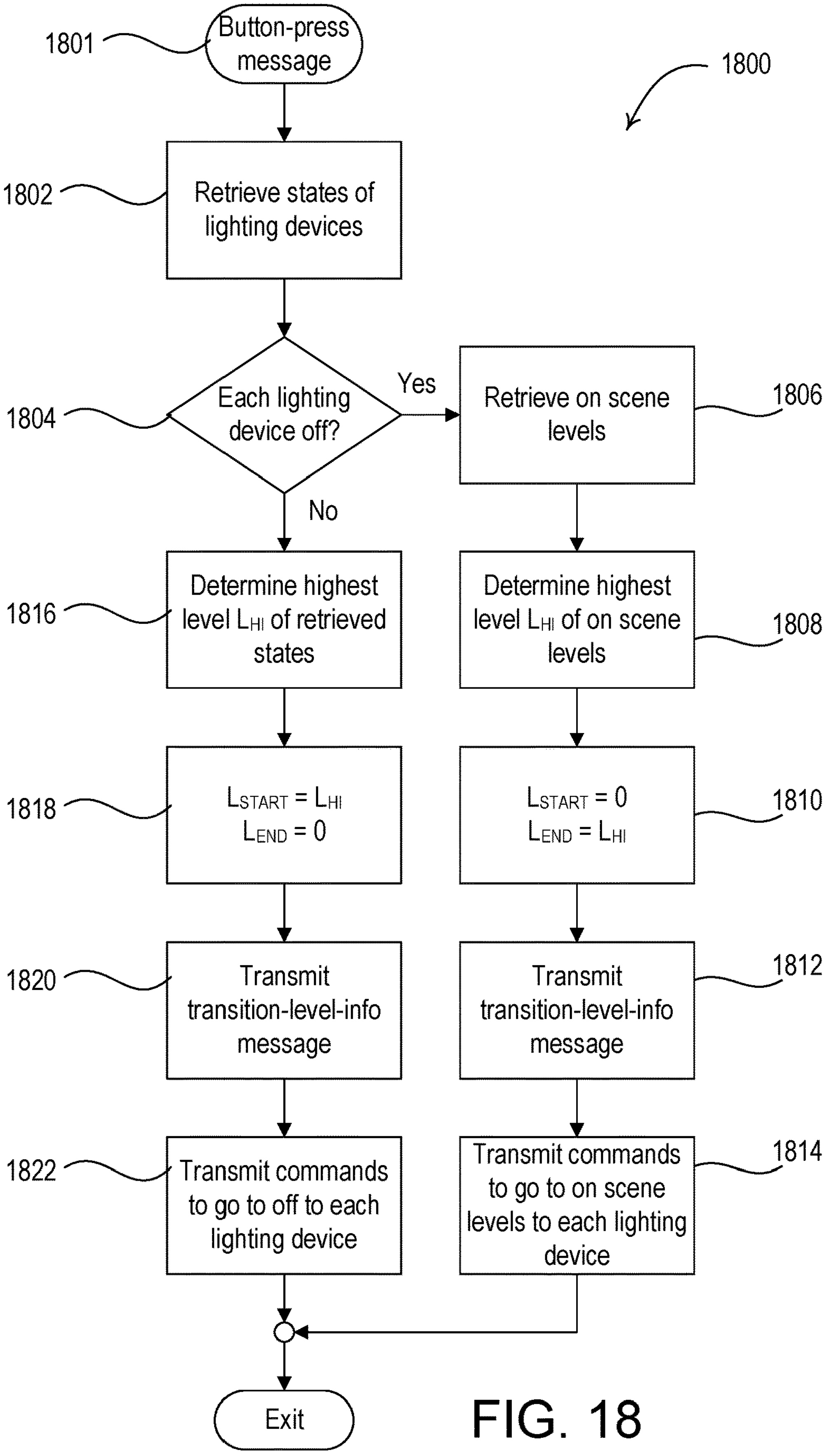
FIG. 18 is a flowchart that illustrates an example procedure that may be performed in response to receiving a button-press message.

A master device may be used to perform relative feedback in response to actuation of an actuation portion. FIG. 18 is a flowchart illustrating an example procedure 1800 for transmitting command messages. The procedure 1800 may be performed by a master device (e.g., the hub device 180), which may be in communication with one or more lighting devices (e.g., lighting device 114*a*, 144*b*, and 122) and/or a remote control device associated and/or paired with the one or more lighting devices (e.g., the remote control device 116). As illustrated in FIG. 18, the procedure 1800 may be performed in response to receiving a button-press message at 1801. For example, the button-press message may be transmitted by the remote control device at 1406 during an execution of the procedure 1400 in response to an actuation of the actuation portion.

At 1802, the master device may retrieve the states (e.g., intensity level) of lighting devices. For example, the master device may retrieve the states of each of the lighting device associated with or paired with the remote control device that transmitted the button-press message. The associated and/or paired lighting devices may be included in information that is maintained by the master device. At 1804, the master device may, based on the retrieved states of the lighting devices, determine whether the lighting devices are in an off state (e.g., at an intensity level of 0%). If the lighting devices are in an off state, a button-press message may indicate for the lighting device to adjust the levels to an on state and/or a state defined by a scene (e.g., an on scene). Accordingly, if the lighting devices are off, the master device may retrieve the levels (e.g., intensity levels) for the scene at 1806.

As described herein, the master device may store and maintain the intensity levels defined by a respective scene. At 1808, the master device may determine a highest intensity level $L_{HI}$ defined by the scene. At 1810, the master device may set a starting illumination $L_{START}$ to 0 and an ending illumination $L_{END}$ to the highest intensity level $L_{HI}$. As described herein, the remote control device may display a transition-up animation as a form of relative feedback, which may be performed in response to an on scene command. Accordingly, at 1812, the master device may transmit a transition-level-info message to the remote control device, which may provide the remote control device with the information to perform relative feedback. The transition-level-info message may include indications of the starting illumination $L_{START}$, the ending illumination $L_{END}$, and/or the transition time $T_{TRAN}$. The remote control device may provide feedback based on the transition-level-info message (e.g., as illustrated at steps 1412 to 1418 of the procedure 1400). For example, the remote control device may display the transition-up animation, which may illuminate the light bar to the starting illumination $L_{START}$ and transition the light bar to the ending illumination $L_{END}$ over the transition time $T_{TRAN}$. At 1814, the master device may transmit one or more messages to the lighting devices defined in the scene (e.g., a message to each of the lighting devices defined in the scene) that include the move-to-level commands to go to the respective intensity levels defined by the scene, before the procedure 1800 exits.

If any of the lighting devices paired with a remote control device are at an intensity level greater than 0%, an actuation of the actuation portion may indicate an off scene command, where the lighting devices are configured to change to an off state (e.g., an intensity level of 0%). Accordingly, if any of the lighting devices are not off (e.g., at an intensity level greater than 0%) at 1804, the master device may determine a highest intensity level $L_{HI}$ of the lighting devices at 1816. At 1818, the remote control device may set the starting illumination $L_{START}$ to the highest intensity level $L_{HI}$ of the lighting devices and set the ending illumination $L_{END}$ to 0. As described herein, the remote control device may display a transition-down animation in response to an off scene command. At 1820 the master device may transmit a transition-level-info message (e.g., device information) to the remote control device, which may include indications of the starting illumination $L_{START}$, the highest intensity level $L_{HI}$, and/or the transition time $T_{TRAN}$. In response to receiving the transition-level-info message, the remote control device may perform relative feedback by displaying a transition-down animation (e.g., as illustrated at steps 1412 to 1418 of the procedure 1400). For example, the remote control device may display the transition-down animation, which may illuminate the light bar to the starting illumination $L_{START}$ and transition the light bar to the ending illumination $L_{END}$ over the transition time $T_{TRAN}$. At 1822, the master device may transmit one or more messages to the lighting devices that include the move-to-level commands to go to off (e.g., intensity levels of 0%), and the procedure 1800 may exit.

Figure 19:
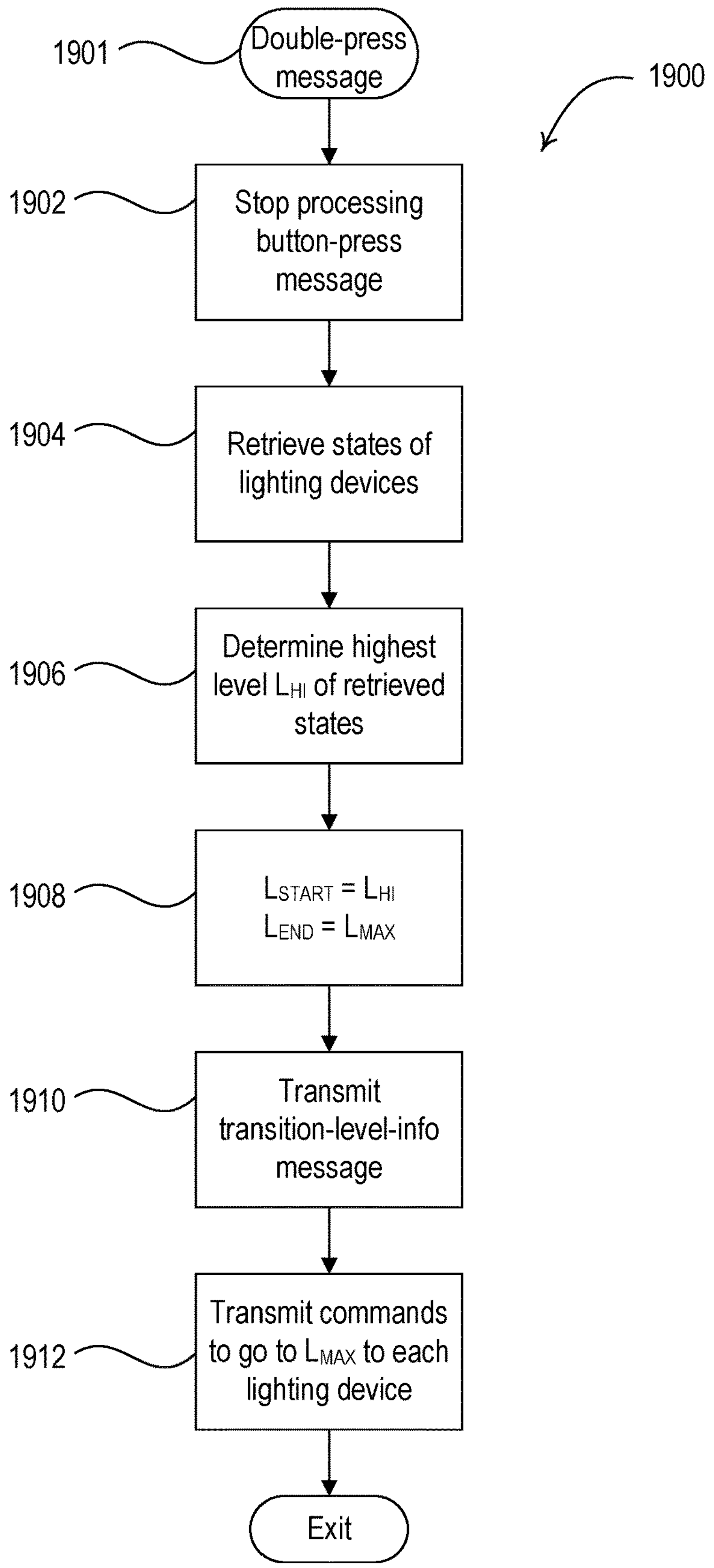
FIG. 19 is a flowchart that illustrates an example procedure that may be performed in response to receiving a double-press message.

A master device may be used to perform relative feedback in response to successive actuations of an actuation portion. FIG. 19 is a flowchart illustrating an example procedure 1900 for transmitting command messages to lighting devices. The procedure 1900 may be performed by a master device (e.g., the hub device 180), which may be in communication with one or more lighting devices (e.g., lighting device 114*a*, 144*b*, and 122) and/or a remote control device associated and/or paired with the one or more lighting devices (e.g., the remote control device 116). As illustrated in FIG. 19, the procedure 1900 may be performed in response to receiving a double-press message at 1901. For example, the double-press message may be transmitted by the remote control device at 1404 during an execution of the procedure 1400 in response to successive actuations of the actuation portion. As described herein, a double-press message may be indicative of a full-on command to adjust the lighting devices to a maximum intensity level (e.g., a 100% intensity level).

A double-press message may take precedence over other commands (e.g., button-press commands) and the master device may stop processing the other commands after receiving the Double-Press commands. For example, the remote control device may transmit a button-press message in response to detecting a single actuation of the actuation portion, and may subsequently transmit a double-press message in response to detecting a subsequent actuation of the actuation portion with a short period of time. Accordingly, the master device may assume that the double-tap actuation of the actuation portion was the intended actuation and stop processing any previously received button-press message at 1902. At 1904, the master device may retrieve the states of the lighting devices. At 1906, the master device may determine the highest initial intensity level (e.g., present intensity level) $L_{HI}$ of the retrieved states of the lighting devices. At 1908, the master device may set the starting illumination $L_{START}$ to the highest initial intensity level (e.g., present intensity level) $L_{HI}$ and an ending illumination $L_{END}$ to a maximum illumination value $L_{MAX}$. The maximum illumination value $L_{MAX}$ may be the maximum intensity level to which the lighting devices are capable of being controlled (e.g., an intensity level of 100%). As described herein, the remote control device may perform relative feedback in response to successive actuations of the actuation portion by displaying a transition-up animation (e.g., as illustrated at steps 1412 to 1418 of the procedure 1400). Accordingly, the master device may transmit a transition-level-info message at 1910. The transition-level-info message may include device information that provides the remote control device with the ability to perform relative feedback. At 1912, the master device may transmit commands to the respective lighting devices to each change to an intensity level that is equal to the maximum illumination variable $L_{MAX}$ (e.g., an intensity level of 100%).

Figure 20:
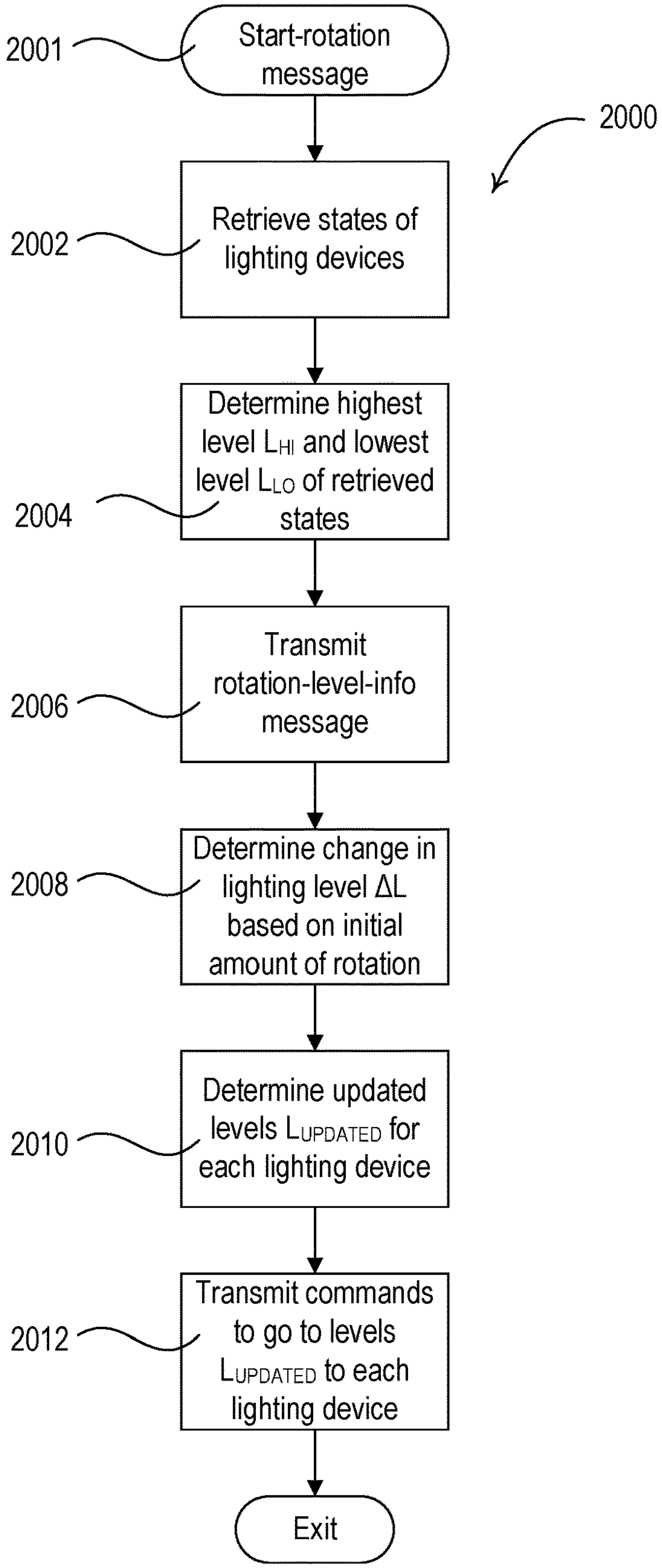
FIG. 20 is a flowchart that illustrates an example procedure that may be performed in response to receiving a start-rotation message.

A master device may be used to perform relative feedback in response to rotation of the rotation portion (e.g., a start of a rotation of the rotation portion) of a remote control device (e.g., the remote control device 116). FIG. 20 is a flowchart illustrating an example procedure 2000 for providing intensity level information to the remote control device and transmitting command messages to lighting devices. The procedure 2000 may be performed by a master device (e.g., the hub device 180), which may be in communication with one or more lighting devices (e.g., lighting device 114*a*, 144*b*, and 122) and/or the remote control device. As illustrated in FIG. 20, the procedure 2000 may be performed in response to receiving a start-rotation message from the remote control device at 2001. For example, the start-rotation message may be transmitted by the remote control device at 1506 during an execution of the procedure 1500 in response to a start of a rotation of the rotation portion. As described herein, a start-rotation message may be indicative of the lighting devices to increase or decrease (e.g., based on the direction of the rotation) their respective intensity levels.

At 2002, the master device may retrieve the states of each of the respective lighting devices paired with the remote control device that transmitted the start-rotation message, which may be information that is maintained by the master device. At 2004, the master device may determine the highest intensity level $L_{HI}$ of the paired lighting devices variable and the lowest intensity level $L_{LO}$ of the paired lighting devices variable, which may be based on the retrieved states of the lighting devices. At 2006, the master device may transmit a rotation-level-info message. As described herein, the rotation-level-info message may include device information that provides indications of the highest intensity level $L_{HI}$ of the paired lighting device variable and the lowest intensity level $L_{LO}$ of the paired lighting device variable. The rotation-level-info message may be transmitted to the remote control device and the remote control device may provide relative feedback using the rotation-level-info message. For example, the remote control device may display a responsive animation by illuminating the light bar to an intensity value that is indicative of the highest intensity level $L_{LO}$ of the paired lighting device $L_{HI}$ or the lowest intensity level $L_{LO}$ of the paired lighting devices variable (e.g., based on the direction of the rotation of the rotation portion).

At 2008, the master device may determine a change ΔL in lighting level based on an initial amount of rotation of the rotation portion. As described herein, the start-rotation message may include an indication of the initial amount of rotation and/or a direction of rotation. In turn, the master device may determine the change ΔL in the lighting level based on the amount and direction of rotation indicated by the start-rotation message and/or an attribute of the remote control device (e.g., an attribute indicating the degrees of travel for the full dim range of a lighting device and/or an attribute indicating the rotation degrees per encoder tick). At 2010, the master device may determine updated lighting levels $L_{UPDATED}$ for each of the lighting devices. The updated lighting levels $L_{UPDATED}$ for each of the lighting devices may be based on the determined change ΔL in lighting level. For example, the updated lighting level $L_{UPDATED}$ for each of the lighting devices may be the present lighting level of the respective lighting device plus the change in lighting level ΔL. For example, the change ΔL in lighting level may be positive for a raise command and negative for a lower command. At 2012, the master device may transmit move-to-level commands to each of the respective lighting devices to go to the respective updated lighting level $L_{UPDATED}$.

Figure 21:
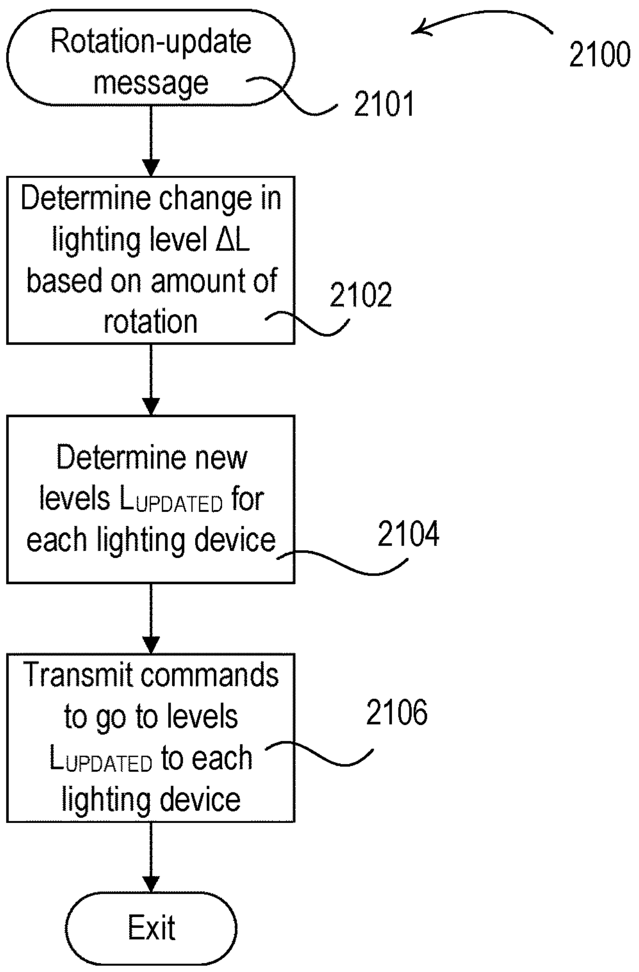
FIG. 21 is a flowchart that illustrates an example procedure that may be performed in response to receiving a rotation-update message.

A master device may be used to perform relative feedback in response to rotation of a rotation portion (e.g., a continued rotation of the rotation portion) of a remote control device (e.g., the remote control device 116). FIG. 21 is a flowchart illustrating an example procedure 2100 for providing intensity level information to the remote control device and transmitting command messages to lighting devices. The procedure 2100 may be performed by a master device (e.g., the hub device 180), which may be in communication with one or more lighting devices (e.g., lighting device 114*a*, 144*b*, and 122) and/or the remote control device. As illustrated in FIG. 21, the procedure 2100 may be performed in response to receiving a rotation-update message from the remote control device at 2101. For example, the rotation-update message may be transmitted by the remote control device at 1608 during an execution of the procedure 1600 in response to a continued rotation of the rotation portion (e.g., rotation of the rotation portion after a rotation session has started). As described herein, a rotation-update message may be indicative of the lighting devices to increase or decrease (e.g., based on the direction of the rotation) the respective intensity levels while a rotation session is active.

At 2102, the master device may determine a change ΔL in the lighting level based on the amount of rotation. As described herein, the rotation-update message may include an indication of the amount and/or direction of rotation of continued rotation (e.g., an amount of rotation since the rotation session started). In addition, the rotation-update message may include an indication of an amount of rotation since a previous start-rotation message or a previous rotation-update message was transmitted. In turn, the master device may determine the change ΔL in lighting level based on the amount and/or direction of rotation indicated by the rotation-update message and/or an attribute of the remote control device (e.g., an attribute indicating the degrees of travel for the full dim range of a lighting device and/or an attribute indicating the rotation degrees per encoder tick). At 2104, the master device may determine updated lighting levels $L_{UPDATED}$ for each of the lighting devices. The updated lighting levels $L_{UPDATED}$ for each of the lighting devices may be based on the determined change ΔL in lighting level. For example, updated lighting levels $L_{UPDATED}$ for each of the lighting devices may be the present lighting level for each of the lighting device plus the change ΔL in lighting level. For example, the change ΔL in lighting level may be positive for a raise command and negative for a lower command. At 2106, the master device may transmit move-to-level commands to each of the respective lighting devices to go to the respective updated lighting level $L_{UPDATED}$.

Figure 22:
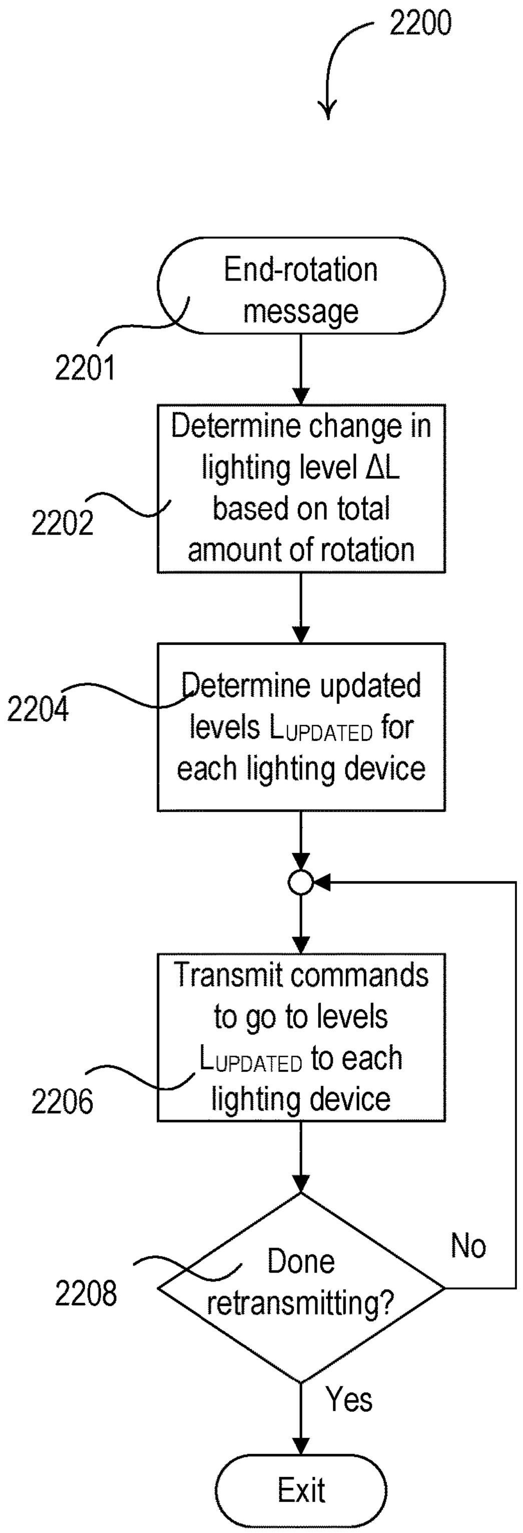
FIG. 22 is a flowchart that illustrates an example procedure that may be performed in response to receiving an end-rotation message.

A master device may be used to stop providing relative feedback in response to the end of a rotation of a rotation portion (e.g., a continued rotation of the rotation portion) of a remote control device (e.g., the remote control device 116). FIG. 22 is a flowchart illustrating an example procedure 2200 for providing intensity level information to the remote control device and transmitting command messages to lighting devices. The procedure 2200 may be performed by a master device (e.g., the hub device 180), which may be in communication with one or more lighting devices (e.g., lighting device 114*a*, 144*b*, and 122) and/or the remote control device. As illustrated in FIG. 22, the procedure 2200 may be performed in response to receiving an end-rotation message from the remote control device at 2201. For example, the end-rotation message may be transmitted by the remote control device at 1614 during an execution of the procedure 1600 in response to the end of the rotation of the rotation portion (e.g., the rotation session has ended).

At 2202, the master device may determine a change ΔL in the lighting level based on the total amount of rotation. As described herein, the end-rotation message may include an indication of the amount and/or direction of a total amount of rotation during the rotation session. The master device may determine the change ΔL in lighting level based on the total amount of rotation and/or direction of rotation indicated by the end-rotation message and/or an attribute of the remote control device (e.g., an attribute indicating the degrees of travel for the full dim range of a lighting device and/or an attribute indicating the rotation degrees per encoder tick). At 2204, the master device may determine updated lighting levels $L_{UPDATED}$ for each of the lighting devices. The updated lighting levels $L_{UPDATED}$ for each of the lighting devices may be based on the determined change ΔL in lighting level. For example, updated lighting levels $L_{UPDATED}$ for each of the lighting devices may be the present lighting level for each of the lighting device plus the change ΔL in lighting level. For example, the change ΔL in lighting level may be positive for a raise command and negative for a lower command. At 2206, the master device may transmit move-to-level commands to each of the respective lighting devices to go to the respective updated lighting level $L_{UPDATED}$. The master device may transmit the move-to-level commands to each of the respective lighting devices multiple times at the end of the rotation session (e.g., five times to each of the lighting devices). Accordingly, if the master device is not done retransmitting the move-to-level commands at 2208, the master device may retransmit the move-to-level commands at 2206. When the master device is done retransmitting the move-to-level commands at 2208, the procedure 2200 may exit.

Figure 23:
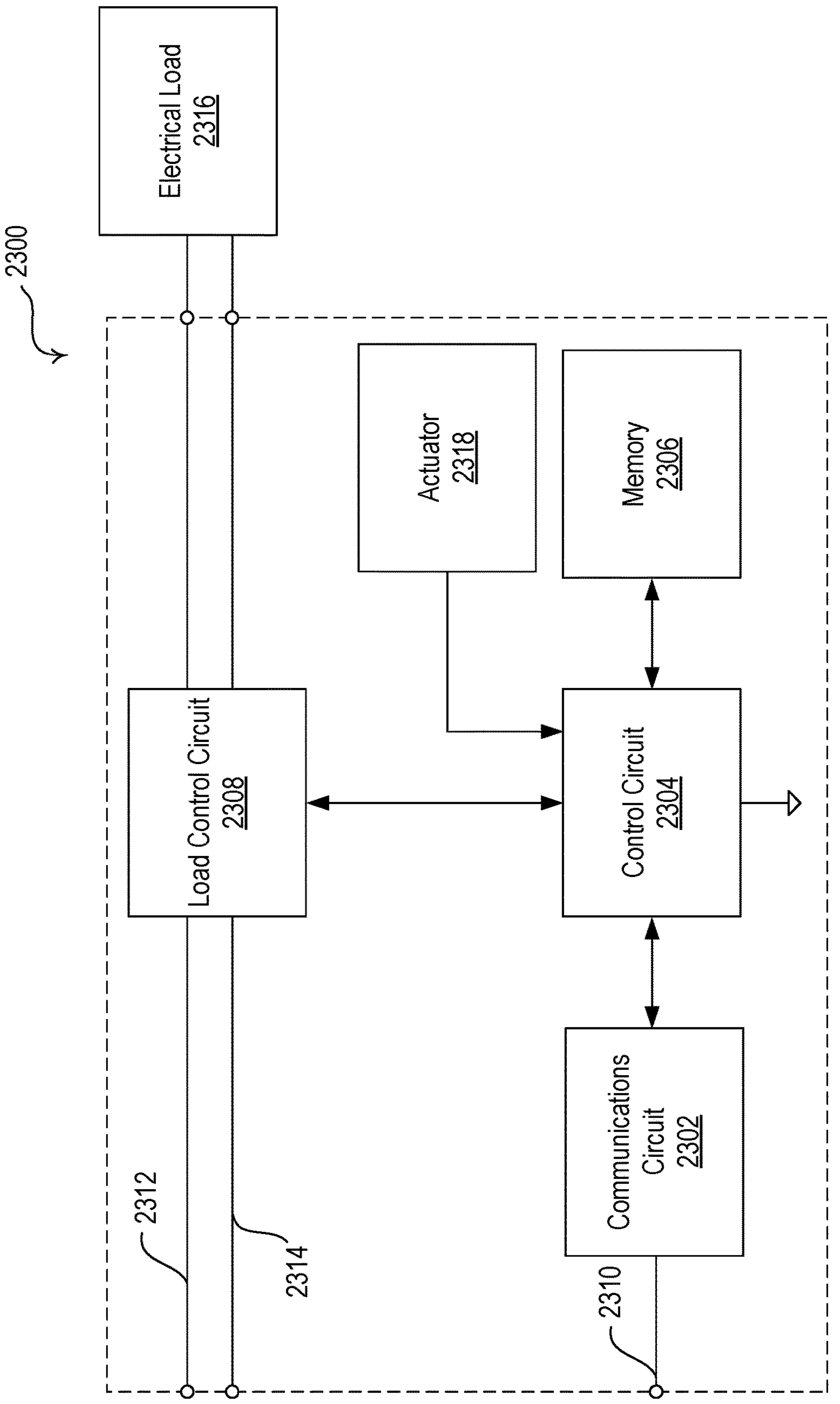
FIG. 23 is a block diagram of an example load control device.

FIG. 23 is a block diagram illustrating an example load control device, e.g., a load control device 2300, as described herein. The load control device 2300 may be a dimmer switch, an electronic switch, a lighting device (e.g., a light bulb, an electronic ballast for lamps, an LED driver for LED light sources, etc.), an AC plug-in load control device for controlling a plugged electrical load, a controllable electrical receptacle, a temperature control device (e.g., a thermostat), a motor drive unit for a motorized window treatment, a motor drive unit for a fan (e.g., ceiling fan), an audio device (e.g., a controllable speaker or playback device), an appliance, a security camera device, or other load control device. The load control device 2300 may include a communications circuit 2302. The communications circuit 2302 may include a receiver, an RF transceiver, or other communications module capable of performing wired and/or wireless communications via communications link 2310. The communications circuit 2302 may be in communication with a control circuit 2304. The control circuit 2304 may include one or more general purpose processors, special purpose processors, conventional processors, digital signal processors (DSPs), microprocessors, integrated circuits, a programmable logic device (PLD), application specific integrated circuits (ASICs), or the like. The control circuit 2304 may perform signal coding, data processing, power control, input/output processing, or any other functionality that enables the load control device 2300 to perform as described herein.

The control circuit 2304 may store information in and/or retrieve information from the memory 2306. For example, the memory 2306 may maintain a registry of associated control devices and/or control configuration instructions. The memory 2306 may include a non-removable memory and/or a removable memory. The load control circuit 2308 may receive instructions from the control circuit 2304 and may control the electrical load 2316 based on the received instructions. The load control circuit 2308 may send status feedback to the control circuit 2304 regarding the status of the electrical load 2316. The load control circuit 2308 may receive power via the hot connection 2312 and the neutral connection 2314 and may provide an amount of power to the electrical load 2316. The electrical load 2316 may include any type of electrical load.

The control circuit 2304 may be in communication with an actuator 2318 (e.g., one or more buttons) that may be actuated by a user to communicate user selections to the control circuit 2304. For example, the actuator 2318 may be actuated to put the control circuit 2304 in an association mode and/or communicate association messages from the load control device 2300.

Figure 24:
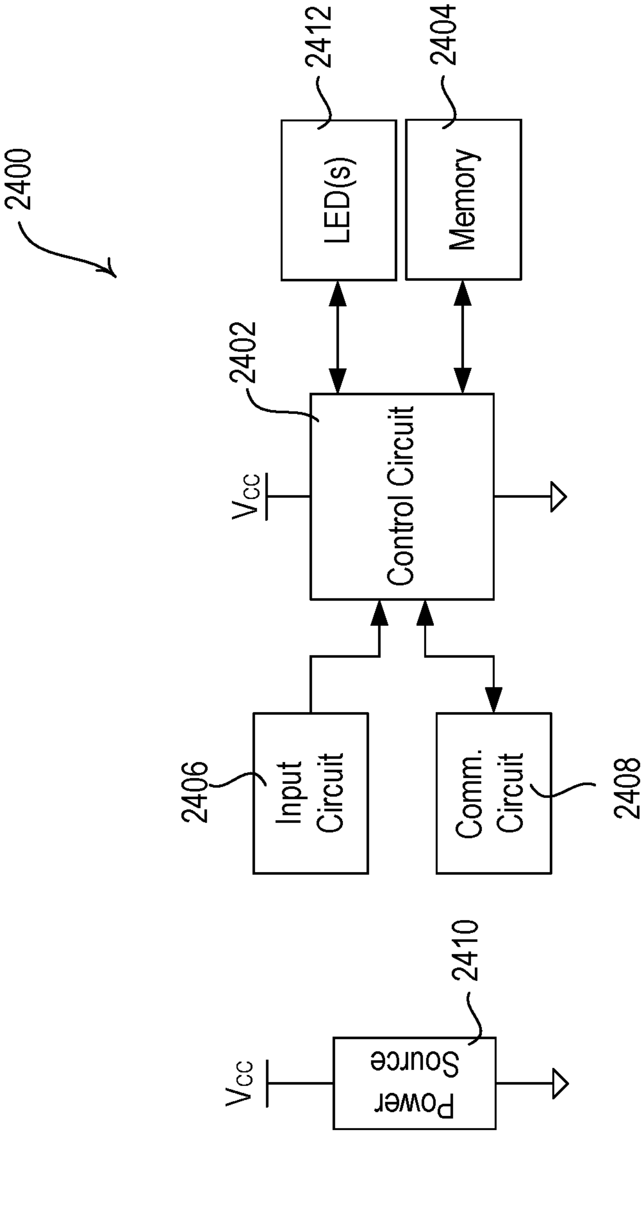
FIG. 24 is a block diagram of an example controller device.

FIG. 24 is a block diagram illustrating an example controller device 2400 as described herein. The controller device 2400 may be a remote control device, an occupancy sensor, a daylight sensor, a window sensor, a temperature sensor, and/or the like. The controller device 2400 may include a control circuit 2402 for controlling the functionality of the controller device 2400. The control circuit 2402 may include one or more general purpose processors, special purpose processors, conventional processors, digital signal processors (DSPs), microprocessors, integrated circuits, a programmable logic device (PLD), application specific integrated circuits (ASICs), or the like. The control circuit 2402 may perform signal coding, data processing, power control, input/output processing, and/or any other functionality that enables the controller device 2400 to perform as described herein.

The control circuit 2402 may store information in and/or retrieve information from the memory 2404. The memory 2404 may include a non-removable memory and/or a removable memory, as described herein.

The controller device 2400 may include one or more light sources, such as one or more LEDs 2412, for providing feedback to a user. The one or more LEDs 2412 may be included in a status indicator and may be controlled by the control circuit 2402. The control circuit 2402 may control the LEDs 2412 as described herein to provide feedback to the user.

The controller device 2400 may include a communications circuit 2408 for transmitting and/or receiving information. The communications circuit 2408 may transmit and/or receive information via wired and/or wireless communications. The communications circuit 2408 may include a transmitter, an RF transceiver, or other circuit capable of performing wired and/or wireless communications. The communications circuit 2408 may be in communication with control circuit 2402 for transmitting and/or receiving information.

The control circuit 2402 may also be in communication with an input circuit 2406. The input circuit 2406 may include an actuator (e.g., one or more buttons), a rotating or sliding portion, or a sensor circuit (e.g., an occupancy sensor circuit, a daylight sensor circuit, or a temperature sensor circuit) for receiving input that may be sent to a device for controlling an electrical load. The input circuit 2406 may also comprise a proximity sensing circuit for sensing an occupant in the vicinity of the controller device 2400. For example, the controller device 2402 may receive input from the input circuit 2406 to put the control circuit 2402 in an association mode and/or communicate association messages from the controller device 2400. The control circuit 2402 may receive information from the input circuit 2406 (e.g., an indication that a button has been actuated, a rotation portion has been rotated, or information has been sensed) and/or an indication of a proximity sensing event. The input circuit 2406 may be actuated as an on/off event. Each of the modules within the controller device 2400 may be powered by a power source 2410.

Figure 25:
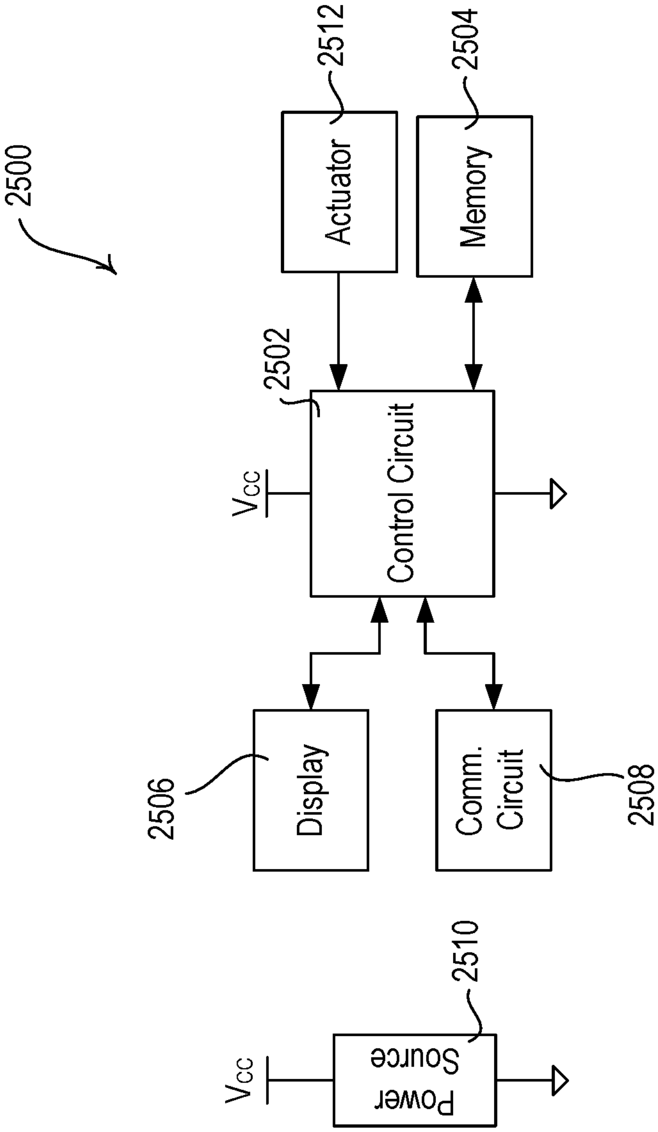
FIG. 25 is a block diagram of an example network device.

FIG. 25 is a block diagram illustrating an example network device 2500 as described herein. The network device 2500 may include the network device 190, for example. The network device 2500 may include a control circuit 2502 for controlling the functionality of the network device 2500. The control circuit 2502 may include one or more general purpose processors, special purpose processors, conventional processors, digital signal processors (DSPs), microprocessors, integrated circuits, a programmable logic device (PLD), application specific integrated circuits (ASICs), or the like. The control circuit 2502 may perform signal coding, data processing, power control, input/output processing, or any other functionality that enables the network device 2500 to perform as described herein. The control circuit 2502 may store information in and/or retrieve information from the memory 2504. The memory 2504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 2500 may include a communications circuit 2508 for transmitting and/or receiving information. The communications circuit 2508 may perform wireless and/or wired communications. The communications circuit 2508 may include an RF transceiver or other circuit capable of performing wireless communications via an antenna. Communications circuit 2508 may be in communication with control circuit 2502 for transmitting and/or receiving information.

The control circuit 2502 may also be in communication with a display 2506 for providing information to a user. The control circuit 2502 and/or the display 2506 may generate GUIs for being displayed on the network device 2500. The display 2506 and the control circuit 2502 may be in two-way communication, as the display 2506 may include a touch screen module capable of receiving information from a user and providing such information to the control circuit 2502. The network device may also include an actuator 2512 (e.g., one or more buttons) that may be actuated by a user to communicate user selections to the control circuit 2502.

Each of the modules within the network device 2500 may be powered by a power source 2510. The power source 2510 may include an AC power supply or DC power supply, for example. The power source 2510 may generate a supply voltage $V_{CC}$ for powering the modules within the network device 2500.

Figure 26:
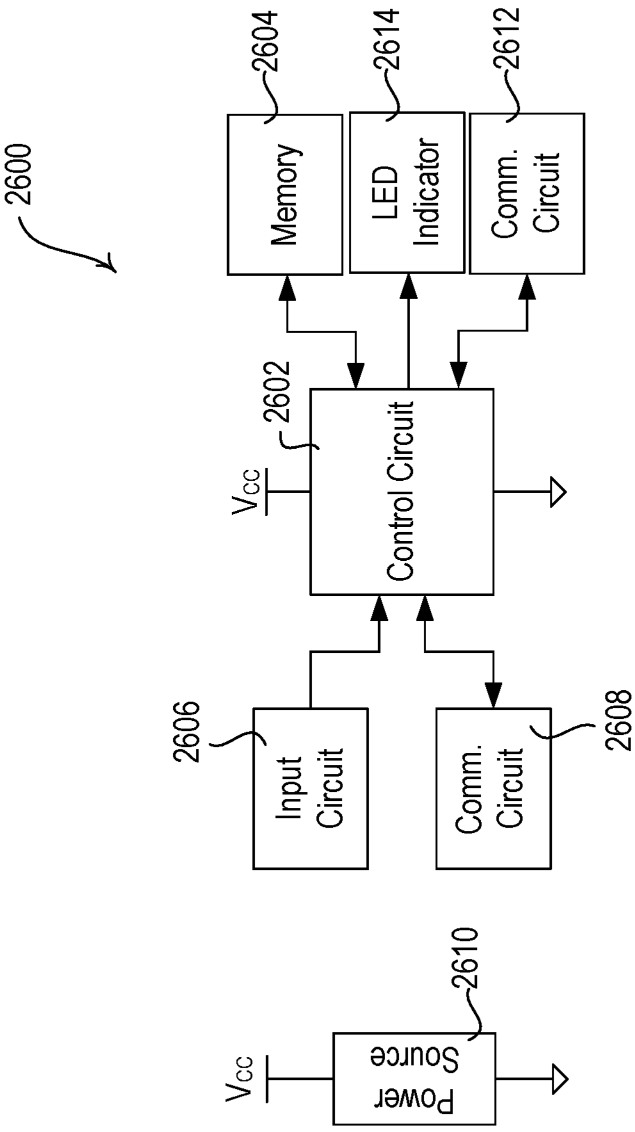
FIG. 26 is a block diagram of an example hub device.

FIG. 26 is a block diagram illustrating an example hub device 2600 as described herein. The hub device 2600 may include a control circuit 2602 for controlling the functionality of the hub device 2600. The control circuit 2602 may include one or more general purpose processors, special purpose processors, conventional processors, digital signal processors (DSPs), microprocessors, integrated circuits, a programmable logic device (PLD), application specific integrated circuits (ASICs), or the like. The control circuit 2602 may perform signal coding, data processing, power control, input/output processing, or any other functionality that enables the hub device 2600 to perform as described herein. The control circuit 2602 may store information in and/or retrieve information from the memory 2604. The memory 2604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The hub device 2600 may include a communications circuit 2608 for transmitting and/or receiving information. The communications circuit 2608 may perform wireless and/or wired communications. The hub device 2600 may also, or alternatively, include a communications circuit 2612 for transmitting and/or receiving information. The communications circuit 2612 may perform wireless and/or wired communications. Communications circuits 2608 and 2612 may be in communication with control circuit 2602. The communications circuits 2608 and 2612 may include RF transceivers or other communications modules capable of performing wireless communications via an antenna. The communications circuit 2608 and communications circuit 2612 may be capable of performing communications via the same communication channels or different communication channels. For example, the communications circuit 2608 may be capable of communicating (e.g., with a network device, over a network, etc.) via a wireless communication channel (e.g., BLUETOOTH®, near field communication (NFC), WI-FI®, WIMAX®, cellular, etc.) and the communications circuit 2612 may be capable of communicating (e.g., with control devices and/or other devices in the load control system) via another wireless communication channel (e.g., WI-FI® or a proprietary communication channel, such as CLEAR CONNECT™).

The control circuit 2602 may be in communication with an LED indicator 2614 for providing indications to a user. The control circuit 2602 may be in communication with an actuator 2606 (e.g., one or more buttons) that may be actuated by a user to communicate user selections to the control circuit 2602. For example, the actuator 2606 may be actuated to put the control circuit 2602 in an association mode and/or communicate association messages from the hub device 2600.

Each of the modules within the hub device 2600 may be powered by a power source 2610. The power source 2610 may include an AC power supply or DC power supply, for example. The power source 2610 may generate a supply voltage $V_{CC}$ for powering the modules within the hub device 2600.

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. At least one non-transitory computer-readable storage medium comprising executable instructions for configuring at least one processor to:
- receive user interaction event for controlling a plurality of lighting devices, wherein the user interaction event corresponds to a command;
- receive device information regarding the plurality of lighting devices, wherein the device information comprises present intensity levels of the plurality of lighting devices;
- determine that the command is a first command type configured to increase the present intensity levels of the plurality of lighting devices or a second command type configured to decrease the present intensity levels of the plurality of lighting devices; and
- provide feedback, via a status indicator comprising a plurality of segments, to indicate one of a first present intensity level of a first lighting device of the plurality of lighting devices or a second present intensity level of a second lighting device of the plurality of lighting devices, wherein the feedback is based on the command being the first command type or the second command type and a comparison of the first present intensity level to the second present intensity level.

2. The at least one non-transitory computer-readable storage medium of claim 1, wherein:
- the first command type is a raise command;
- the first present intensity level is less than the second present intensity level; and
- the control circuit is configured to provide feedback, via the status indicator, to indicate the first present intensity level of the first lighting device.

3. The at least one non-transitory computer-readable storage medium of claim 2, wherein the user interaction event comprises a rotation or a finger swipe.

4. The at least one non-transitory computer-readable storage medium of claim 2, wherein the first lighting device is a lighting device of the plurality of lighting devices with a lowest present intensity level.

5. The at least one non-transitory computer-readable storage medium of claim 2, wherein the second command type is a lower command and the second present intensity level is greater than the first present intensity level, the executable instructions further for configuring the at least one processor to provide feedback, via the status indicator, to indicate the second present intensity level of the second lighting device.

6. The at least one non-transitory computer-readable storage medium of claim 5, wherein the user interaction event comprises one of a rotation or a finger swipe.

7. The at least one non-transitory computer-readable storage medium of claim 5, wherein the second lighting device is a lighting device of the plurality of lighting devices with a highest present intensity level.

8. The at least one non-transitory computer-readable storage medium of claim 2, the executable instructions further for configuring the at least one processor to adjust the feedback, via the status indicator, to indicate the present intensity level of the first lighting device as the present intensity level is raised in response to the raise command.

9. The at least one non-transitory computer-readable storage medium of claim 1, wherein the second command type is an off command and the first present intensity level is greater than the second present intensity level, the executable instructions further for configuring the at least one processor to provide feedback, via the status indicator, to indicate the first present intensity level of the first lighting device.

10. The at least one non-transitory computer-readable storage medium of claim 9, wherein the user interaction event is a single actuation of an actuation portion.

11. The at least one non-transitory computer-readable storage medium of claim 1, wherein the first command type is a full-on command and the first present intensity level is greater than the second present intensity level, the executable instructions further for configuring the at least one processor to provide feedback, via the status indicator, to indicate the first present intensity level of the first lighting device.

12. The at least one non-transitory computer-readable storage medium of claim 11, wherein the user interaction event comprises two actuations of an actuation portion in quick succession.

13. The at least one non-transitory computer-readable storage medium of claim 1, wherein the second command type is a lower command and the first present intensity level is greater than the second present intensity level, the executable instructions further for configuring the at least one processor to provide feedback, via the status indicator, to indicate the first present intensity level of the first lighting device.

14. At least one non-transitory computer-readable storage medium comprising executable instructions for configuring at least one processor to:
- receive a user interaction event for controlling a plurality of devices, wherein the user interaction event is associated with a command;
- receive device information regarding the plurality of devices, wherein the device information comprises future intensity levels of the plurality of devices; and
- provide feedback, via a status indicator comprising a plurality of segments, to indicate a starting intensity level and adjusting the feedback provided via the status indicator over time to indicate an ending intensity level, wherein the ending intensity level is the highest of the future intensity levels of the plurality of devices.

15. The at least one non-transitory computer-readable storage medium of claim 14, wherein the command is an on command, and the starting intensity level is less than the ending intensity level.

16. The at least one non-transitory computer-readable storage medium of claim 15, wherein the user interaction event is a single actuation of an actuation portion.

17. The at least one non-transitory computer-readable storage medium of claim 15, wherein:

the device information further comprises a present intensity level of a device of the plurality of devices with a lowest present intensity level; and the starting intensity level indicates the present intensity level of the device of the plurality of devices with the lowest present intensity level.

18. The at least one non-transitory computer-readable storage medium of claim 14, wherein:

the command is an off command; and the starting intensity level is greater than the ending intensity level.

19. The at least one non-transitory computer-readable storage medium of claim 14, wherein the user interaction event is a single actuation of an actuation portion.

20. The at least one non-transitory computer-readable storage medium of claim 14, wherein:

the device information further comprises a present intensity level of a device of the plurality of devices with a highest present intensity level; and the starting intensity level indicates the present intensity level of the device of the plurality of devices with the highest present intensity level.

21. At least one non-transitory computer-readable storage medium comprising executable instructions for configuring at least one processor to:

receive a command for controlling one or more devices that are responsive to a remote control device;

receive device information regarding the one or more devices, wherein the device information comprises at least one of a present intensity level of the one or more devices, a future intensity level of the one or more devices, and a transition time;

select a type of relative feedback to be provided via a status indicator based on the command and the device information, wherein the type of relative feedback comprises:

a transition-down animation, a transition-up animation, and a responsive animation; and provide feedback using the selected feedback type via the status indicator.

22. The at least one non-transitory computer-readable storage medium of claim 21, wherein:

the transition-up animation is the selected feedback type when the command is an on command;

the transition-down animation is the selected feedback type when the command is an off command; and the responsive animation is the selected feedback type when the command is a raise command or a lower command.

23. The at least one non-transitory computer-readable storage medium of claim 21, wherein:

the transition-up animation illuminates the status indicator to a starting illumination level and, over the transition time, transitions the status indicator to illuminate at an ending illumination level;

the starting illumination level is indicative of the present intensity level of the one or more devices; and the ending illumination level is indicative of the future intensity level of the one or more devices.

24. At least one non-transitory computer-readable storage medium comprising executable instructions for configuring at least one processor to:

receive a first message from a remote control device that is configured to control one or more lighting devices, the first message indicating a user interaction for controlling the one or more lighting devices;

retrieve an intensity level for each of the one or more lighting devices;

determine a command based on the first message and the intensity levels for each of the one or more lighting devices;

transmit a second message to the remote control device, the second message comprising a present intensity level of a lighting device of the one or more lighting devices and a transition time; and transmit the command to the one or more lighting devices responsive to the remote control device.

25. The at least one non-transitory computer-readable storage medium of claim 24, wherein the user interaction is an actuation of an actuation portion.

26. The at least one non-transitory computer-readable storage medium of claim 24, wherein the command is an on scene command when the intensity level retrieved for each of the one or more lighting devices is off.

* * * * *